(12) United States Patent
Wei et al.

(10) Patent No.: US 11,057,464 B1
(45) Date of Patent: Jul. 6, 2021

(54) SYNCHRONIZATION OF DATA BETWEEN LOCAL AND REMOTE COMPUTING ENVIRONMENT BUFFERS

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN); Sheng-Chi Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/906,160

(22) Filed: Jun. 19, 2020

Related U.S. Application Data

(63) Continuation of application No. PCT/CN2020/094259, filed on Jun. 4, 2020.

(51) Int. Cl.
*G06F 15/16* (2006.01)
*G06F 9/54* (2006.01)
(Continued)

(52) U.S. Cl.
CPC ........ *H04L 67/1095* (2013.01); *G06F 9/5005* (2013.01); *G06F 21/6245* (2013.01); *H04L 67/2852* (2013.01)

(58) Field of Classification Search
CPC .................................................. H04L 67/1095
(Continued)

(56) References Cited

U.S. PATENT DOCUMENTS 7,783,985 B2 * 8/2010 Indiran ................. G06F 3/0486
715/769
8,190,707 B2 * 5/2012 Trivedi .................. H04L 67/08
709/218
(Continued)

FOREIGN PATENT DOCUMENTS

EP 2535811 A1 * 12/2012 ............. G06F 9/543

OTHER PUBLICATIONS

Jeffrey Stylos, Brad A. Myers, and Andrew Faulring. 2004. Citrine: providing intelligent copy-and-paste . . . Association for Computing Machinery, New York, NY, USA, 185-188. DOI:https://doi.org/10.1145/102 (Year: 2004).*

(Continued)

*Primary Examiner* — Hamza N Algibhah
(74) *Attorney, Agent, or Firm* — Pierce Atwood LLP

(57) ABSTRACT

A computing system may determine that first data was copied from a first application to a buffer of a first computing environment, and that the first data was received by a second application in a second computing environment. The computing system may identify second data copied from the first application to the buffer and, in response to the second data being copied from the first application to the buffer and based at least in part on the second application having received the first data, may cause the second data to be transferred from the buffer to the second computing environment. The computing system may further evaluate the second data to determine whether it includes potentially private information, and may cause the second data to be transferred to the second computing environment based at least in part on the second data being free of potentially private information.

20 Claims, 19 Drawing Sheets

(51) Int. Cl.
  *H04L 29/06* (2006.01)
  *H04L 29/08* (2006.01)
  *G06F 9/50* (2006.01)
  *G06F 21/62* (2013.01)
(58) Field of Classification Search
  USPC .................................................... 709/248
  See application file for complete search history.

(56) References Cited

U.S. PATENT DOCUMENTS

| | | | | |
|---|---|---|---|---|
| 8,321,958 | B1* | 11/2012 | Fleming | G06F 16/9535 726/29 |
| 8,970,450 | B2* | 3/2015 | Momchilov | H04L 67/08 345/2.2 |
| 9,210,213 | B2* | 12/2015 | Momchilov | H04L 67/08 |
| 10,165,055 | B2* | 12/2018 | Singhal | H04L 63/10 |
| 10,476,969 | B2* | 11/2019 | Singhal | H04L 67/141 |
| 10,565,367 | B2* | 2/2020 | Fleming | G06F 21/51 |
| 10,855,747 | B2* | 12/2020 | Momchilov | G06F 9/452 |
| 2004/0152450 | A1* | 8/2004 | Kouznetsov | H04L 12/1827 455/412.1 |
| 2005/0004986 | A1* | 1/2005 | Aoki | G06F 9/543 709/206 |
| 2006/0041761 | A1* | 2/2006 | Neumann | G06F 21/33 713/189 |
| 2008/0256601 | A1* | 10/2008 | Dutta | G06F 21/554 726/3 |
| 2008/0282180 | A1* | 11/2008 | Glasgow | G06F 9/543 715/770 |
| 2010/0313239 | A1* | 12/2010 | Chakra | G06F 21/6218 726/2 |
| 2012/0096368 | A1* | 4/2012 | McDowell | G06F 9/543 715/748 |
| 2012/0324365 | A1* | 12/2012 | Momchilov | H04L 67/42 715/738 |
| 2013/0036167 | A1* | 2/2013 | Bazot | G06F 9/543 709/204 |
| 2013/0054731 | A1* | 2/2013 | Branton | G06F 9/543 709/213 |
| 2013/0304815 | A1* | 11/2013 | Puente | H04L 67/10 709/204 |
| 2014/0013234 | A1* | 1/2014 | Beveridge | G06F 3/0488 715/740 |
| 2014/0025727 | A1* | 1/2014 | Ahn | H04L 67/1095 709/203 |
| 2014/0032691 | A1* | 1/2014 | Barton | H04L 41/00 709/206 |
| 2015/0012861 | A1* | 1/2015 | Loginov | G06F 9/543 715/770 |
| 2015/0207850 | A1* | 7/2015 | Jitkoff | H04W 12/50 715/748 |
| 2015/0286831 | A1* | 10/2015 | More | H04L 63/10 726/27 |
| 2016/0292454 | A1* | 10/2016 | Manmohan | G06F 21/6281 |
| 2017/0154188 | A1* | 6/2017 | Meier | G06F 21/552 |
| 2017/0201491 | A1* | 7/2017 | Schmidt | H04L 65/1069 |
| 2018/0039385 | A1* | 2/2018 | Worley | G06F 9/543 |
| 2018/0082055 | A1* | 3/2018 | Fleming | G06F 16/9535 |
| 2018/0188924 | A1* | 7/2018 | Kumar | G06F 9/4843 |
| 2018/0255134 | A1* | 9/2018 | Goli | H04L 67/1095 |
| 2018/0321950 | A1* | 11/2018 | Bikumala | G06F 9/451 |
| 2020/0153911 | A1* | 5/2020 | Chauhan | G06F 21/6218 |
| 2020/0210214 | A1* | 7/2020 | Ma | G06F 9/452 |
| 2020/0252413 | A1* | 8/2020 | Buzbee | G06F 21/6245 |
| 2020/0257576 | A1* | 8/2020 | Gallagher | G06F 40/174 |

OTHER PUBLICATIONS

An Efficient Approach for Remote Machine Access Using Machine Learning, Shivam H Ribadiy, Janardan Jayantibhai Bharvad, Jan. 2020 (Year: 2020).*

* cited by examiner

Buffer Activity Table 700

| Copy Event ID | Copy App ID | Paste Date/Time | Paste App ID | Paste location | Privacy Flag | Synchronization Flag |
|---|---|---|---|---|---|---|
| CE1 | A1 | 2020.05.25 09:25 AM | A3 | Remote | False | False |
| CE2 | A2 | 2020.05.26 11:00 AM | A2 | Local | False | True |
| CE3 | A1 | 2020.05.26 11:32 AM | A1 | Local | False | False |
| CE4 | A1 | 2020.05.27 02:23 PM | A2 | Local | True | False |

Columns: 702, 704, 706, 708, 710, 712, 714

FIG. 7

User App Table 800

| User ID | App Type | App ID | App Location |
|---|---|---|---|
| U1 | Word | A1 | Local |
| U1 | Excel | A2 | Local |
| U1 | Explorer | A3 | Remote |
| U1 | Desktop | A4 | Remote |

Columns: 802, 804, 806, 808

FIG. 8

App Exclusion Table 900

| App ID | Exclusion Date/Time |
|---|---|
| A2 | 2020.05.22 09:24 AM |
| A5 | 2020.05.21 10:23 AM |
| A7 | 2020.05.20 03:15 PM |
| A8 | 2020.05.19 11:56 AM |

Columns: 902, 904

FIG. 9

Paste Location Summary Table 1000

| Copy App ID | Local Paste # | Remote Paste # |
|---|---|---|
| A1 | 2 | 1 |
| A2 | 1 | 0 |
| A3 | 33 | 0 |
| A4 | 15 | 14 |

Columns: 1002, 1004, 1006

FIG. 10

SYNCHRONIZATION OF DATA BETWEEN LOCAL AND REMOTE COMPUTING ENVIRONMENT BUFFERS

CROSS-REFERENCE TO RELATED APPLICATIONS

This application is a continuation of and claims the benefit under 35 U.S.C. § 120 and 35 U.S.C. § 365(c) to International Application PCT/CN2020/094259, entitled SYNCHRONIZATION OF DATA BETWEEN LOCAL AND REMOTE COMPUTING ENVIRONMENT BUFFERS, with an international filing date of Jun. 4, 2020, the entire contents of which are incorporated herein by reference for all purposes.

BACKGROUND

Various systems have been developed that allow client devices to access applications and/or desktops over a network. The Virtual Apps and Desktops™ systems offered by Citrix Systems, Inc., of Fort Lauderdale, Fla., provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computing system determines that first data was copied from a first application to a first buffer of a first computing environment, and that the first data was received by a second application in a second computing environment, the second computing environment being remote from the first computing environment. The computing system identifies second data copied from the first application to the first buffer, and causes the second data to be transferred from the first buffer to the second computing environment in response to the second data being copied from the first application to the first buffer and based at least in part on the second application having received the first data.

In some disclosed embodiments, a computing system determines that first data in a first buffer of a first operating system is to be transferred to a second operating system, and evaluates the first data to determine whether the first data includes potentially private information. The first data is transferred from the first buffer to the second operating system based at least in part on the first data being free of potentially private information.

In some disclosed embodiments, a computing system comprises at least one processor and at least one computer-readable medium. The at least one computer-readable medium is encoded with instructions which, when executed by the at least one processor, cause the computing system to determine that first data was copied from a first application to a first buffer of a first computing environment, to determine that the first data was received by a second application in a second computing environment, the second computing environment being remote from the first computing environment, to identify second data copied from the first application to the first buffer, to evaluate the second data to determine whether the second data includes potentially private information, to determine that the second data is free of potentially private information, and to cause, in response to the second data being copied from the first application to the first buffer and based at least in part on the second application having received the first data and the second data being free of potentially private information, the second data to be transferred from the first buffer to the second computing environment.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 7 shows an example buffer data activity table that may be used in connection with some embodiments of the system shown in FIG. 6;

FIG. 8 shows an example user app table that may be used in connection with some embodiments of the system shown in FIG. 6;

FIG. 9 shows an example app exclusion table that may be used in connection with some embodiments of the system shown in FIG. 6;

FIG. 10 shows an example paste location summary table that may be used in connection with some embodiments of the system shown in FIG. 6;

DETAILED DESCRIPTION

Figure 1A:
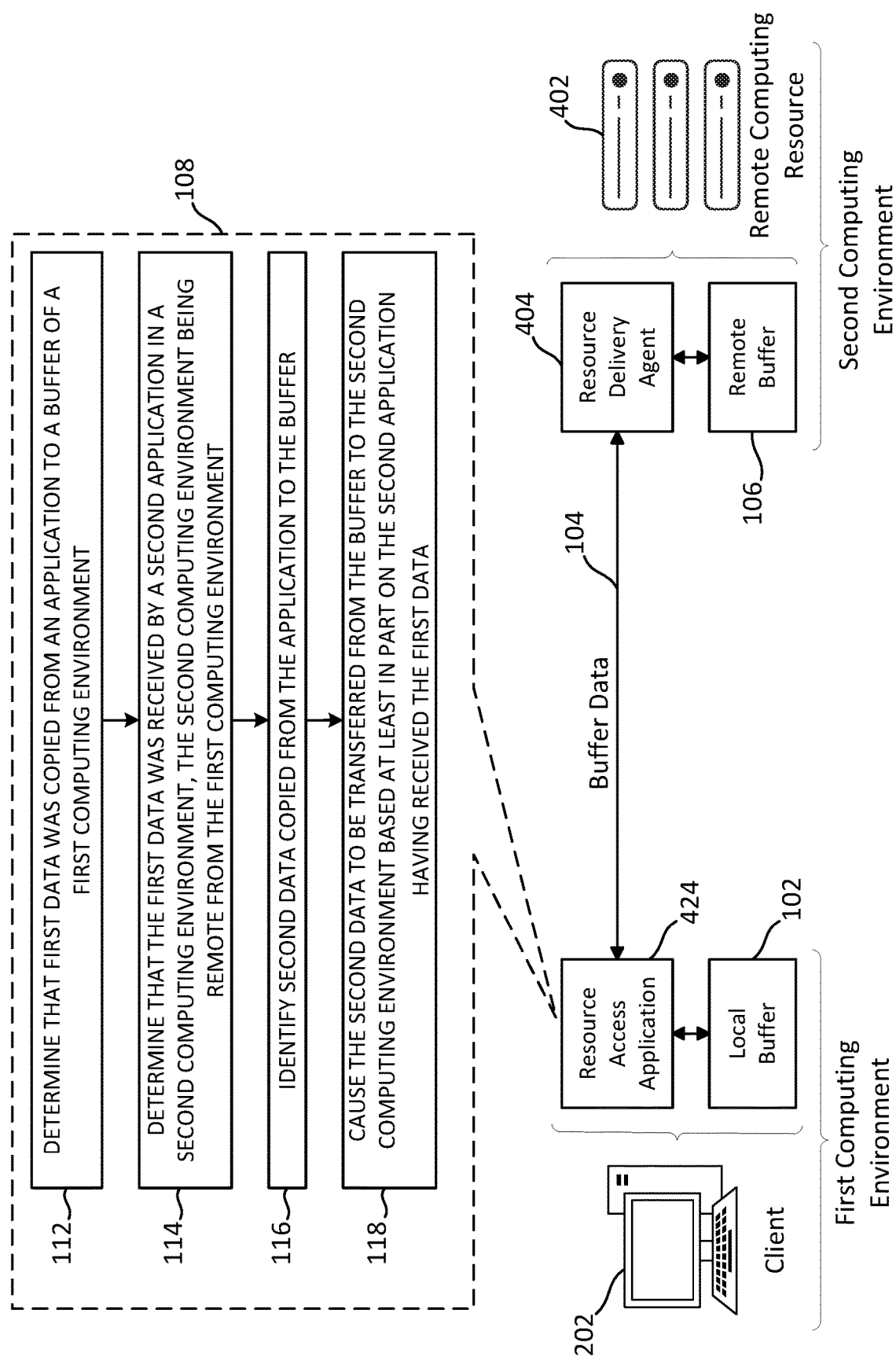
FIG. 1A is a diagram illustrating a first example implementation of a system for synchronizing computing environment buffers that is configured in accordance with some embodiments of the present disclosure.

For purposes of reading the description of the various embodiments below, the following descriptions of the sections of the specification and their respective contents may be helpful:

Section A provides an introduction to example embodiments of a system for synchronizing computing environment buffers;

Section B describes a network environment which may be useful for practicing embodiments described herein;

Section C describes a computing system which may be useful for practicing embodiments described herein;

Section D describes an example implementation of a resource delivery system which may be useful for practicing embodiments described herein;

Section E describes an example architecture of a resource virtualization server;

Section F provides a more detailed description of example embodiments of the system for synchronizing computing environment buffers introduced above in Section A; and Section F describes example implementations of methods, systems/devices, and computer-readable media in accordance with the present disclosure.

A. Introduction to Illustrative Embodiments of a System for Synchronizing Computing Environment Buffers Resource delivery systems have been developed in which remote computing resources can deliver one or more "virtual" resources, e.g., applications or desktops hosted on the remote computing resources, to client devices. The Virtual Apps and Desktops™ platforms offered by Citrix Systems, Inc., of Fort Lauderdale, Fla., are one example of such a resource delivery system. Example implementations of such a resource delivery system 400 are described below (in Section D) in connection with FIGS. 4A-F. As described with reference to FIG. 4C, in some implementations, a resource delivery controller 412 may broker a connection 448 between a client device 202 and a remote, shared computing resource 402, which connection 448 may allow a resource delivery agent 404 of the shared computing resource 402 to deliver a virtual resource to a resource access application 424 on the client device 202.

In some such systems, a client device 202 may be permitted to access one or more other resources, e.g., local applications or desktops, at the same time that the virtual resource is being delivered to the client device 202. For example, in some implementations, the client device 202 may have a local application opened in a first window and a virtual application opened in a second window, or may have a virtual desktop opened within a window of a local desktop. In such systems, the operating systems on the client device 202 and the shared computing resource 402 commonly provide copy-and-paste and/or cut-and-paste functionality to enable items, e.g., text, images, files, etc., to be "copied" from one location, e.g., an open application file, a desktop location, a browser window, etc., and "pasted" to another location accessible to the same operating system. As used herein, the term "copied" refers to any operation in which a copy of an item is made, whether or not the original version of the copied item remains at the location from which it was copied. Accordingly, an item that is "cut" from an application, e.g., by using a "CTRL-X" command in Microsoft Windows, would be considered to have been copied to a buffer of an operating system (sometimes referred to as a "clipboard") even though such an operation serves to remove the item from the application. A Windows "CTRL-C" command is another example of a command that can cause an item to be copied from an application to a buffer in some implementations.

Figure 1B:
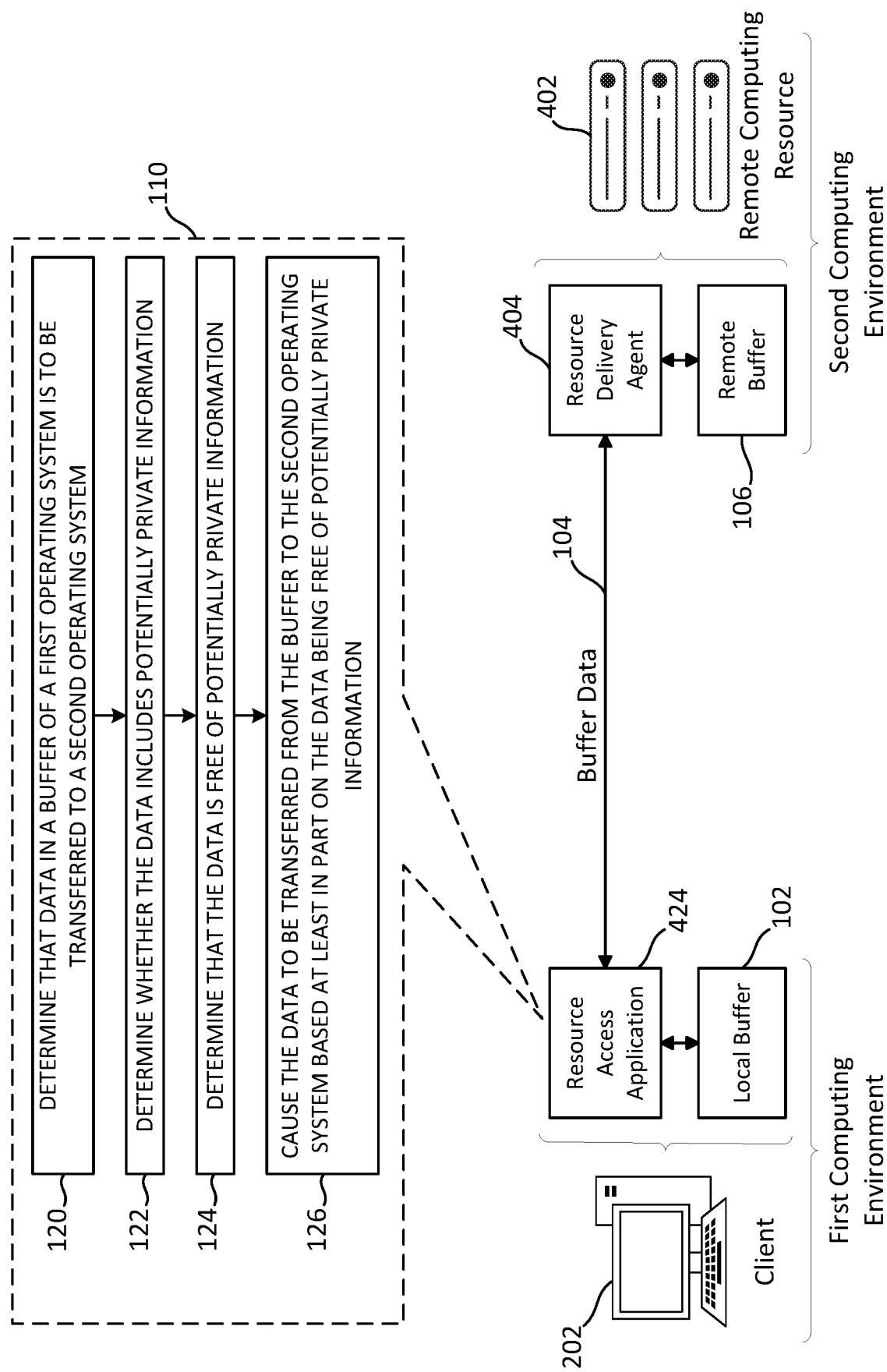
FIG. 1B is a diagram illustrating a second example implementation of a system for synchronizing computing environment buffers that is configured in accordance with some embodiments of the present disclosure.

Some systems further allow configurations in which items can be copied to a buffer (e.g., a clipboard) of one operating system and then pasted to a location accessible to another operating system. With reference to FIGS. 1A-B, for example, such systems may allow an item to be copied to a local buffer 102 on the client device 202 and then pasted to an application or desktop that is being delivered to the client device 202. As shown in FIGS. 1A-B, in such a case, because the delivered application or desktop is hosted on the remote computing resource 402, the item copied to the local buffer 102 needs to be transferred (e.g., as buffer data 104) from the local buffer 102 of the client device 202 to the remote computing resource 402. Similarly, for an item to be copied to a remote buffer 106 of the remote computing resource 402 and then pasted to an application or desktop that is local to the client device 202, buffer data 102 needs to be transferred from the remote buffer 106 of the remote computing resource 402 to the client device 202.

In some existing systems, a "clipboard syncing" feature may be enabled to allow the buffer data 104 to be transferred between the client device 202 and the remote computing resource 402. When such a feature is enabled, whenever a small amount data is copied to the local buffer 102, the system immediately begins transferring the copied data to the remote buffer 106, thus synchronizing the content of the two buffers 102, 106. As such, following the transfer, the copied data is already present in both the local buffer 102 and the remote buffer 106, and can be readily accessed for a subsequent paste operation. When, on the other hand, a larger quantity of data is copied to the local buffer 102, the system transfers the buffer data 104 to the remote computing resource 402 and synchronizes the two buffers 102, 106 only if a paste operation to an application hosted by the remote computing resource 402 is subsequently requested. This approach serves to avoid unnecessarily transferring large quantities of buffer data 104 across a network (not shown in FIGS. 1A-B) between the client device 202 and the remote computing resource 402.

The inventors have recognized and appreciated several drawbacks to the foregoing approach. One such drawback is that some users may be reluctant to enable the clipboard syncing feature because they are uncomfortable with the notion that data will be transferred to a network location every time they copy a small amount of data to their local buffers 102. Many users employ the same devices for both personal and work purposes, and may thus be concerned that their personal information on such dual-purpose devices could be misused or otherwise compromised.

Another drawback of the aforementioned clipboard syncing technique is the delay that can be experienced when large quantities of data are copied to the local buffer 102 and then pasted to an application or desktop being delivered by the remote computing resource 402, or vice versa. In particular, because the local buffer 102 and the remote buffer 106 are not "pre-synced" in response to copy operations when large quantities of data are involved, in order to respond to a paste command invoked by a user, the system first needs to transfer all of the data being pasted over a network connection between the client device 202 and the remote computing resource 402. Users can thus observe a significant lag between when such a paste operation is requested and when the buffer data 104 is actually pasted into the recipient application. Such a delay can be particularly significant when the client device 202 is a smartphone or other mobile device that is not connected to a local area network (LAN) or does not otherwise have access to a high-speed internet connection.

Still another drawback of the existing clipboard syncing technique is the unnecessary transfer of buffer data 104 from the local buffer 102 to the remote buffer 106, or vice versa, that takes place for smaller copy operations to one buffer 102, 106 that are not followed by paste operations from the other buffer 102, 106. Such data transfers needlessly consume network resources.

Offered are new buffer data syncing systems and techniques that are capable of overcoming one or more, or in some cases all, of the foregoing drawbacks of existing systems. In some implementations, historical data concerning a user's "copy and paste" behavior may be stored and evaluated to predict or otherwise forecast whether a given copy operation to the local buffer 102 (referred to herein as a "local copy event") is likely to result in a paste operation at the remote computing resource 402 (referred to herein as a "remote paste event"). Additionally or alternatively, in some implementations, such historical data may be evaluated to predict whether a given copy operation to the remote buffer 106 (referred to herein as a "remote copy event") is likely to result in a paste operation at the client device 202 (referred to herein as a "local paste event"). In some implementations, the transfer of buffer data 104 from one buffer 102, 106 to the other may, in at least some circumstances, begin immediately in response to determining that a local copy event is likely to result in a remote paste event and/or that a remote copy event is likely to result in a local paste event. In some implementations, the decision whether to immediately begin such a transfer does not depend on the quantity of the data that is to be transferred, as is the case with the existing "clipboard syncing" technique. When it is determined, on the other hand, that the local copy event is not likely to result in a remote paste event and/or that a remote copy event is not likely to result in a local paste event, the system may, in at least some circumstances, refrain from transferring the copied data from one buffer 102, 106 to the other unless and until a paste operation from the other buffer 102, 106 is requested.

In some implementations, prior to transferring the buffer data 104 from the local buffer 102 to the remote buffer 106, e.g., in response to a local copy event and/or a remote paste event, the to-be-transferred data may be evaluated using one or more privacy screening techniques to determine whether it contains indicia of private data of a user. Examples of several suitable privacy screening techniques are described below in Section F. In some implementations, in the event that the to-be transferred data includes indicia of private data, the client device 202 may at least initially refrain from transferring the data from the local buffer 102 to the remote buffer 106. In some implementations, the user of the client device 202 may be provided with one or more options for addressing the privacy concern, overriding the privacy determination, and/or adjusting the privacy checking process. Examples of such options are described in more detail below in connection with FIG. 16.

Accordingly, in some implementations, at least two levels of filtering may be performed in response to a local copy event, with the first level of filtering determining whether, based on historical data, the local copy event is sufficiently likely to be followed by a remote paste event to justify the consumption of network bandwidth to transfer the data, and the second level of filtering determining whether the to-be-transferred data includes potentially private information of an individual that perhaps ought not be transferred.

FIGS. 1A and 1B show, respectively, a first example routine 108 and a second example routine 110 that may be performed by one or more components of a computing system. Although FIGS. 1A-B show the routines 108, 110 being performed by the resource access application 424 on the client device 202, it should be appreciated that one or more steps of the illustrated routines 108, 110 may additionally or alternatively be performed by an application of the remote computing resource 402 and/or may be performed, in whole or in part, by one or more system components other than those illustrated. As shown in FIGS. 1A-B, the client device 202 may correspond to a first computing environment and the remote computing resource 402 may correspond to a second computing environment.

Referring to the first example routine 108 (shown in FIG. 1A), the client device 202 may (at a step 112) determine that first data was copied from a first application to the local buffer 102 of the first computing environment. As one example, the first application may be Microsoft Word, and a paragraph of text may have been copied from a Microsoft Word document to the local buffer 102. As another example, the first application may be a desktop manager of the client device 202, and a file may be copied from desktop of the client device 202 to the local buffer 102. As yet another example, the first application may be a file management system of the client device 202, and a file may be copied from a file folder of the client device 202 to the local buffer 102.

At a step 114 of the routine 108, the client device 202 may determine that the first data was received by a second application in the second computing environment. For example, the first data may have been transferred (as buffer data 104) from the local buffer 102 to the remote buffer 106 to enable a paste operation to a second application of the remote computing resource 402.

At a step 116 of the routine 108, the client device 202 may determine that second data was copied from the first application to the local buffer 102.

At a step 118 of the routine 110, the client device 202 may cause the second data to be transferred to the second computing environment (e.g., as buffer data 104) based at least in part on the first data having been transferred from the local buffer 102 to the second computing environment. As explained in more detail below, in some implementations, the fact that the first data was received by an application in the second computing environment, and was thus transferred (as buffer data 104) from the local buffer 102 to the second computing environment (i.e., that a previous local copy event from the application was followed by a remote paste event) may be used as at least one data point for determining that a subsequent local copy event from that same application is sufficiently likely to be followed by a remote paste event to warrant an immediate transfer of the copied data from the local buffer 102 to the remote buffer 106.

Referring now to the second example routine 110 (shown in FIG. 1B), the client device 202 may determine (at a step 120) that data in the local buffer 102 of the first computing environment, e.g., a buffer of an operating system of the client device 202, is to be transferred to the second computing environment, e.g., to an operating system of the remote computing resource 402.

At a step 122 of the routine 110, the client device 202 may determine whether the to-be-transferred data includes potentially private information, e.g., a Social Security Number. Additional examples of private information and techniques for detecting the same are provided below.

At a step 124 of the routine 110, the client device 202 may determine that the data is free of or otherwise does not include potentially private information. Examples of techniques for making such determinations are provided below.

At a step 126 of the routine 110, the client device 202 may cause the data to be transferred (e.g., as buffer data 104) from the local buffer 102 to the second computing environment (e.g., to the operating system of the remote computing resource 402 and/or the remote buffer 106) based at least in part on the data being free of potentially private information.

Additional details and example implementations of embodiments of the present disclosure are set forth below in Sections F and G, following a description of example systems and network environments in which such embodiments may be deployed.

B. Network Environment

Figure 2:
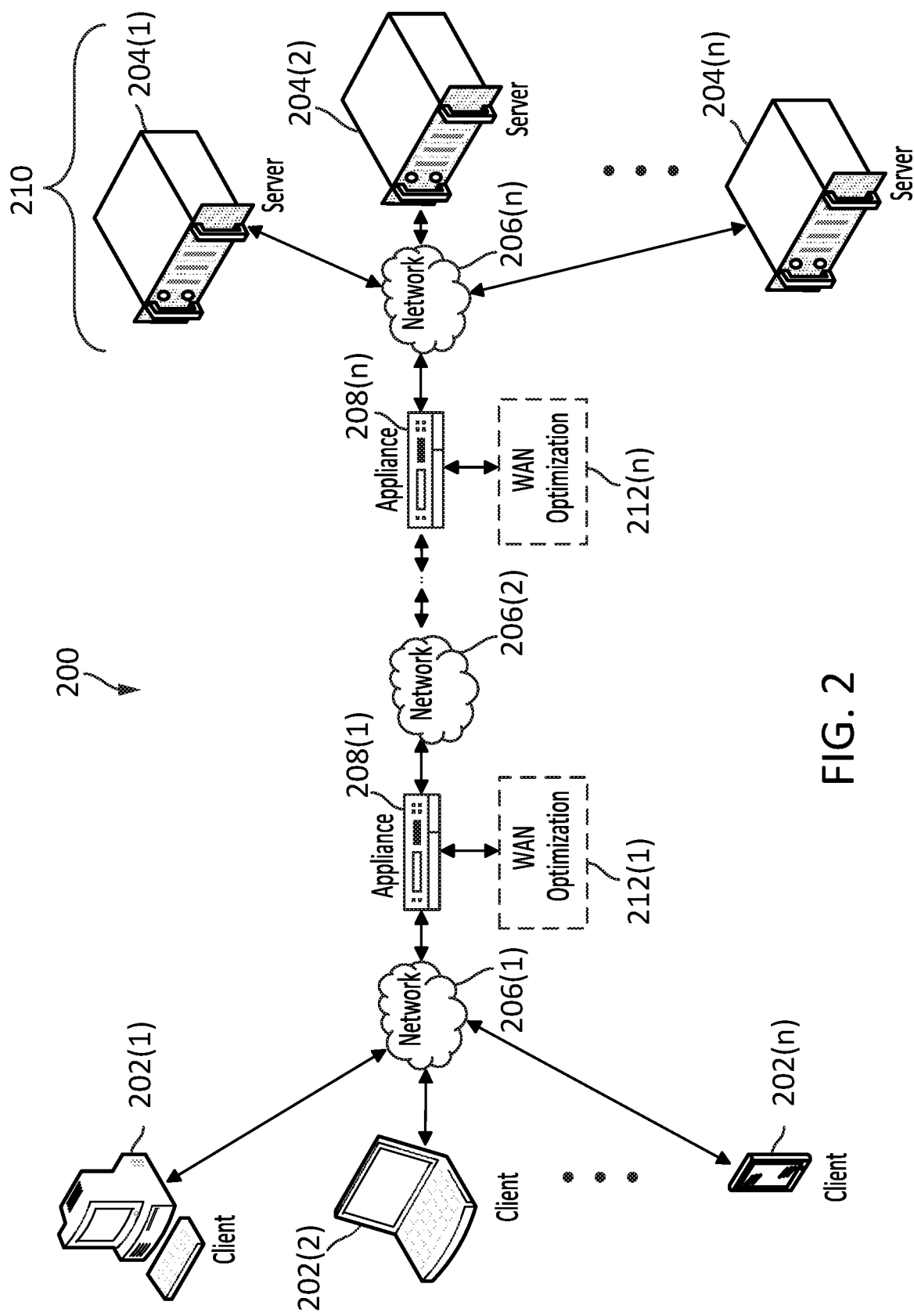
FIG. 2 is a diagram of a network environment in which some embodiments of the systems and techniques disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
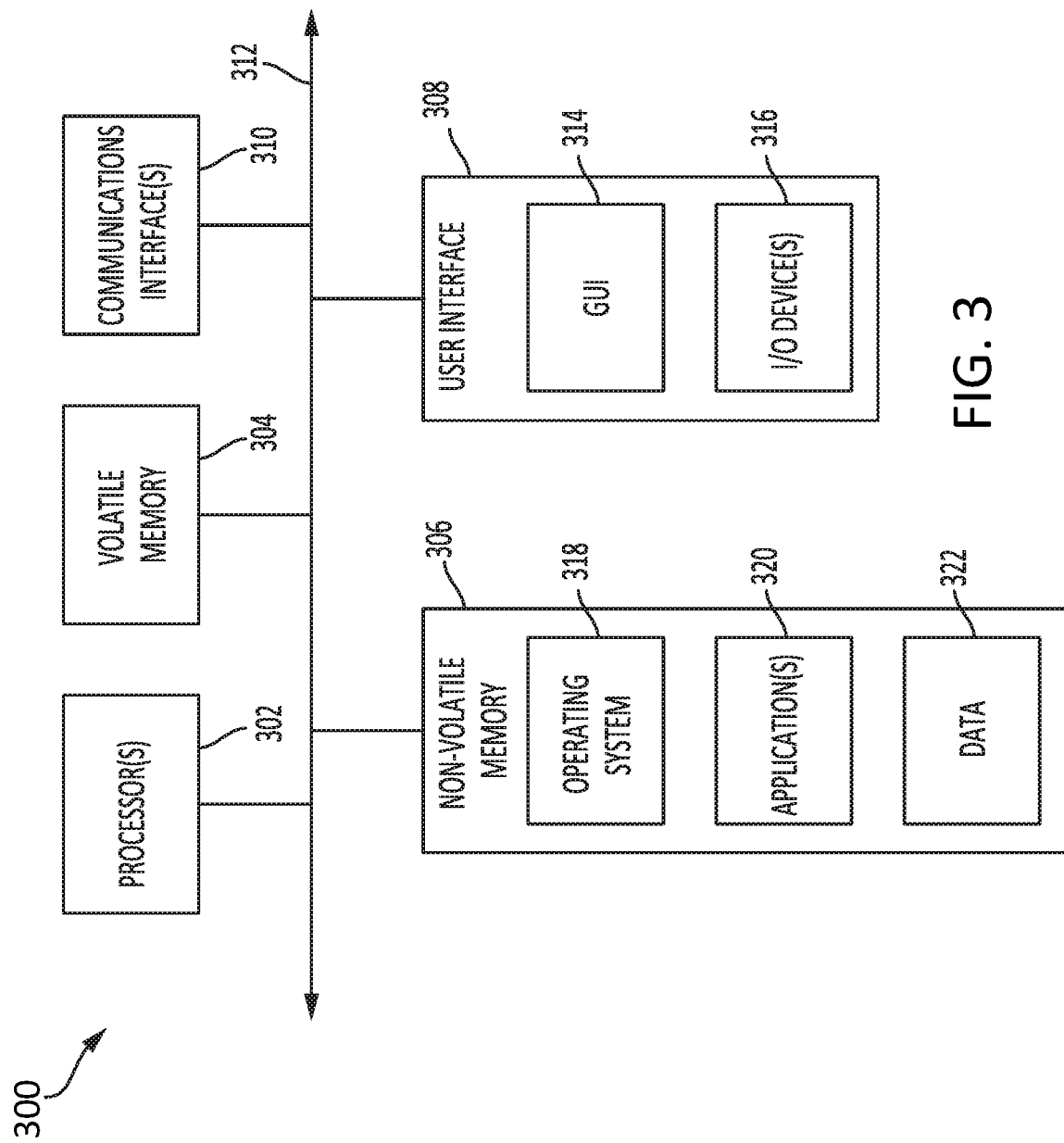
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, and the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4A:
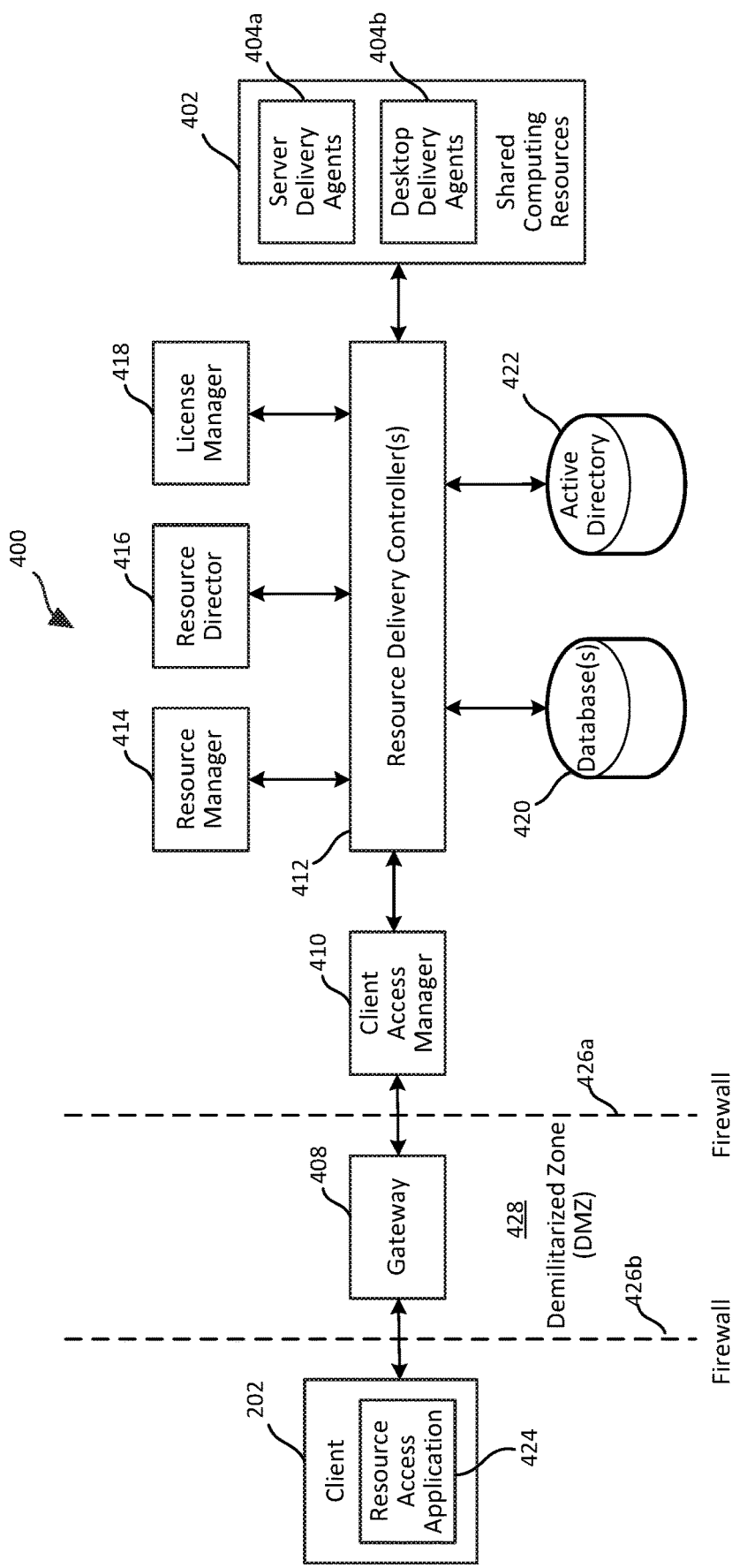
FIG. 4A is a block diagram illustrating key components of a resource delivery system which may be useful for practicing embodiments described herein.

D. Systems and Methods for Delivering Virtualized Applications and/or Desktops to Client Devices FIG. 4A is a block diagram illustrating key components of a resource delivery system 400 that may enable a client device 202 to remotely access one or more virtual applications or desktops running on one or more shared computing resources 402. The shared computing resources 402 may include physical machines and/or virtual (e.g., hypervisor driven) machines, and may be located at a data center, within a cloud computing environment, or elsewhere. As described in more detail below, such shared computing resources 402 may implement one or more resource delivery agents 404, including one or more server delivery agents 404a and/or one or more desktop delivery agents 404b. The Virtual Delivery Agents (VDAs) of the Citrix Virtual Apps and Desktops™ system offered by Citrix Systems, Inc., of Fort Lauderdale, Fla., are example implementations of the resource delivery agents 404. In some implementations, the resource delivery system 400 may give an information technology (IT) department of an organization control of virtual machines, applications, licensing, and security while providing "anywhere access" for any device. As described below, the resource delivery system 400 may enable end users to run applications and/or desktops independently of the operating system and interface of the end user's device. Further, the resource delivery system 400 may enable administrators to manage the network and control access from selected devices or from all devices, as well as to manage an entire network from a single data center.

The resource delivery system 400 shown in FIG. 4A may, for example, correspond to an implementation of a Citrix Virtual Apps and Desktops™ system offered by Citrix Systems, Inc., of Fort Lauderdale, Fla. Such systems employ a unified architecture called FlexCast Management Architecture (FMA). Among other things, FMA provides the ability to run multiple versions of Citrix Virtual Apps or Citrix Virtual Desktops™ as well as integrated provisioning.

As shown in FIG. 4A, in addition to the shared computing resources 402, the resource delivery system 400 may include a gateway 408, a client access manager 410, one or more resource delivery controllers 412, a resource manager 414, a resource director 416, a license manager 418, one or more databases 420, and an Active Directory (AD) 422 or other directory service.

The resource delivery controller(s) 412 may be the central management component of the resource delivery system 400. In some implementations, the resource delivery controller(s) 412 may be installed on at least one server in a data center of an organization. The Delivery Controller of the Citrix Virtual Apps and Desktops™ system offered by Citrix Systems, Inc., of Fort Lauderdale, Fla., is one example implementation of the resource delivery controller(s) 412. For reliability and availability, respective resource delivery controllers 412 may be installed on multiple servers. The resource delivery controller(s) 412 may communicate with the shared computing resources 402 to distribute applications and/or desktops, authenticate and manage user access, broker connections between client devices 202 and resource delivery agents 404 running on respective shared computing resources 402, optimize use connections, and/or load-balance use connections. As described in more detail below, a broker service 432 (shown in FIGS. 4B-4D) of the resource delivery controller(s) 412 may interact with the database(s) 420 to track which users are logged on and where, what session resources the users have, and if users need to reconnect to existing applications. In some implementations, the broker service 432 may execute PowerShell commands and communicate with broker agents 456 (shown in FIG. 4D) of the resource delivery agents 404 over transmission control protocol (TCP) port "80." A monitor service 460 (shown in FIG. 4D) may also be provided by the resource delivery controller(s) 412 to collect historical data concerning the operation of the resource delivery controller(s) 412 and write such data to the database(s) 420. In some implementations, such a monitor service 460 may use TCP port "80" or "443."

The resource delivery controller(s) 412 may manage the state of desktops, starting and stopping them based on demand and administrative configuration. In some implementations, the resource delivery controller(s) 412 may also enable the adjustment of user profiles (stored within the database(s) 420) to manage user personalization settings in virtualized or physical Windows environments.

In some implementations, the database(s) 420 may include at least one Microsoft Structured Query Language (SQL) Server database in which configuration and session information may be stored. As noted above, the database(s) 420 may store the data collected and managed by the services that make up the resource delivery controller(s) 412. In some implementations, the database(s) 420 may be provided within a data center of an organization and may have a persistent connection to the resource delivery controller(s) 412. Although not illustrated in FIG. 4A, it should be appreciated that the resource delivery system 400 may also include respective databases associated with the resource manager 414, the resource director 416, and the license manager 418 to store data collected and/or used by those components.

The resource delivery agents 404 may be installed on physical or virtual machines that are made available to deliver applications or desktops to users. The resource delivery agents 404 may enable such machines to register with the resource delivery controller(s) 412. The registration of a machine with the resource delivery controller(s) 412 may cause that machine and the resources it is hosting to be made available to users. The resource delivery agents 404 may establish and manage the connections between the machines on which they are installed and client devices 202. The resource delivery agents 404 may also verify that a license is available for the user and/or session, and may apply policies that are configured for the session.

The resource delivery agents 404 may communicate session information to the broker service 432 (shown in FIGS. 4B-4D) of the resource delivery controller(s) 412 through the broker agents 456 (shown in FIG. 4D) in the resource delivery agents 404. Such broker agents 456 may host multiple plugins and collect real-time data. In some implementations, the broker agents 456 may communicate with the resource delivery controller(s) 412 over TCP port "80." In some implementations, the resource delivery agents 404 may operate with Single-session and/or Multi-session Windows operating systems. The resource delivery agents 404 for Multi-session Windows operating systems may allow multiple users to connect to the server at one time. The resource delivery agents 404 for Single-session Windows operating systems, on the other hand, may allow only one user to connect to the desktop at a time. In some implementations, one or more the resource delivery agents 404 may alternatively operate with a Linux operating system.

When users connect from outside one or more corporate firewalls, e.g., firewalls 426a and 426b shown in FIG. 4A, the gateway 408 may be used to secure such connections with Transport Layer Security (TLS). The gateway 408 may, for example, be a Secure Socket Layer (SLL) Virtual Private Network (VPN) appliance that is deployed in a demilitarized zone (DMZ) 428. The gateway 408 may thus provide a single secure point of access through the corporate firewall 426.

The client access manager 410 of the resource delivery system 400 may authenticate users and manage stores of desktops and/or applications that are available for users to access. In some implementations, the client access manager 410 may provide an application "storefront" for an enterprise, which may provide users with self-service access to the desktops and/or applications that the enterprise opts to make available to them. In some implementations, the client access manager 410 may also keep track of users' application subscriptions, shortcut names, and other data. Tracking such data may, for example, help ensure that users have a consistent experience across multiple devices.

As shown in FIG. 4A, a resource access application 424 may be installed on client devices 202 or other endpoints (such as virtual desktops). Such resource access applications 424 may provide users with quick, secure, self-service access to documents, applications, and/or desktops. The resource access application 424 may, for example, provide on-demand access to Windows, web, and/or Software as a Service (SaaS) applications. The Citrix Workspace™ app, offered by Citrix Systems, Inc., of Fort Lauderdale, Fla., is one example implementation of such a client-based version of the resource access application 424. In some implementations, the resource access application 424 may alternatively operate on a web server (not shown in FIG. 4A) and may be accessed using a web browser (also not shown in FIG. 4A) installed on the client device 202. In some embodiments, for example, the resource access application 424 may be provided as a hypertext markup language 5 (HTML-5) service and may be accessed using an HTML-5-compatible web browser. The Citrix Workspace™ app for HTML-5, offered by Citrix Systems, Inc., of Fort Lauderdale, Fla., is one example implementation of such a web-based version of the resource access application 424.

In some embodiments, the resource access application 424 may intercept network communications from a network stack used by the one or more applications. For example, the resource access application 424 may intercept a network communication at any point in a network stack and redirect the network communication to a destination desired, managed, and/or controlled by the resource access application 424, for example, to intercept and redirect a transport layer connection to an IP address and port controlled and/or managed by resource access application 424. The resource access application 424 may thus, in some embodiments, transparently intercept any protocol layer below the transport layer, such as the network layer, and any protocol layer above the transport layer, such as the session, presentation, or application layers. The resource access application 424 may, for example, interface with the transport layer to secure, optimize, accelerate, route, and/or load-balance any communications provided via any protocol carried by the transport layer.

In some embodiments, the resource access application 424 may be implemented as an Independent Computing Architecture (ICA) client developed by Citrix Systems, Inc. The resource access application 424 may perform acceleration, streaming, monitoring, and/or other operations. For example, the resource access application 424 may accelerate streaming an application from a shared computing resource 402 running a resource delivery agent 404 to the client device 202. The resource access application 424 may also perform endpoint detection/scanning and/or collect endpoint information about the client 202. For example, the resource access application 424 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The resource manager 414 shown in FIG. 4A, may provide a console from which the configuration and management of applications and desktops that are to be made available to users may be controlled. The Studio component of the Citrix Virtual Apps and Desktops™ system offered by Citrix Systems, Inc., of Fort Lauderdale, Fla., is one example implementation of the resource manager 414. In some implementations, the resource manager 414 may eliminate the need for separate management consoles for managing delivery of applications and desktops. In some embodiments, the resource manager 414 may provide one or more wizards to guide system administrators through environment setup, creating workloads to host applications and desktops, and assigning applications and desktops to users. In some implementations, the resource manager 414 may also be used to allocate and track licenses for the resource delivery system 400. In some embodiments, the resource manager 414 may get the information it displays from the broker service 432 of the resource delivery controller(s) 412, e.g., communicating over TCP port "80."

The resource director 416 may, for example, be a web-based tool that enables IT support and help desk teams to monitor an environment, troubleshoot issues before they become system-critical, and perform support tasks for end users. The Director component of the Citrix Virtual Apps and Desktops™ system offered by Citrix Systems, Inc., of Fort Lauderdale, Fla., is one example implementation of the resource director 416. In some implementations, a single deployment of the resource director 416 may be used to connect to and monitor multiple resource delivery systems 400, such as that shown in FIG. 4A. Examples of information that may be displayed by the resource director 416 include (A) real-time session data from the broker service 432 of the resource delivery controller(s) 412, which may include data the broker service 432 gets from the broker agent 456 in the resource delivery agents 404, and (B) historical data about the resource delivery system 422 that may be received, for example, from the monitor service 460 in the resource delivery controller(s) 412. In some implementations, the resource director 416 may use performance and heuristics data captured by the gateway 408 (described below) to build analytics from the data and then presents such analytics to system administrators. Further, in some implementations, the resource director 416 may allow system administrators to view and interact with a user's sessions, e.g., using Windows Remote Assistance.

The license manager 418, as its name implies, may enable the management of licenses within the resource delivery system 400. In some implementations, the license manager 418 may communicate with the resource delivery controller(s) 412 to manage licensing for a user's session and with the resource manager 414 to allocate license files.

As noted above, in some implementations, the shared computing resources 402 shown in FIG. 4A may include one or more virtual machines. These can be virtual machines that are used to host applications and/or desktops, as well as virtual machines that are used to host the other components of the resource delivery system 400. In some implementations, a hypervisor may be installed on a host computer to run the hypervisor and hosting virtual machines.

Although not depicted in FIG. 4A, in some implementations, the resource delivery system 400 may additionally include a performance monitoring service or agent. In some embodiments, one or more dedicated servers (or a dedicated service in a cloud-based environment) may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., as a part of the resource access application 424), one or more servers 204, or one or more other system component(s). In general, the monitoring agents may execute transparently (e.g., in the background) to any application and/or user of the device. In some embodiments, such a monitoring agent may be implemented as components of Citrix Analytics™ by Citrix Systems, Inc., of Fort Lauderdale, Fla.

The monitoring agents may, for example, monitor, measure, collect, and/or analyze data on a frequency (e.g., a predetermined frequency), based upon an occurrence of given event(s), or in real time during operation of the resource delivery system 400. The monitoring agents may, for example, monitor resource consumption and/or performance of hardware, software, and/or communications resources of the clients 202, the gateway 408 (and/or any other components in the DMZ 428), and/or the resource delivery controller(s) 412, the shared computing resources 402, the resource delivery agents 404, or any other components shown in FIG. 4A. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

Figure 4B:
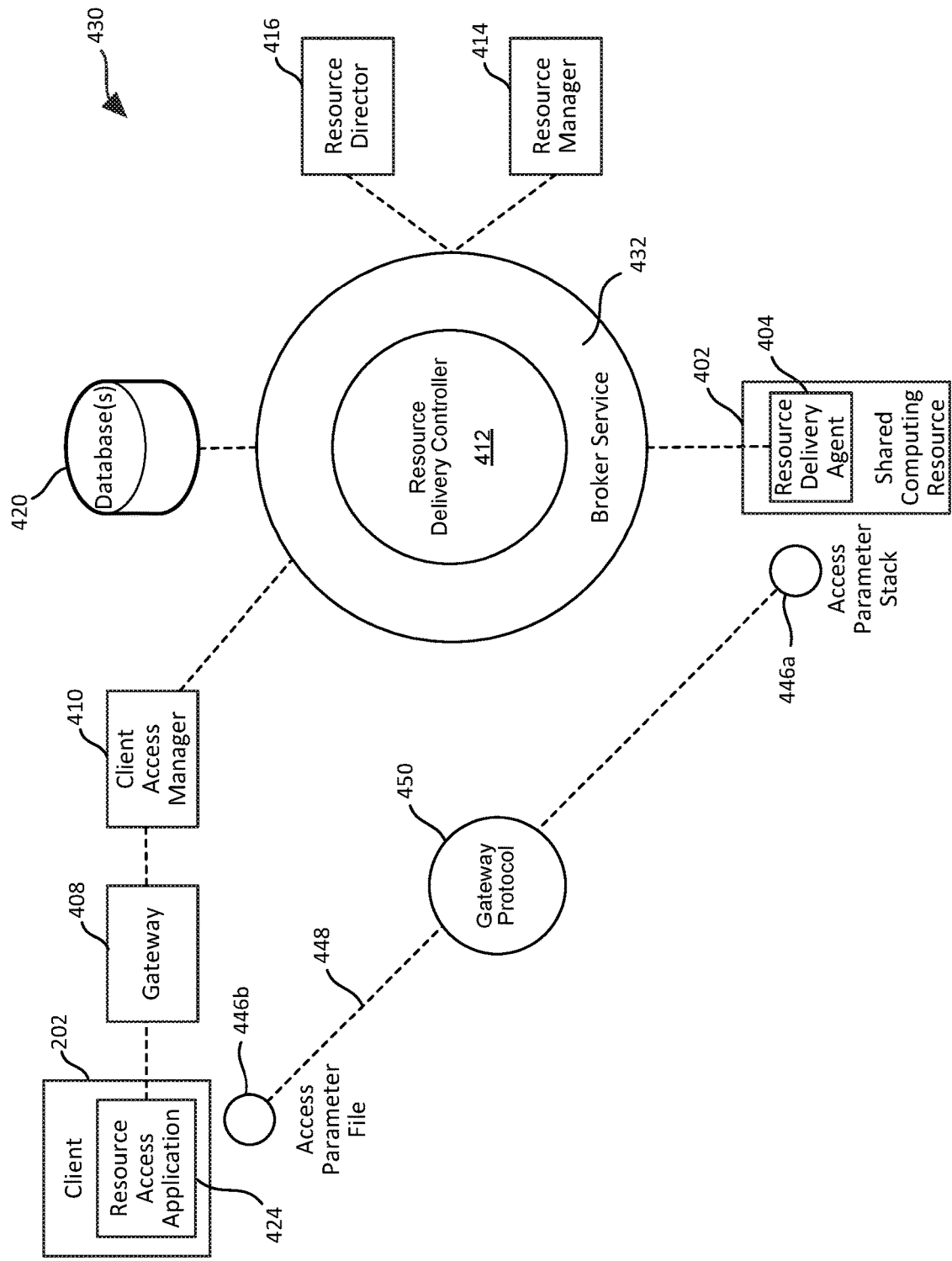
FIG. 4B illustrates an example deployment of a resource delivery system such as that shown in FIG. 4A.

The monitoring agents may provide application performance management for the resource delivery system 400. For example, based upon one or more monitored performance conditions or metrics, the resource delivery system 400 may be dynamically adjusted, for example periodically or in real-time, to optimize application delivery by the resource delivery agents 404 to the clients 202 based upon network environment performance and conditions FIG. 4B illustrates an example deployment 430 of a resource delivery system 400, such as that shown in FIG. 4A. Such a deployment may be referred to as a "Site." A Site may be made up of machines with dedicated roles that allow for scalability, high availability, and failover, and may provide a solution that is secure by design. As discussed above, such a Site may include servers and/or desktop machines installed with resource delivery agents 404, and one or more resource delivery controller(s) 412, which may manage access to such servers/machines. FIG. 4B illustrates one such resource delivery agent 404, and one such resource delivery controller 412. As shown in FIG. 4B, the resource delivery controller 412 may include a broker service 432. The resource delivery agent 404 may enable users to connect to desktops and/or applications. It may be installed on server or desktop machines in a datacenter for most delivery methods, but it may also be installed on physical personal computers (PCs) for Remote PC Access. In some implementations, the resource delivery controller 412 may be made up of independent Windows services that may manage resources, applications, and/or desktops, and may optimize and balance user connections.

In some embodiments, client devices 202 may not directly access the resource delivery controller 412. Instead, the resource delivery agent 404 and the client access manager 410 may serve as intermediaries between client devices 202 and the resource delivery controller 412. When users log on using the client access manager 410, their credentials may pass through to the broker service 432 on the resource delivery controller 412. The broker service 432 may then obtain profiles and available resources based on the policies set for them.

Figure 4C:
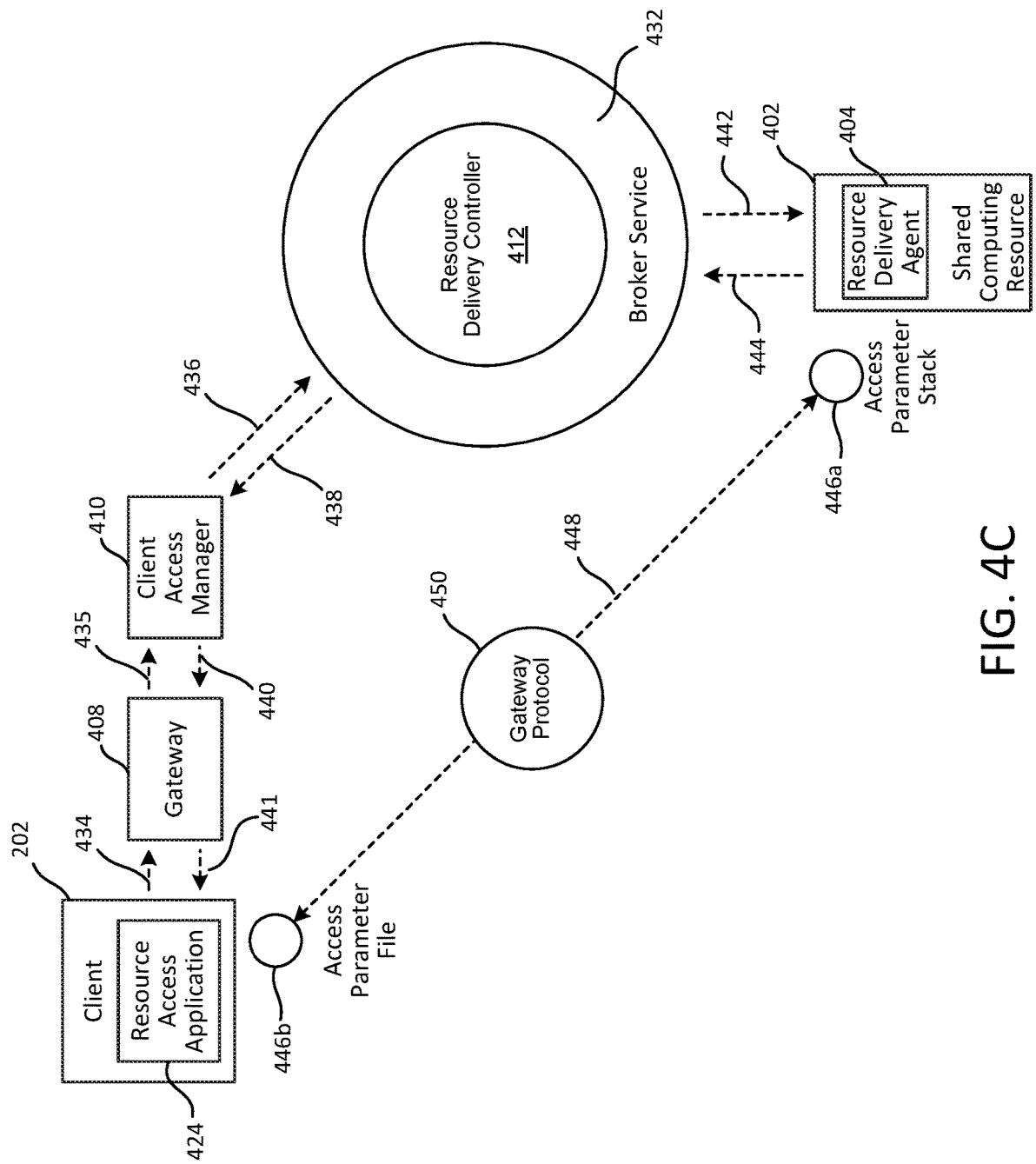
FIG. 4C illustrates an example process for handling user connections within the deployment shown in FIG. 4B.

FIG. 4C illustrates an example process for handling user connections within the deployment 430 shown in FIG. 4B. As indicated by arrows 434 and 435, to start a session, a user may cause the client device 202 to connect (via the gateway 408) to the client access manager 410. Such a connection may, for example, be established using the resource access application 424. As noted above, the resource access application 424 may either be installed on the client device 202 or accessible from a web server via a web browser on the client device 202.

As indicated by arrow 436, the user's credentials may then move through this pathway to access the broker service 432 of resource delivery controller 412. In some implementations, such communications may be encrypted to protect the security of such credentials. The broker service 432 may determine which desktops and/or applications the user is allowed to access. After the credentials have been verified, information about available applications and/or desktops may be sent back to the client device 202 through the pathway between the client access manager 410 and the resource access application 424, as indicated by arrows 438, 440, and 441. The user of the client device 202 may thus be provided with a list of available applications and/or desktops. When the user selects an application or desktop from this list, an indication of the selected resource goes back down the previously described pathway to the resource delivery controller 412. The resource delivery controller 412 may then select an appropriate resource delivery agent 404 to host the selected applications or desktop.

As indicated by arrow 442, the resource delivery controller 412 may send a message to the selected resource delivery agent 404 with the user's credentials, and may then send pertinent data about the user and the connection to the resource delivery agent 404. The resource delivery agent 404 may then accept the connection and, as indicated by arrows 444, 438, 440, and 441, may send a set of access parameters (stored in an access parameter stack 446a) back through the same pathways to the resource access application 424. In particular, the set of access parameters may be collected by the client access manager 410 and then sent to the resource access application 424 where they may be stored as an access parameter file 446b. In some implementations, the access parameter file 446b may be created as part of a protocol conversation between the client access manager 410 and the resource access application 424. In other implementations, the client access manager 410 may convert the access parameters to the file 446b, and that file 446b may then be downloaded to the client device 202. In some implementations, the access parameters may remain encrypted throughout this process.

The access parameter file 446b that is then stored on the client device 202 may be used to establish a direct connection 448 between the client device 202 and the access parameter stack 446a running on the resource delivery agent 404. As illustrated, the connection 448 between the client device 202 and the resource delivery agent 404 may use a gateway protocol 450. In some implementations, the gateway protocol 450 may include a feature that enables the client device 202 to immediately reconnect to the resource delivery agent 404 if the connection 448 is lost, rather than having to relaunch through the management infrastructure (including the client access manager 410, the resource delivery controller 412, etc.).

After the client device 202 connects to the resource delivery agent 404, the resource delivery agent 404 may notify the resource delivery controller 412 that the user is logged on. The resource delivery controller 412 may then send this information to the database(s) 420 (shown in FIGS. 4A, 4B and 4D) and the monitor service 460 (shown in FIG. 4D) of the delivery controller 412 may also start logging data in the database(s) 420.

Figure 4D:
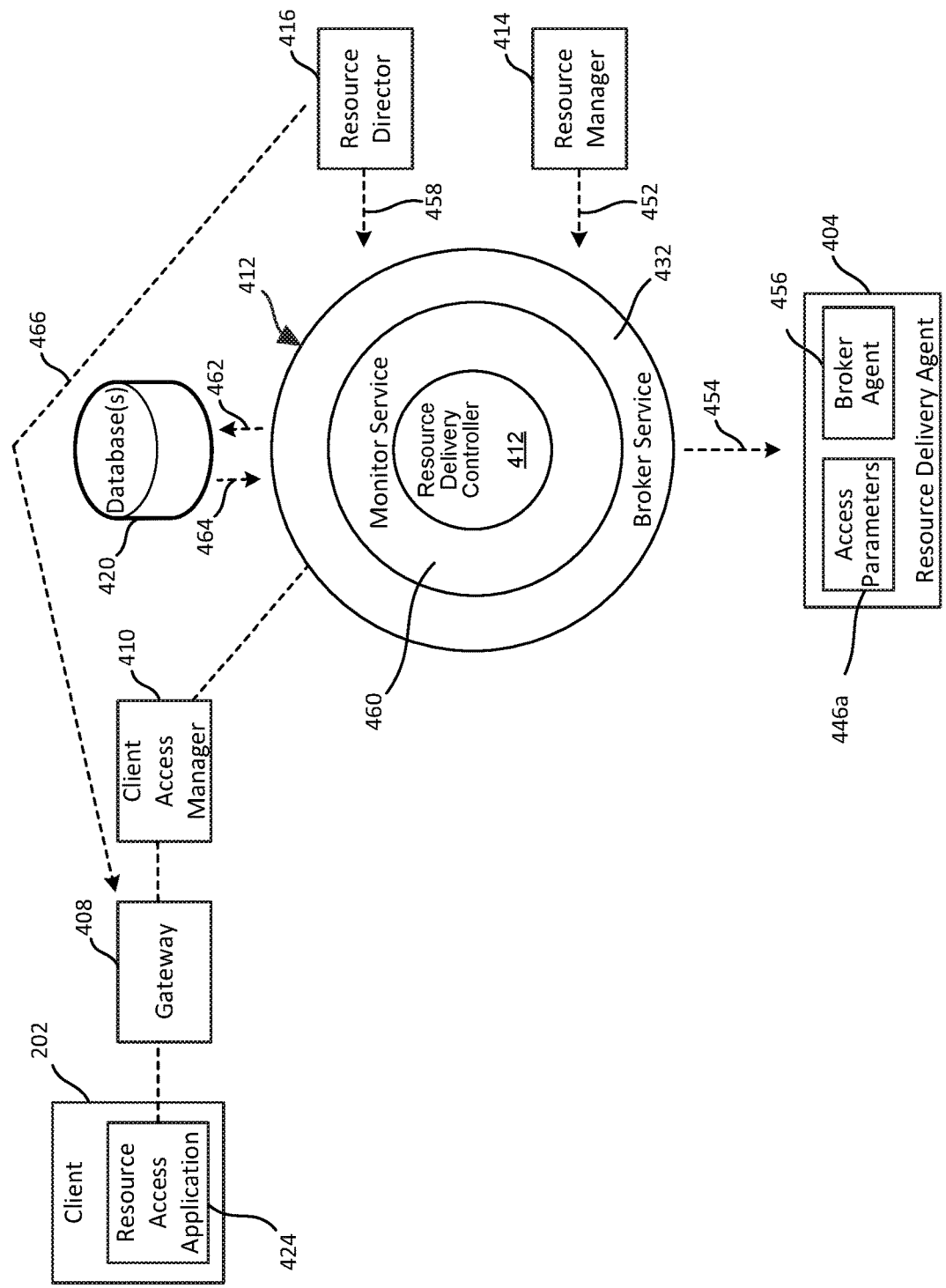
FIG. 4D shows examples of paths through which the resource manager and the resource director shown in FIG. 4B may access stored data.

Such sessions between client devices 202 and resource delivery agents 404 produce data that system administrators can access through the resource manager 414 and/or the resource director 416. FIG. 4D shows examples of paths through which the resource manager 414 and the resource director 416 may access such data in some embodiments. As indicated by the arrows 452 and 454, administrators may use the resource manager 414 to access real-time data from the broker agent 456 of a resource delivery agent 404 (via the broker service 432 of the resource delivery controller 412). The resource director 416 may access the same data, as indicated by arrows 458 and 454, plus any historical data the monitor service 460 of the resource delivery controller 412 stores in the database(s) 420, as indicated by arrows 458, 462 and 464. Further, as indicated by arrow 466, the resource director 416 may also access data from the gateway 408 for help desk support and troubleshooting.

Within the resource delivery controller 412, the broker service 432 may report session data for every session on the machine providing real-time data. The monitor service 460 may also track the real-time data and store it as historical data in the database(s) 420. In some implementations, the resource manager 414 may communicate with the broker service 432 and may access real-time data. The resource director 416 may communicate with the broker service 432 to access the database(s) 420.

An example process for enabling the delivery of applications and/or desktops will now be described. First, the machines that are to deliver applications and/or desktops may be set up with "Machine Catalogs." Then, "Delivery Groups" may be created that specify the applications and/or desktops that are to be made available (using machines in the Machine Catalogs), and which users can access them. In some implementations, "Application Groups" may also be created to manage collections of applications.

Machine Catalogs are collections of virtual or physical machines that can be managed as a single entity. These machines, and the application and/or virtual desktops on them, are the resources that may be made available to users. All the machines in a Machine Catalog may have the same operating system and the same resource delivery agent 404 installed. They may also have the same applications and/or virtual desktops.

In some implementations, a master image may be created and used to create identical virtual machines in the catalog. For virtual machines, the provisioning method may be specified for the machines in that catalog. Valid machine types may, for example, include "Multi-session OS," "Single-session OS," and "Remote PC access." A Multi-session OS machine is a virtual or physical machine with a multi-session operating system. Such a machine may be used to deliver published applications (also known as server-based hosted applications) and published desktops (also known as server-hosted desktops). These machines may allow multiple users to connect to them at one time. A Single-session OS machine is a virtual or physical machine with a single-session operating system. Such a machine may be used to deliver Virtual Desktop Infrastructure (VDI) desktops (desktops running single-session OSs that can optionally be personalized), virtual machine (VM)-hosted apps (applications from single-session OSs), and hosted physical desktops. Only one user at a time can connect to each of these desktops. A Remote PC access machine may enable remote users to access their physical office PCs from any device running the resource access application 424.

Delivery Groups may specify which users can access which applications and/or desktops on which machines. Delivery Groups may include machines from the Machine Catalogs, and Active Directory users who have access to the Site. In some implementations, users may be assigned to Delivery Groups by their Active Directory group, because Active Directory groups and Delivery Groups are ways to group users with similar requirements.

Delivery Groups may contain machines from more than one Machine Catalog, and Machine Catalogs may contribute machines to more than one Delivery Group. In at least some implementations, however, individual machines can only belong to one Delivery Group at a time.

The specific resources that users in the Delivery Group can access may be defined. For example, to deliver different applications to different users, all of the applications may be installed on the master image for one Machine Catalog and enough machines may be created in that catalog to distribute among several Delivery Groups. Delivery Groups may then be configured to deliver a different subset of applications that are installed on the machines.

Application Groups may provide application management and resource control advantages over using more Delivery Groups. Using a "tag restriction" feature, existing machines may be used for more than one "publishing" task, saving the costs of deployment and managing additional machines. A tag restriction can be thought of as subdividing (or partitioning) the machines in a Delivery Group. Application Groups may also be helpful when isolating and troubleshooting a subset of machines in a Delivery Group.

"Tags" may be strings that identify items such as machines, applications, desktops, Delivery Groups, Application Groups, and policies. After creating a tag and adding it to an item, certain operations may be tailored to apply to only items that have a specified tag.

In some implementations, tags may be used to tailor search displays is the resource manager 414. For example, to display only applications that have been optimized for evaluation, a tag named "evaluate" may be created and may then be added (applied) to those applications. A search performed by the resource manager 414 may then be filtered with the tag "evaluate".

In some implementations, tags may be used to "publish" applications from an Application Group or specific desktops from a Delivery Group, considering only a subset of the machines in selected Delivery Groups. Using an Application Group or desktops with a tag restriction may be helpful when isolating and troubleshooting a subset of machines in a Delivery Group.

In some implementations, tags may be used to schedule periodic restarts for a subset of machines in a Delivery Group. Using a tag restriction for machines may, for example, enable the use of new PowerShell cmdlets to configure multiple restart schedules for subsets of machines in a Delivery Group.

In some implementations, tags may be used to tailor the application (assignment) of particular policies to a subset of machines in Delivery Groups, Delivery Group types, or organizational units (OUs) of a Site that have (or do not have) a specified tag. For example, if a particular policy is to be applied only to the more powerful workstations, a tag named "high power" may be applied to those machines and the policy may be set to apply to only machines to which the high power tag has been applied. Tags may additionally or alternatively be applied to particular Delivery Groups and one or more policies may be set to apply only the Delivery Groups to which such tags have been applied.

In some embodiments, the resource manager 414 may be used to create or edit a tag restriction for a desktop in a shared Delivery Group or an Application Group. In some implementations, creating such a tag restriction may involve several steps. First, a tag may be created and then added (applied) to one or more machines. Second a group may be created or edited to include the tag restriction, thus restricting launches to machines with the applied tag. A tag restriction may extend the machine selection process of the broker service 432. In particular, the broker service 432 may select a machine from an associated Delivery Group subject to access policy, configured user lists, zone preference, and launch readiness, plus the tag restriction (if present). For applications, the broker service 432 may fall back to other Delivery Groups in priority order, applying the same machine selection rules for each considered Delivery Group.

Figure 4E:
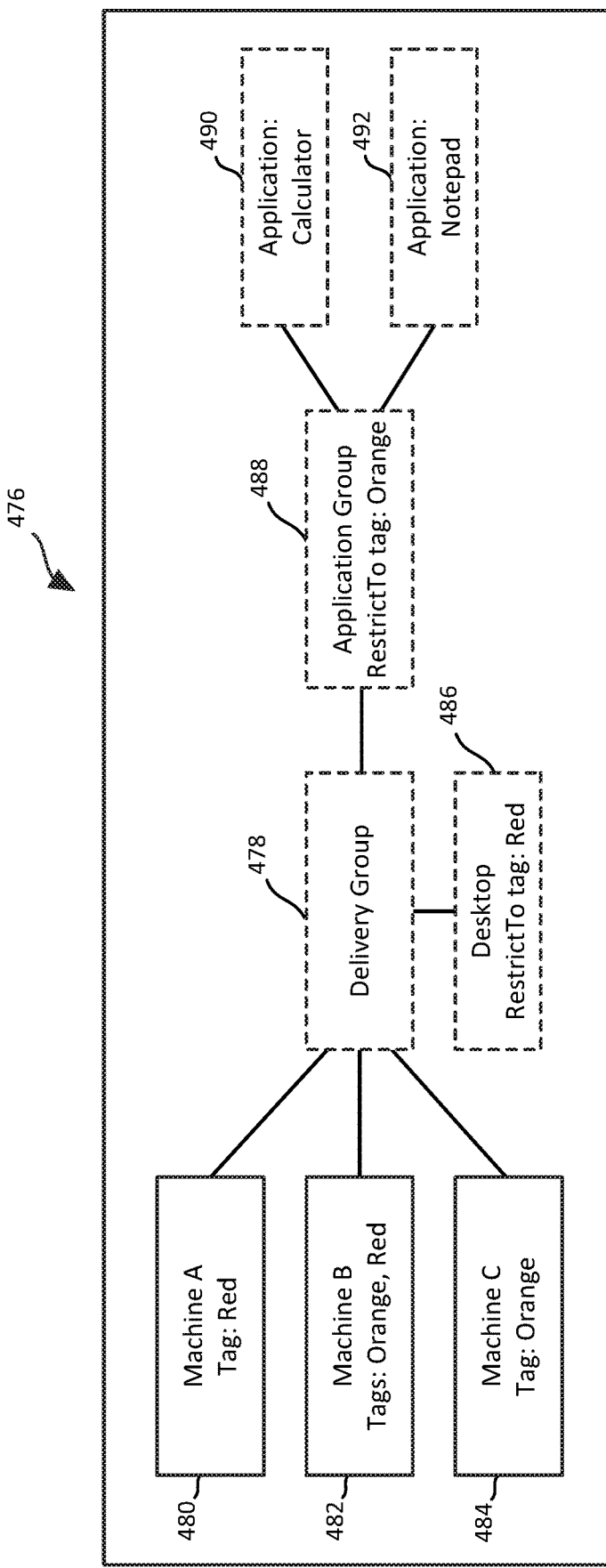
FIG. 4E illustrates a simple layout of a resource delivery system in which tag restrictions may be used to limit which machines will be considered for certain desktop and application launches.

FIG. 4E illustrates a simple layout in which tag restrictions may be used to limit which machines will be considered for certain desktop and application launches. In the illustrated example, a site 476 has one shared Delivery Group 478 configured with three machines 480, 482, 484 and one published desktop 486, and one Application Group 488 configured with two applications 490, 492. As shown, tags may be added to the three machines 480, 482, 484. A tag restriction named "Red" has been applied to the published desktop 486 in the shared Delivery Group 478, so that the published desktop 486 can be launched only on machines in that Delivery Group 478 that have the tag "Red," i.e., the machines 480 and 482. A tag restriction named "Orange" has been applied to the Application Group 488, so that its applications 490, 492 (Calculator and Notepad) can be launched only on machines in the Delivery Group 478 that have the tag "Orange," i.e., the machines 482 and 484. Since the machine 482 has both tags (Red and Orange), it can be considered for launching the applications 490, 492 and the desktop 486.

In some implementations, tags may be created, added (applied), edited, and/or deleted from selected items using the resource manager 414. Tag restrictions may, for example, be configured when creating or editing desktops in Delivery Groups and/or when creating or editing Application Groups.

As noted above, the resource delivery system 400 described in connection with FIGS. 4A-4E may provide virtualization solutions that give administrators control of virtual machines, applications, and security while providing anywhere access for any device. As was also noted above, the resource delivery system 400 may also enable end users to access applications and desktops independently of the operating systems and interfaces of the client devices 202 such end users are operating.

Figure 4F:
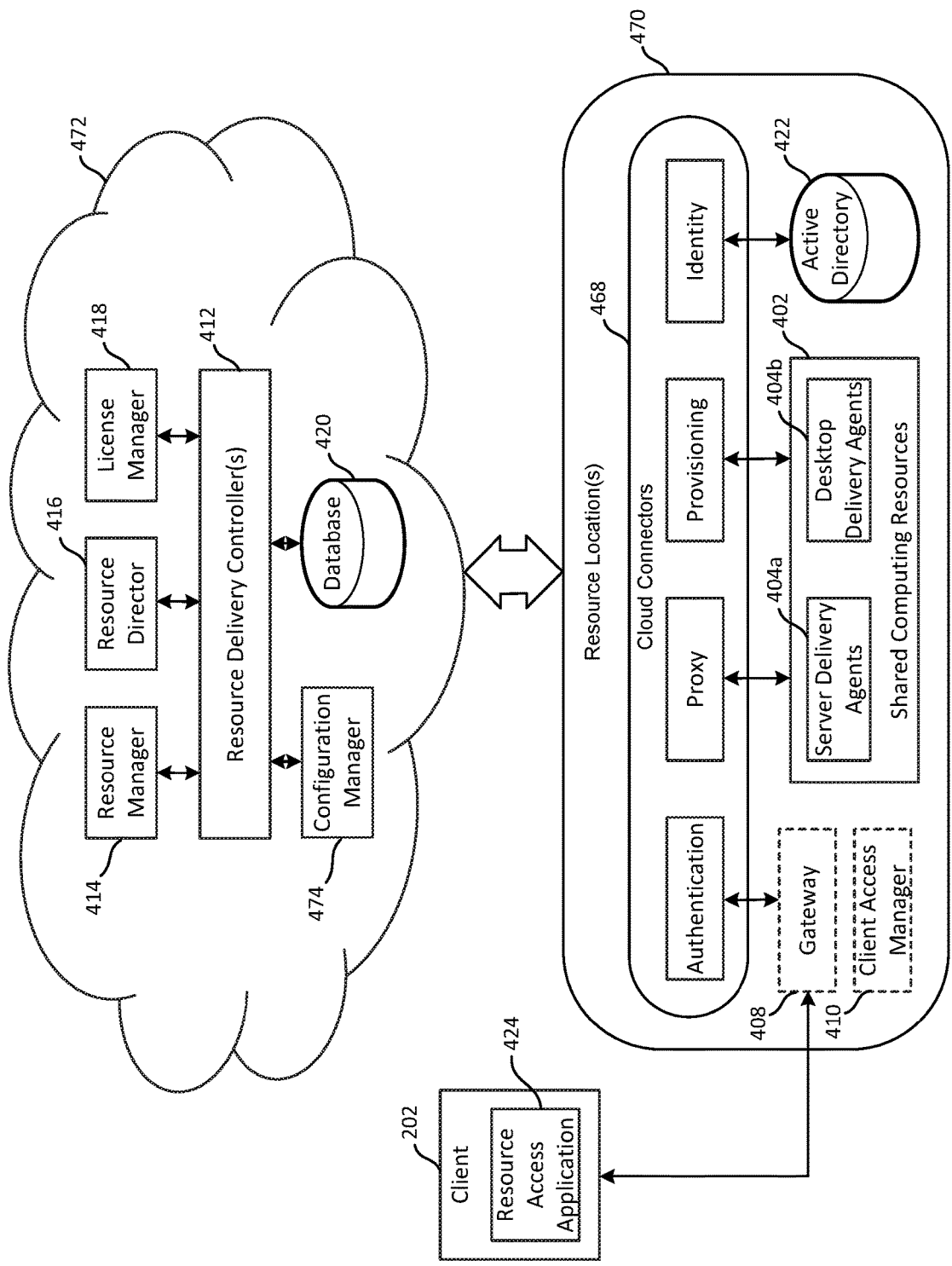
FIG. 4F is a block diagram of a resource delivery system similar to the shown in FIG. 4A but in which several elements are provided as a service within a cloud-based computing environment.

In some implementations, one or more components of the resource delivery system 400 may be provided as a service within a cloud-based computing environment. FIG. 4F illustrates an example of such an implementation. As shown in FIG. 4F, one or more cloud connectors 468 may enable various resources at one or more locations 470 outside of a cloud computing environment 472 to interface with various components within the cloud computing environment 472. As illustrated, resource location(s) 470 may include the machines and other resources that deliver applications and/or desktops to client devices 202. The resource location 470 may optionally include the gateway 408 and/or client access manager 410 previously described. In the illustrated example, the resource delivery controller(s) 412, the resource manager 414, the resource director 416, the license manager 418, and the database(s) 420 are all provided within the cloud computing environment 472. Further, as shown in FIG. 4F, a configuration manager 474 may additionally be hosted within the cloud computing environment 472 in some implementations. Examples of management functions that may be performed by the configuration manager 474 are described below. In some implementations, the cloud computing environment 472 may correspond to a public cloud computing infrastructure, such as AZURE CLOUD provided by Microsoft Corporation of Redmond, Wash., or AMAZON WEB SERVICES provided by Amazon.com, Inc., of Seattle, Wash.

In addition to serving as a channel for communication between the cloud computing environment 472 and the resource location(s) 470, the cloud connectors 468 may enable cloud management without requiring any complex networking or infrastructure configuration such as virtual private networks (VPNs) or Internet Protocol Security (IPsec) tunnels.

As noted above, the resource delivery controller(s) 412 may serve as the central control layer component in a deployment. The resource delivery controller(s) 412 may communicate through the cloud connectors 468 in each resource location 470 to distribute applications and/or desktops, authenticate and manage user access, broker connections between users and their virtual desktops and/or applications, optimize use connections, and/or load-balance use connections. In some implementations, the resource delivery controller(s) 412 may additionally track which users are logged on and where, which session resources the users have, and if users need to reconnect to existing applications. The resource delivery controller(s) 412 may further manage the state of desktops, starting and stopping them based on demand and administrative configuration, in some implementations.

The configuration manager 474 in the cloud computing environment 472 may (A) enable administrators to specify which services are to be made available to users via the resource access application, (B) customize the uniform resource locator (URL) that the resource access application 424 is to use to access the available resources, (C) customize the appearance of the user interface provided by the resource access application, such as logos, color, and preferences, (D) specify how users are to authenticate to the system, such as using the Active Directory 422, and/or (E) specify external connectivity for the resource locations 470.

As noted above, a resource location 470 may include at least one cloud connector 468 that serves as the communications channel between the components in the cloud computing environment 472 and the components in the resource location 470. In the resource location 470, the cloud connector(s) may act as a proxy for the resource delivery controller(s) 412 in the cloud computing environment 472.

As noted above, the physical or virtual machines that deliver applications and/or desktops may include resource delivery agents 404a, 404b. The resource delivery agents 404 may register with at least one cloud connector 468. After registration, connections may be brokered from those resources to users. The resource delivery agents 404 may further establish and manage the connection between the machine and the client device 202, and apply policies that are configured for the session. The resource delivery agents 404 may communicate session information to the cloud connector 468 through the broker agent 456 (shown in FIG. 4D) in the resource delivery agent 404. As noted above, in some implementations, such a broker agent 456 may host multiple plugins and collect real-time data.

A host connection may be established that enables communication between components in the cloud computing environment 472 and the resource delivery agents 404 on the shared computing resources 402. Specifications for such host connections may include (A) the address and credentials to access the host, (B) the tool that is to be used to create VMs, (C) the storage method to use, (D) the machines to use for storage, and/or (E) which network the VMs will use.

E. Example Architecture of a Resource Virtualization Server

Figure 5:
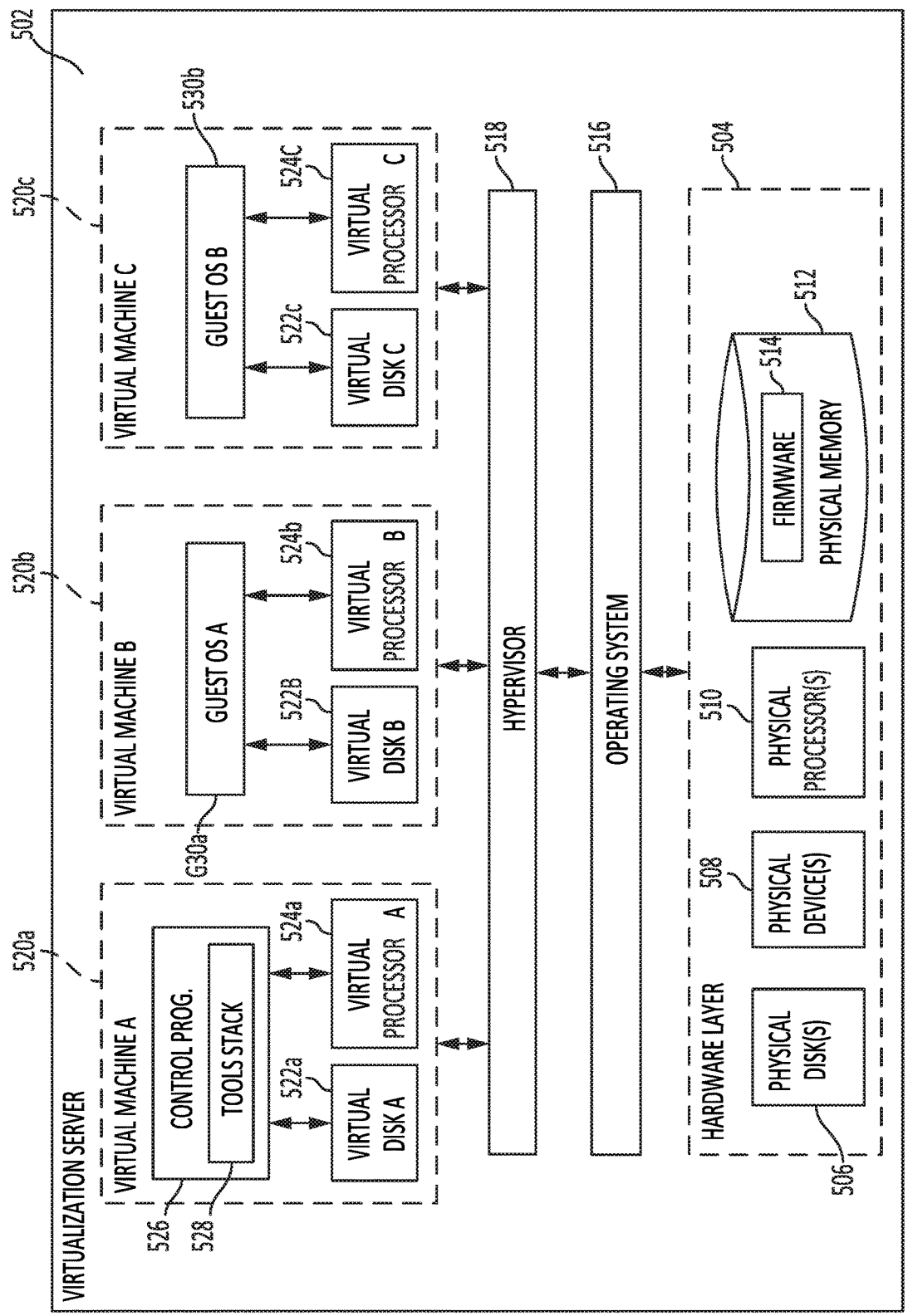
FIG. 5 depicts an example virtualized (hypervisor) system architecture that may be used in accordance with one or more embodiments described herein.

FIG. 5 shows an example architecture of an illustrative resource virtualization server 502. As shown, the resource virtualization server 502 may be configured to provide virtual desktops and/or virtual applications to one or more client access devices, such as the clients 202. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Instances of the operating system may be physical (e.g., one operating system per physical device) or virtual (e.g., many instances of an OS running on a single physical device). The applications may be executed on a local device, or executed on a remotely located device (e.g., remoted).

The virtualization server 502 illustrated in FIG. 5 may be deployed as and/or implemented by one or more of the servers 204 described above, the servers that make up a virtualization server system, or by other known computing devices. Included in the virtualization server 502 is a hardware layer 504 that may include one or more physical disks 506, one or more physical devices 508, one or more physical processors 510, and one or more physical memories 512. In some embodiments, firmware 514 may be stored within a memory element in physical memory 512 and be executed by one or more of the physical processors 510. The virtualization server 502 may further include an operating system 516 that may be stored in a memory element in physical memory 512 and executed by one or more of physical processors 510. Still further, a hypervisor 518 may be stored in a memory element in the physical memory 512 and be executed by one or more of the physical processors 510. Presence of the operating system 516 may be optional such as in a case where the hypervisor 518 is a Type 1 hypervisor; that is, a bare-metal hypervisor installed directly on the hardware layer 504. In some implementations, the hypervisor 518 may be a Type 2 hypervisor, which executes on a host operating system, such as the OS 516, which may provide virtualization services such as I/O device support and memory management.

Executing on one or more of the physical processors 510 may be one or more virtual machines 520*a-c* (generally 520). The virtual machines 520 may have respective virtual disks 522*a-c* and virtual processors 524*a-c*. In some embodiments, a first virtual machine 520*a* may execute, using the virtual processor 524*a*, a control program 526 that includes a tools stack 528. The control program 526 may be referred to as a control virtual machine, Domain 0, Dom0, or other virtual machine used for system administration and/or control. In some embodiments, one or more of the virtual machines 520*b-c* may execute, using a virtual processor 524*b-c*, a guest operating system 530*a-b* (generally 530).

The physical devices 508 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 502. The physical memory 512 in hardware layer 504 may include any type of memory. The physical memory 512 may store data, and in some embodiments may store one or more programs, or set of executable instructions. FIG. 5 illustrates an embodiment where firmware 514 is stored within physical memory 512 of virtualization server 502. Programs or executable instructions stored in physical memory 512 may be executed by the one or more of the processors 510 of the virtualization server 502.

The virtualization server 502 may also include hypervisor 518. In some embodiments, the hypervisor 518 may be a program executed by processors 510 on the virtualization server 502 to create and manage any number of virtual machines 520. The hypervisor 518 may be referred to as a virtual machine monitor, or platform virtualization software. In some embodiments, the hypervisor 518 may be any combination of executable instructions and hardware that monitors virtual machines 520 executing on a computing machine. The hypervisor 518 may be a Type 2 hypervisor, where the hypervisor executes within operating system 516 executing on virtualization server 502. The virtual machines may then execute at a layer above hypervisor 518. In some embodiments, the Type 2 hypervisor may execute within the context of a user's operating system such that the Type 2 hypervisor interacts with the user's operating system. In other embodiments, one or more virtualization servers 502 in a virtualization environment may instead include a Type 1 hypervisor (not shown). A Type 1 hypervisor may execute on the virtualization server 502 by directly accessing the hardware and resources within hardware layer 504. That is, while the Type 2 hypervisor 518 accesses system resources through host operating system 516, as shown, a Type 1 hypervisor may directly access all system resources without host operating system 516. A Type 1 hypervisor may execute directly on one or more physical processors 510 of the virtualization server 502, and may include program data stored in the physical memory 512.

The hypervisor 518, in some embodiments, may provide virtual resources to the guest operating systems 530 or control programs 526 executing on virtual machines 520 in any manner that simulates the operating systems 530 or control programs 526 having direct access to system resources. System resources may include, but are not limited to, the physical devices 508, the physical disks 506, the physical processors 510, physical memory 512, and any other component included in the hardware layer 504 of the virtualization server 502. The hypervisor 518 may be used to emulate virtual hardware, partition physical hardware, virtualize physical hardware, and/or execute virtual machines that provide access to computing environments. In still other embodiments, the hypervisor 518 may control processor scheduling and memory partitioning for the virtual machine 520 executing on the virtualization server 502. Examples of hypervisor 518 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, the virtualization server 502 may execute a hypervisor 518 that creates a virtual machine platform on which the guest operating systems 530 may execute. In these embodiments, the virtualization server 502 may be referred to as a host server. An example of such a virtualization server is Citrix Hypervisor® provided by Citrix Systems, Inc., of Fort Lauderdale, Fla.

The hypervisor 518 may create one or more virtual machines 520b-c (generally 520) in which guest operating systems 530 execute. In some embodiments, the hypervisor 518 may load a virtual machine image to create a virtual machine 520. The virtual machine image may refer to a collection of data, states, instructions, etc. that make up an instance of a virtual machine. In other embodiments, the hypervisor 518 may execute guest operating system 530 within the virtual machine 520. In still other embodiments, the virtual machine 520 may execute the guest operating system 530.

In addition to creating the virtual machines 520, the hypervisor 518 may control the execution of at least one virtual machine 520. In other embodiments, the hypervisor 518 may present at least one virtual machine 520 with an abstraction of at least one hardware resource provided by the virtualization server 502 (e.g., any hardware resource available within hardware layer 504). In other embodiments, the hypervisor 518 may control the manner in which the virtual machines 520 access physical processors 510 available in the virtualization server 502. Controlling access to the physical processors 510 may include determining whether the virtual machine 520 should have access to the processor 510, and how physical processor capabilities are presented to the virtual machine 520.

As shown in FIG. 5, the virtualization server 502 may host or execute one or more virtual machines 520. A virtual machine 520 may be a set of executable instructions and/or user data that, when executed by processor 510, may imitate the operation of a physical computer such that the virtual machine 520 may execute programs and processes much like a physical computing device. While FIG. 5 illustrates an embodiment where the virtualization server 502 hosts three virtual machines 520, in other embodiments the virtualization server 502 may host any number of virtual machines 520. The hypervisor 518, in some embodiments, may provide the virtual machines 520 with unique virtual views of the physical hardware, including the memory 512, the processor 510, and other system resources 506, 508 available to the respective virtual machines 520. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 518 may create one or more unsecure virtual machines 520 and one or more secure virtual machines 520. The unsecure virtual machines 520 may be prevented from accessing resources, hardware, memory locations, and programs that the secure virtual machines 520 may be permitted to access. In other embodiments, the hypervisor 518 may provide the virtual machines 520 with substantially similar virtual views of the physical hardware, memory, processor, and other system resources available to the virtual machines 520.

The virtual machines 520 may include respective virtual disks 522a-c (generally 522) and virtual processors 524a-c (generally 524.) The virtual disk 522, in some embodiments, may be a virtualized view of one or more physical disks 506 of the virtualization server 502, or a portion of one or more physical disks 506 of the virtualization server 502. The virtualized view of the physical disks 506 may be generated, provided, and managed by the hypervisor 518. In some embodiments, the hypervisor 518 may provide the virtual machines 520 with unique views of the physical disks 506. Thus, in these embodiments, a particular virtual disk 522 included in a respective virtual machine 520 may be unique when compared with other virtual disks 522.

The virtual processor 524 may be a virtualized view of one or more physical processors 510 of the virtualization server 502. In some embodiments, the virtualized view of physical processors 510 may be generated, provided, and managed by the hypervisor 518. In some embodiments, the virtual processor 524 may have substantially all of the same characteristics of at least one physical processor 510. In other embodiments, the virtual processor 510 may provide a modified view of the physical processors 510 such that at least some of the characteristics of the virtual processor 524 are different from the characteristics of the corresponding physical processor 510.

Figure 6:
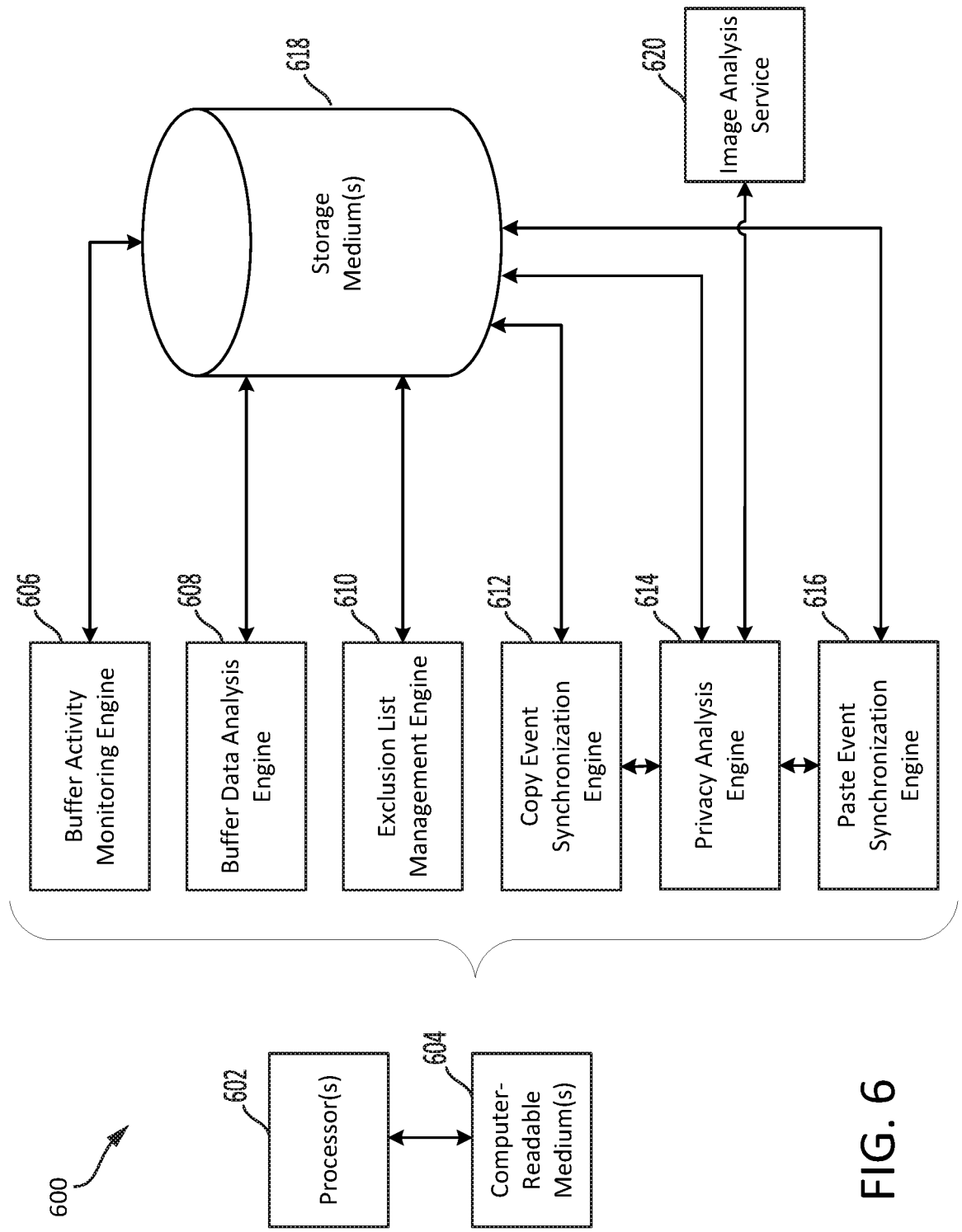
FIG. 6 shows example components of a system for synchronizing computing environment buffers that is configured in accordance with some embodiments of the present disclosure.

F. Detailed Description of Example Embodiments of the System for Synchronizing Computing Environment Buffers Introduced in Section A FIG. 6 is a block diagram showing example components of a buffer data synchronization system 600 that may be used to implement at least some the functionality described above in connection with FIGS. 1A and 1B. As shown, the system 600 may include one or more processors 602, one or more computer-readable mediums 604 that are encoded with instructions to be executed by the processor(s) 602, and one or more storage mediums 618. In some implementations, such instructions may cause the processor(s) 602 to implement one or more, or possibly all, of the functional engines shown in FIG. 6. As shown, those functional engines may include a buffer activity monitoring engine 606, a buffer data analysis engine 608, an exclusion list management engine 610, a copy event synchronization engine 612, a privacy analysis engine 614, and a paste event synchronization engine 616.

The processor(s) 602 and computer-readable medium(s) 604, and the respective functional engines 606-616 embodied by those components, may be disposed at any of a number of locations within a system that includes the client device 202 and the remote computing resource 402 shown in FIGS. 1A and 1B. The storage medium(s) 618 may likewise be disposed at any of a number of locations within such a system. In some implementations, for example, one or more of the functional engines 606-616 and/or the storage medium(s) 618 may be located within the client device 202, or within one or more components (e.g., cloud-based services or other remote resources) that operate in conjunction with the client device 202. In other implementations, one or more of the functional engines 606-616 and/or the storage medium(s) 618 may additionally or alternatively located within the remote computing resource 402, or within one or more components (e.g., cloud-based services or other remote resources) that operate in conjunction with the remote computing resource 402. In still other implementations, one or more of the functional engines 606-616 and/or the storage medium(s) 618 may additionally or alternatively be disposed within another component of a resource delivery system, such as the resource delivery system 400 described above in connection with FIGS. 4A-F. For example, in some implementations, one or more of the functional engines 606-616 and/or the storage medium(s) 618 may be located within the gateway 408 and/or the resource delivery controller 412 described in connection with FIGS. 4A-F, and/or within one or more other system components that operate in conjunction with those elements.

As illustrated in FIG. 6, one or more of the engines 606-616 may read and/or write data to the storage medium(s) 618 while performing their respective functions. Examples of tables 700, 800, 900, and 1000 that may be stored in the storage medium(s) 618 are shown in FIGS. 7-10. In particular, FIG. 7 shows an example of a "buffer activity" table 700, FIG. 8 shows an example of a "user app" table 800, FIG. 9 shows an example of an "app exclusion" table 900, and FIG. 10 shows an example of a "paste location summary" table 1000. The manner in which the entries in those tables may be manipulated and/or referenced by the respective engines 606-616 is described in detail below. Further, as shown in FIG. 6, in some implementations, the privacy analysis engine 614 may employ the services of an image analysis service 620 to facilitate the screening of image data that is included in data copied to a local buffer 102 for potentially private data of an individual.

At a high level, the buffer activity monitoring engine 606 (shown in FIG. 6) may monitor copy events to the local buffer 102 (shown in FIGS. 1A-B) as well as paste events from the local buffer 102 and the remote buffer 106 (also shown in FIGS. 1A-B), and may record data concerning such events to the buffer activity table 700 (shown in FIG. 7). In some implementations, the buffer activity monitoring engine 606 may additionally or alternatively monitor copy events to the remote buffer 106 as well as paste events from the local buffer 102 and/or the remote buffer 106, and may additionally or alternatively record data concerning such events to the buffer activity table 700. An example routine 1100 that may be performed by the buffer activity monitoring engine 606 is described below in connection with FIG. 11.

The buffer data analysis engine 608 (shown in FIG. 6) may evaluate the data the buffer activity monitoring engine 606 has written to the buffer activity table 700 (shown in FIG. 7), and may generate summary data to include in the paste location summary table 1000 (shown in FIG. 10). As FIG. 10 illustrates, that summary data may indicate, for respective applications, the number of times that a copy event from a particular application resulted in a local paste event, e.g., a paste to an application resident on the client device 202 (as indicated by "local paste #" entries 1004), and the number of times that a copy event for that application resulted in a remote paste event, e.g., a paste event to an application being delivered to the client device 202 by the remote computing resource 402 (as indicated by "remote paste #" entries 1006). As shown in FIG. 8, the user app table 800 may correlate application types, e.g., Microsoft word, Google Chrome, Workaday, Microsoft Windows, etc. (as indicated by "app type" entries 804), and application locations, e.g., local or remote (as indicated by "app location" entries 808), for given users (as indicated be "user ID" entries 802), with unique applications identifiers (as indicated by "app ID" entries 806). Accordingly, the "app ID" entries 806 and the app location entries 808 in the user app table 800 may be used to determine whether the app IDs that are included as "copy app ID" entries 1002 in the paste location summary table 1000 identify applications that are located on the client device 202 or instead identify applications that are located on the remote computing resource 402. An example routine 1200 that may be executed by the buffer data analysis engine 608 is described below in connection with FIG. 12.

The exclusion list management engine 610 (shown in FIG. 6) may maintain a list of applications that are to be excluded from the normal processing that is performed by the copy event synchronization engine 612 (as described below in connection with FIG. 14) to determine, for a given application, whether to synchronize the local buffer 102 and the remote buffer 106 based on the "local paste #" entry 1004 and/or the "remote paste #" entry 1006 for that application in the paste location summary table 1000. FIG. 9 shows an example implementation of the app exclusion table 900. As shown, the app exclusion table 900 may identify dates and/or times (as indicated by "exclusion date/time" entries 904) at which particular applications (as indicated by "app ID" entries 902) were designated as being excluded from the ordinary processing by the copy event synchronization engine 612. A process enabling a user to add an application the app exclusion table 900 is described below in connection with FIG. 16 (see steps 1608, 1610, and 1612 of the routine 1600). As explained in more detail below in connection with FIG. 13, in some implementations, applications may be removed from the exclusion list in accordance with one or more criteria (e.g., predefined criteria). In some implementations, for example, applications may be maintained on the exclusion list for only a particular period of time, e.g., twenty-four hours, three days, one week, etc., after they are added. An example routine 1300 that may be performed by the exclusion list management engine 610 is described below in connection with FIG. 13.

The copy event synchronization engine 612 (shown in FIG. 6) may determine whether to synchronize the local buffer 102 and the remote buffer 106 in response to a particular application copying data to a buffer 102, 106. In some implementations, that determination may be based at least in part on the data in the paste location summary table 1000 (shown in FIG. 10) and/or the data in the app exclusion table 900 (shown in FIG. 9). Further, in some implementations, the copy event synchronization engine 612 may additionally or alternatively base such a determination on whether the data that was copied to the buffer 102, 106 includes indicia of private information of an individual. As shown in FIG. 6, in some implementations, the copy event synchronization engine 612 may be in communication with the privacy analysis engine 614 and may request that the privacy analysis engine 614 evaluate the copied data to determine whether it includes indicia of private information. As example routine 1400 that may be performed by the copy event synchronization engine 612 is described below in connection with FIG. 14.

The privacy analysis engine 614 may, upon request, analyze data copied to a buffer 102, 106 to determine whether it contains any indicia of private information of an individual. Private information may, for example, include user names, passwords, phone numbers, email or physical addresses, social security numbers, responses to security questions, credit card numbers, bank or other account numbers, electronic signatures, etc. As explained below, in some implementations, the privacy analysis engine 614 may be configured to separate the data copied to the buffer 102, 106 into multiple portions (e.g., blocks of data, individual images, etc.), and to evaluate the respective portions in parallel, thus speeding up the evaluation process. Further, in some implementations, the privacy analysis engine 614 may send images to a remote image processing service (e.g., the image analysis service 620 shown in FIG. 6) for at least some processing, e.g., to recognize text in the images, thus reducing the computational load on the privacy analysis engine 614. Such an implementation may be particularly beneficial when the privacy analysis engine 614 is implemented on a client device 202. An example routine that may be performed by the privacy analysis engine 614 is described below in connection with FIG. 15.

The paste event synchronization engine 616 (shown in FIG. 6) may determine whether to synchronize the local buffer 102 and the remote buffer 106 in response to a request to paste data from a buffer 102, 106 to an application. In some implementations, that determination may be based, at least in part, on whether the application to which the data is to be pasted is co-located with the application from which the data was copied. In some implementations, the paste event synchronization engine 616 may refrain from synchronizing the local buffer 102 and the remote buffer 106 when the two applications are co-located, as the data needed for the paste operation would already be present in the buffer 102, 106 that is at the same location as the application to which the data is to be pasted. The locations of the respective applications may be determined, for example, based on the app location entries 808 in the user app table 800 (shown in FIG. 8).

In some implementations, the buffer synchronization decision by the paste event synchronization engine 616 may additionally or alternatively be based, at least in part, on whether the data that is to be pasted includes indicia of private information of an individual. As shown in FIG. 6, in some implementations, similar to the copy event synchronization engine 612, the paste event synchronization engine 616 may be in communication with the privacy analysis engine 614 and may request that the privacy analysis engine 614 evaluate the to-be-pasted data to determine whether it includes indicia of private information. In some implementations, for circumstances in which the privacy analysis engine 614 identifies the existence of potentially private information, the paste event synchronization engine 616 may further provide a user interface through which a user may be presented with an indication of any words, phrases, etc., that caused the privacy analysis engine 614 to make such a determination. In some implementations, such a user interface may additionally provide the user with a mechanism for modifying the to-be-pasted data, e.g., to remove private information, and/or to override the privacy determination made by the privacy analysis engine 614 and cause the local buffer 102 and the remote buffer 106 to be synchronized in spite of that privacy determination.

Further, in some implementations, such a user interface may additionally or alternatively allow the user to add the application from which the buffer data was copied to the exclusion list (as maintained by the app exclusion table shown in FIG. 9), thus permitting the copy event synchronization engine 612 to synchronize the local buffer 102 and the remote buffer 106 in response to a copy event from that application, regardless of the current values of the "local paste #" entries 1004 and/or "remote paste #" entries 1006 in the paste location summary table 1000 for the application. As example routine 1600 that may be performed by the paste event synchronization engine 616 is described below in connection with FIG. 16.

Figure 11:
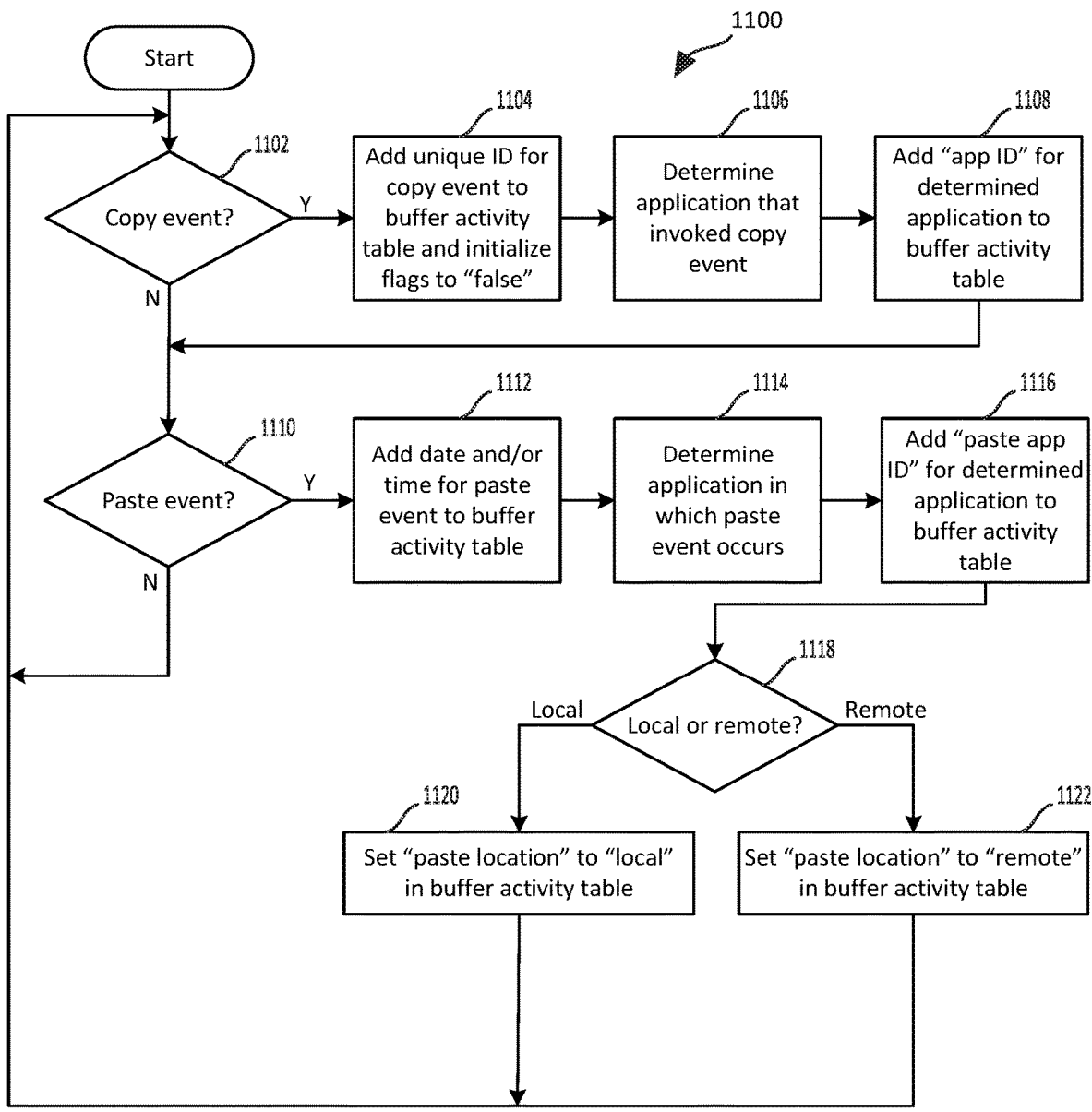
FIG. 11 is a flowchart showing an example routine that may be performed by the buffer activity monitoring engine shown in FIG. 6.

FIG. 11 is a flowchart showing an example routine 1100 that may be performed by the buffer activity monitoring engine 606 (shown in FIG. 6). As noted above, pursuant to the routine 1100, the buffer activity monitoring engine 606 may monitor copy events to the local buffer 102 (shown in FIGS. 1A-B) as well as paste events from the local buffer 102 and the remote buffer 106 (also shown in FIGS. 1A-B), and may record data concerning such events to the buffer activity table 700 (shown in FIG. 7).

As shown in FIG. 11, the routine 1100 may begin at a decision step 1102, at which the buffer activity monitoring engine 606 may determine whether a copy event from an application to a buffer 102, 106 has occurred. Pertinent events relating to the buffers 102, 106 may be detected and/or monitored in any of numerous ways, and may depend on the operating system(s) executing on the client device 202 and/or the remote computing resource 402. For example, the Microsoft Windows operating system includes several "clipboard message" handles, including WM_COPY, WM_CUT, and WM_PASTE. Those message handles are described, for example, at the path "en-us/windows/win32/dataxchg/clipboard-messages" of the Uniform Resource Locator (URL) "docs.microsoft.com." Such messages are typically handled using a WindowProc callback function, which is an application-defined function that processes messages sent to a window. Such callback functions are described, for example, at the path "en-us/windows/win32/winmsg/window-procedures" of the URL "docs.microsoft.com." Accordingly, in some implementations, the occurrence of copy events to the buffers 102, 106 may be detected by monitoring WindowProc callback functions for WM_COPY and/or WM_CUT messages. Similar techniques may likewise be used to detect copy events to buffers 102, 106 in other operating systems.

When, at the decision step 1102, the buffer activity monitoring engine 606 determines that a copy event from an application to a buffer 102, 106 has occurred, the routine 1100 may proceed to a step 1104, at which the buffer activity monitoring engine 606 may generate a unique identifier for the detected copy event and add that identifier (as a "copy event ID" entry 702) to the buffer activity table 700 (shown in FIG. 7). As indicated, at the step 1104, the buffer activity monitoring engine 606 may also initialize the values of the flags in the buffer activity table 700 (which may include a "privacy flag" entry 712 and a "synchronization flag" entry 712) to "false." As explained below, the "privacy flag" entry 712 may be set to "true" when the information copied to a buffer 102, 106 has been determined to include potentially private information, and the "synchronization flag" entry 712 may be set to "true" when the buffers 102, 106 have been synchronized such that the information copied to one of the buffers 102, 106 has been transferred to the other buffer 102, 106. Further details about how those flags may be set and used (by the copy event synchronization engine 612, the privacy analysis engine 614, and the paste event synchronization engine 616) are provided below in connection with FIGS. 14-16. When, on the other hand, the buffer activity monitoring engine 606 determines (at the decision step 1102) that a copy event from an application to a buffer 102, 106 has not occurred, the routine 1100 may instead proceed to a decision step 1110 (discussed below).

At a step 1106 of the routine 1100, the buffer activity monitoring engine 606 may determine the application that invoked the detected copy event and, at a step 1108, may add the app ID for the determined application (as a "copy app ID" entry 704) in the buffer activity table 700 (shown in FIG. 7). For example, in a Microsoft Windows environment, the application that invoked the copy event may be determined by evaluating the WM_COPY and/or WM_CUT message detected at the decision step 1102. The app ID for the identified application may be ascertained, for example, by identifying the app ID entry 806 for that application in the user app table 800 (shown in FIG. 8).

At the decision step 1110 of the routine 1100, the buffer activity monitoring engine 606 may determine whether a paste event from a buffer 102, 106 to an application has occurred. For example, in a Microsoft Windows environment, the occurrence of a paste event from a buffer 102, 106 may be detected by monitoring WindowProc callback functions for WM_PASTE messages, as described above. Similar techniques may likewise be used to detect paste events from buffers 102, 106 in other operating systems.

When, at the decision step 1110, the buffer activity monitoring engine 606 determines that a paste event from a buffer 102, 106 to an application has occurred, the routine 1100 may proceed to a step 1112, at which the buffer activity monitoring engine 606 may determine a date and/or time at which the paste event occurred and add that date and/or time (as a "paste date/time" entry 706) to the buffer activity table 700 (shown in FIG. 7). For example, in a Microsoft Windows environment, the date and/or time of a paste event from a buffer 102, 106 may be determined by evaluating the WM_PASTE message detected at the decision step 1110. When, on the other hand, the buffer activity monitoring engine 606 determines (at the decision step 1110) that a paste event from an application to a buffer 102, 106 has not occurred, the routine 1100 may instead return to the decision step 1102 (discussed above).

At a step 1114 of the routine 1100, the buffer activity monitoring engine 606 may determine the application in which the detected paste event occurred and, at a step 1116, may add the app ID for the determined application (as a "paste app ID" entry 708) in the buffer activity table 700 (shown in FIG. 7). For example, in a Microsoft Windows environment, the application in which the detected paste event occurred may be determined by evaluating the WM_PASTE message detected at the decision step 1110. The app ID for the application determined at the step 1114 may be ascertained, for example, by identifying the app ID entry 806 for that application in the user app table 800 (shown in FIG. 8).

At a decision step 1118 of the routine 1100, the buffer activity monitoring engine 606 may determine whether the application in which the buffer data was pasted is located on the client device 202 (and is thus "local") or is located on a remote computing resource 402 (and is thus "remote"). This determination may be made, for example, by evaluating the WM_PASTE message detected at the decision step 1110.

When, at the decision step 1118, the buffer activity monitoring engine 606 determines that the buffer data was pasted into a local application (e.g., an application on the client device 202), the routine 1100 may proceed to a step 1120, at which a "paste location" entry 710 for corresponding copy event ID may be set to "local" in the buffer activity table 700 (shown in FIG. 7). Following the step 1120, the routine 1100 may return to the decision step 1102.

When, on the other hand, the buffer activity monitoring engine 606 determines (at the decision step 1118) that the buffer data was pasted into a remote application (e.g., an application being delivered to the client device 202 by the remote computing resource 402), then the routine 1100 may instead proceed to a step 1122, at which a "paste location" entry 710 for the corresponding copy event ID may be set to "remote" in the buffer activity table 700 (shown in FIG. 7). Following the step 1122, the routine 1100 may return to the decision step 1102.

Figure 12:
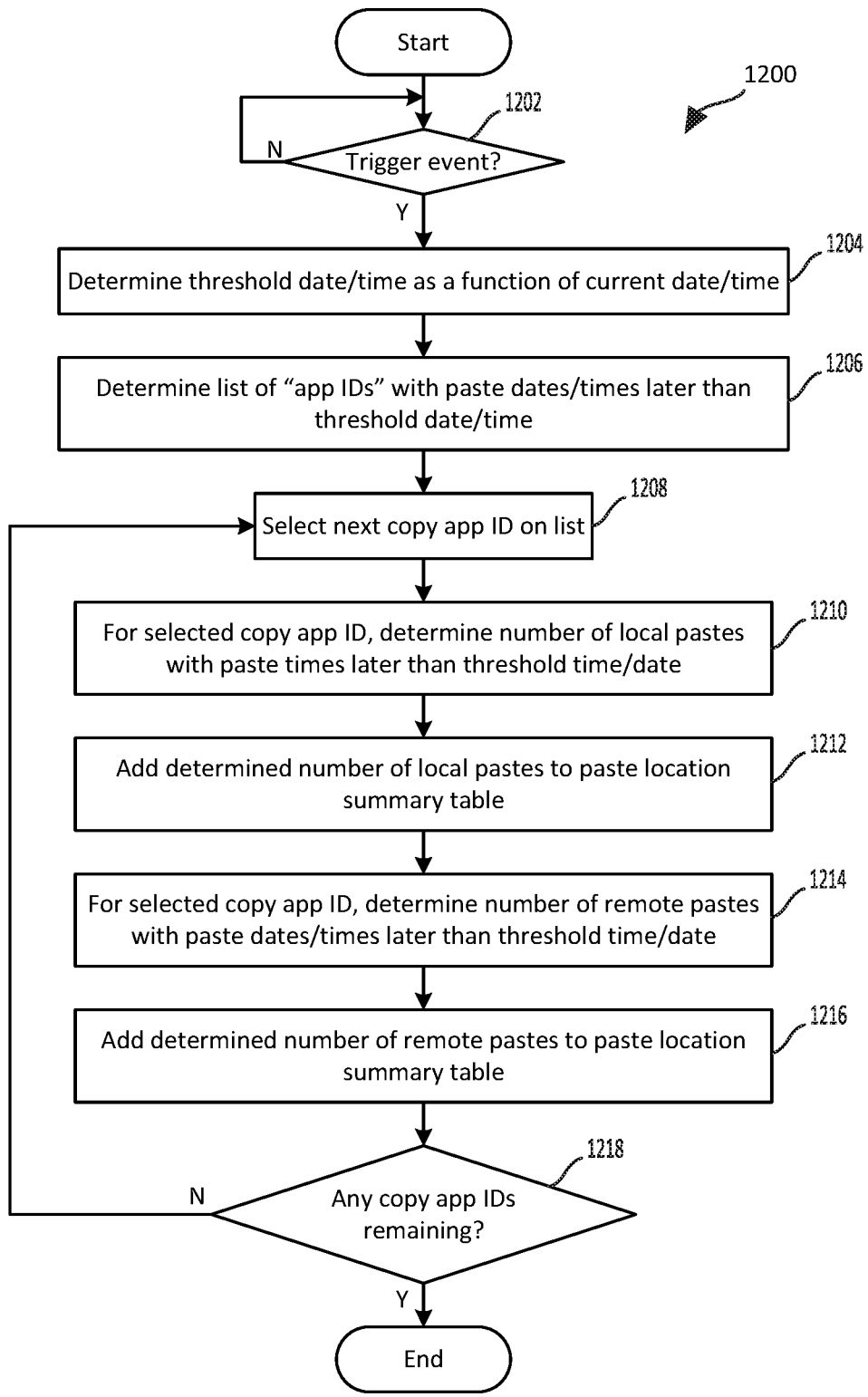
FIG. 12 is a flowchart showing an example routine that may be performed by the buffer data analysis engine shown in FIG. 6.

FIG. 12 is a flowchart showing an example routine 1200 that may be performed by the buffer data analysis engine 608 (shown in FIG. 6). As noted above, pursuant to the routine 1200, the buffer data analysis engine 608 may evaluate the data the buffer activity monitoring engine 606 has written to the buffer activity table 700 (shown in FIG. 7), and may generate summary data to include in the paste location summary table 1000 (shown in FIG. 10).

As shown in FIG. 12, the routine 1200 may begin at a decision step 1202, at which the buffer data analysis engine 608 may determine whether a trigger event for updating the paste location summary table 1000 has occurred. In some implementations, the trigger event detected at the decision step 1202 may simply be an occurrence a periodic signal that occurs once every hour, once every day, once every three days, etc. In other implementations, detected trigger events may additionally or alternatively correspond to user actions, such as requests to paste information from a buffer 102, 106, the act of logging on to a resource delivery system, the act of launching a new application, etc. In some such implementations, for example, a trigger event may be detected at the decision step 1202 when a user invokes a paste operation, or perhaps when a user has invoked a certain number of paste operations, e.g., every tenth paste operation the user invokes.

When, at the decision step 1202, the buffer data analysis engine 608 determines that a trigger event has occurred (e.g., by monitoring one or more of the occurrences/actions noted above), the routine 1200 may proceed to a step 1204, at which the buffer data analysis engine 608 may determine a threshold (e.g., a date and/or time) that is to be used to identify the entries in the buffer activity table 700 (shown in FIG. 7) that are to be summarized in the paste location summary table 1000 (shown in FIG. 10). As indicated, the determined threshold may be calculated as function of the current date and/or time, e.g., the date and/or time at which the step 1204 is performed. In some implementations, for example, the threshold may be a fixed number of days, hours, etc., prior to the current time. For instance, in some implementations, the buffer data analysis engine 608 may set the threshold to be fourteen days prior to the current date/time, thus ensuring that the calculated values of the "local paste #" entries 1004 and "remote paste #" entries 1006 in the paste location summary table 1000 will be based only on data from the buffer activity table 700 that is less than or equal to fourteen days old.

At a step 1206 of the routine 1200, the buffer data analysis engine 608 may identify any app IDs (included as "copy app ID" entries 704 in the buffer activity table 700) with "paste date/time" entries 706 that are later than the threshold determined at the step 1204, and may create a list of such app IDs for further processing. In implementations in which the buffer activity table 700 includes data for multiple users, separate such app ID lists may be created for respective users. In such implementations, the associations between or assignments of users and app IDs may be determined or otherwise accomplished using the user app table 800 (shown in FIG. 8). Although the remaining steps in the routine 1200 involve the processing of just one app ID list for just one user, so as to generate entries in a paste location summary table 1000 for a single user, in other implementations, those same steps may additionally be performed for other app ID lists for other users, thereby generating entries in respective paste location summary tables 1000 for different users.

Pursuant to steps 1208 and 1218 of the routine 1200, the buffer data analysis engine 608 may cycle through the app IDs on the list generated at the step 1206 to determine values of "local paste #" entries 1004 and the "remote paste #" entries 1006 for those app IDs. Although FIG. 12 illustrates the app IDs as being selected (at the step 1208) and processed (via steps 1210, 1212, 1214, and 1216) one at a time, it should be appreciated that two or more, or even all of the app IDs on the list may instead be processed (via steps 1210, 1212, 1214, and 1216) in parallel.

At a step 1210 of the routine 1200, the buffer data analysis engine 608 may determine the number of times that data from the application identified by the app ID selected at the step 1208 was pasted to a "local" application, where such paste operations occurred later than the threshold date and/or time that was determined at the step 1204. Such a determination may be made, for example, by counting the copy events (indicated by "copy event ID" entries 702 in the buffer activity table 700) for which (A) the paste location (as indicated by the "paste location" entry 710 for the copy event in the buffer activity table 700) is "local" and (B) the paste time and/or date (as indicated by the "paste date/time" entry 706 for the copy event in the buffer activity table 700) is later than the threshold determined at the step 1204.

At a step 1212 of the routine 1200, the buffer data analysis engine 608 may add the counted number of local paste events for the app ID selected at the step 1208 (as determined at the step 1212 and as indicated by a "copy app ID" entry 1002 in the paste location summary table 1000) as a "local paste #" entry 1004 in the paste location summary table 1000 (shown in FIG. 10).

At a step 1214 of the routine 1200, the buffer data analysis engine 608 may determine the number of times that data from the application identified by the app ID selected at the step 1208 was pasted to a "remote" application, where such paste operations occurred later than the threshold that was determined at the step 1204. Such a determination may be made, for example, by counting the copy events (indicated by "copy event ID" entries 702 in the buffer activity table 700) for which (A) the paste location (as indicated by the "paste location" entry 710 for the copy event in the buffer activity table 700) is "remote" and (b) the paste time and/or date (as indicated by the "paste date/time" entry 706 for the copy event in the buffer activity table 700) is later than the threshold determined at the step 1204.

At a step 1216 of the routine 1200, the buffer data analysis engine 608 may add the counted number of remote paste events for the app ID selected at the step 1208 (as determined at the step 1214 and as indicated by a "copy app ID" entry 1002 in the paste location summary table 1000) as a "remote paste #" entry 1006 in the paste location summary table 1000 (shown in FIG. 10).

At the decision step 1218, the buffer data analysis engine 608 may determine whether any app IDs on the list generated at the step 1206 have not yet been processed by the steps 1210, 1212, 1214 and 1216. When, at the decision step 1218, the buffer data analysis engine 608 determines there are app IDs on the list that have not yet been processed, the routine 1200 may return to the step 1208, at which the next copy ID on the list may be selected for processing. When, on the other hand, the buffer data analysis engine 608 determines (at the decision step 1218) that there are no remaining app IDs on the list to process, the routine 1200 may terminate.

Figure 13:
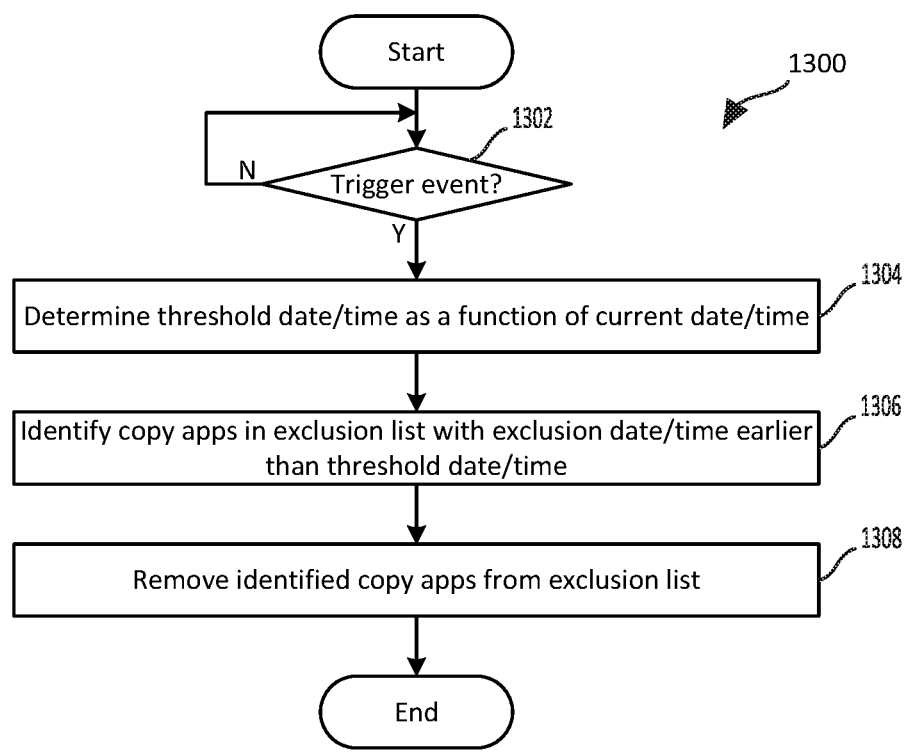
FIG. 13 is a flowchart showing an example routine that may be performed by the exclusion list management engine shown in FIG. 6.

FIG. 13 is a flowchart showing a routine 1300 that may be performed by the exclusion list management engine 610 (shown in FIG. 6). As noted above, the exclusion list management engine 610 may maintain a list of applications, e.g., as identified by "app ID" entries 902 in the app exclusion table 900 (shown in FIG. 9) that are to be excluded from the normal processing that is performed by the copy event synchronization engine 612 (as described below in connection with FIG. 14) to determine, for a given application, whether to synchronize the local buffer 102 and the remote buffer 106 based on the "local paste #" entry 1004 and/or the "remote paste #" entry 1006 for that application in the paste location summary table 1000. As explained below, in some implementations, new entries may be made to the app exclusion table 900, e.g., in response to user requests, by the paste event synchronization engine 616. For example, after requesting that data from a local application be pasted to a remote application, or vice versa, in a circumstance where the local buffer 102 and the remote buffer 106 were not automatically synchronized in response to the data being copied to a buffer 102, 106, the user may be apprised that time could be saved for subsequent paste operations involving the application from which the data was copied by temporarily instructing the system to always attempt to synchronize the buffers 102, 106 upon a copy event from that application. In some implementations, the user may further be given the option of selecting the time period for which such an instruction may be kept in force, e.g., one hour, one day, one week, etc. Pursuant to the routine 1300, the exclusion list management engine 610 may remove app ID entries 902 from the app exclusion table 900 at the end of the time period set for the instruction.

As shown in FIG. 13, the routine 1300 may begin at a decision step 1302, at which the exclusion list management engine 610 may determine whether a trigger event for updating the app exclusion table 900 has occurred. In some implementations, the trigger event detected at the decision step 1302 may simply be an occurrence of a periodic signal that occurs once every hour, once every day, once every three days, etc. In other implementations, detected trigger events may additionally or alternatively correspond to user actions, such as requests to copy information to a buffer 102, 106, requests to paste information from a buffer 102, 106, the act of logging on to a resource delivery system, the act of launching a new application, etc.

When, at the decision step 1302, the exclusion list management engine 610 determines that a trigger event has occurred, the routine 1300 may proceed to a step 1304, at which the exclusion list management engine 610 may determine a threshold (e.g., a date and/or time) that is to be used to identify the "app ID" entries 902 in the app exclusion table 900 (shown in FIG. 9) that are to be removed. As indicated, the determined threshold may be calculated as function of the current date and/or time, e.g., the date and/or time at which the step 1304 is performed. In some implementations, the function used to determine the threshold may be the same for all applications. For example, the threshold date and/or time may be set as a fixed number of days, hours, etc. (e.g., seven days) prior to the current time. In other implementations, "always attempt synchronization" instruction may vary by application and/or may be user-defined. In such an implementation, the exclusion list management engine 610 may, at the step 1304, set different threshold for respective applications. Although not illustrated, it should be appreciated that additional data may be stored indicating the different exclusion periods for the respective applications identified in the app exclusion table 900.

At a step 1306 of the routine 1300, the exclusion list management engine 610 may identify any app IDs (included as "app ID" entries 902 in the app exclusion table 900) that are associated with or otherwise assigned to "exclusion date/time" entries 904 that are earlier than the threshold determined at the step 1304.

At a step 1308, the exclusion list management engine 610 may remove the app IDs identified at the step 1306 from the app exclusion table 900.

Figure 14:
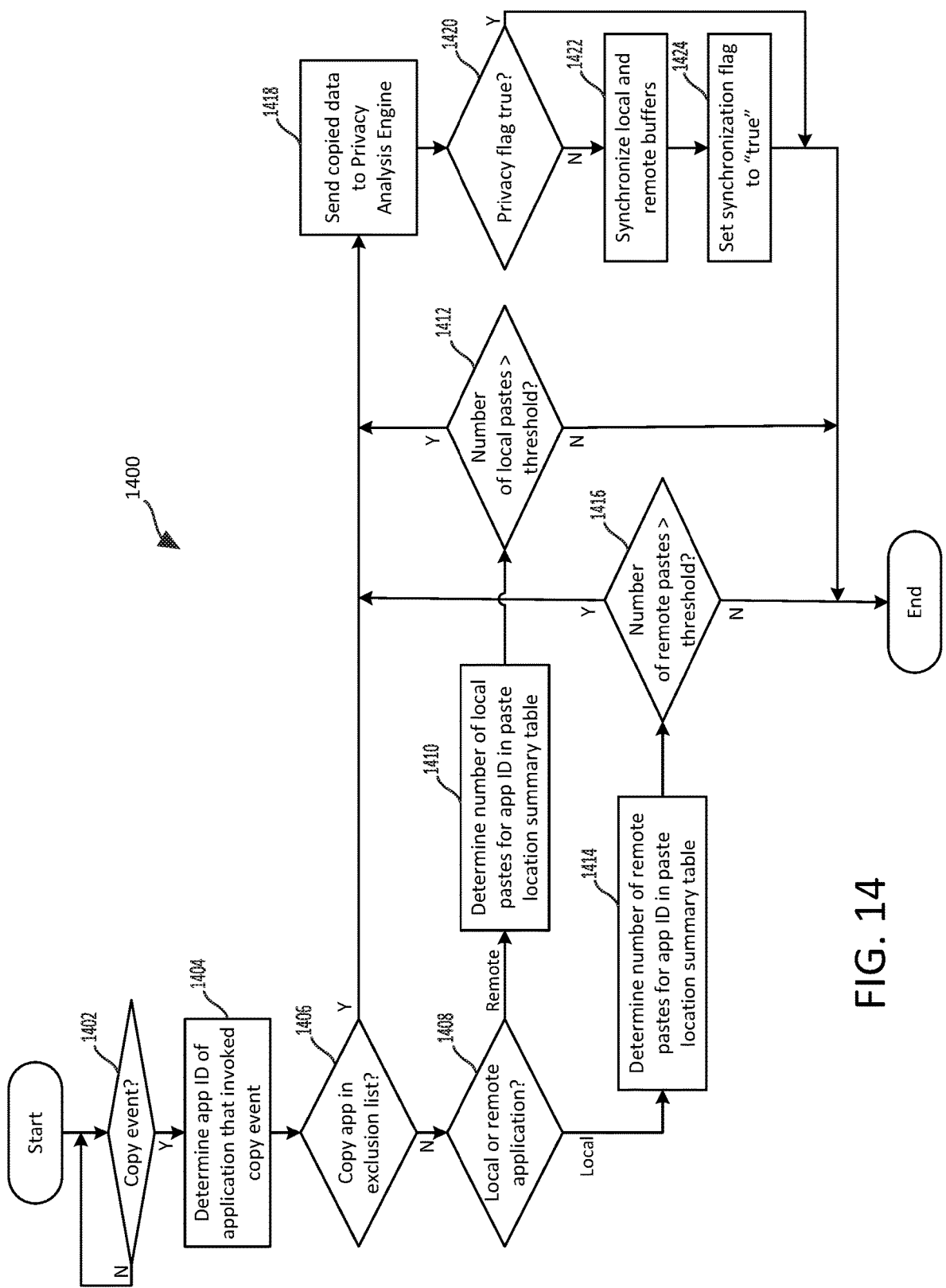
FIG. 14 is a flowchart showing an example routine that may be performed by the copy event synchronization engine shown in FIG. 6.

FIG. 14 is a flowchart showing an example routine 1400 that may be performed by the copy event synchronization engine 612 (shown in FIG. 6). As noted above, the copy event synchronization engine 612 may determine whether to synchronize the local buffer 102 and the remote buffer 106 in response to a particular application copying data to a buffer 102, 106. As previously described, in some implementations, that determination may be based on one or more of (A) the data in the paste location summary table 1000 (shown in FIG. 10), (B) the data in the app exclusion table 900 (shown in FIG. 9), and/or (C) a determination of whether the data that was copied to the buffer 102, 106 includes indicia of private information of an individual. The example routine 1400 may take all three such considerations into account when determining whether to synchronize the local buffer 102 and the remote buffer 106 (at a step 1422) in response to detecting a copy event to a buffer 102, 106 (at a decision step 1402).

As shown in FIG. 14, the routine 1400 may begin at the decision step 1402, at which the copy event synchronization engine 612 may determine whether a copy event to a buffer 102, 106 has occurred. In the illustrated example, the decision step 1402 determines whether data is copied to either the local buffer 102 or the remote buffer 106. In other implementations, however, the copy event synchronization engine 612 may instead detect (at decision step 1402) only copy events to the local buffer 102 or only copy events to the remote buffer 106. In an implementation in which the copy event synchronization engine 612 detects (at the decision step 1402) only copy events to the local buffer 102, the decision step 1408 (described below), as well as the steps 1410 and 1412 (also described below), may be omitted. Similarly, in an implementation in which the copy event synchronization engine 612 detects (at the decision step 1402) only copy events to the remote buffer 106, the decision step 1408, as well as the steps 1414 and 1416 (described below), may be omitted.

At a step 1404 of the routine 1400, copy event synchronization engine 612 may determine the app ID of the application that invoked the copy event to the buffer 102, 106. That determination may be made, for example, by identifying the "app ID" entry 806 that corresponds to the type of application (indicated by the "app type" entries 804) and the location of the application (indicated by the "app location" entries 808) in the user app table 800.

At a decision step 1406, the copy event synchronization engine 612 may determine whether the app ID of the application that invoked the copy event to the buffer 102, 106 is currently on the exclusion list, e.g., as reflected in the app exclusion table 900. When, at the decision step 1406, the copy event synchronization engine 612 determines that the app ID of the application that invoked the copy event to the buffer 102, 106 is currently on the exclusion list, the routine 1400 may proceed to a step 1418, at which the data copied to the buffer 102, 106 may be sent to the privacy analysis engine 614 (shown in FIG. 6) for analysis, as described below.

When, on the other hand, the copy event synchronization engine 612 determines (at the decision step 1406) that the app ID of the application that invoked the copy event to the buffer 102, 106 is not currently on the exclusion list, the routine 1400 may instead proceed to a decision step 1408, at which the copy event synchronization engine 612 may determine whether the application that invoked the copy event (which may be referred to as the "copy application") is "local," e.g., on the client device 202, or "remote," e.g., delivered to the client device 202 by the remote computing resource 402. An application on the client device 202 that invokes a copy event may be referred to as a "local copy application" and an application on the remote computing resource 402 that invokes a copy event may be referred to as a "remote copy application."

When, at the decision step 1408, the copy event synchronization engine 612 determines that the copy application is "remote," the routine may proceed to a step 1410, at which the copy event synchronization engine 612 may determine the number of times within the pertinent window of time (e.g., the past two weeks) that copy events by the remote copy application have resulted in a paste operations to an application that is local, e.g., located on the client device 202. An application on the client device 202 to which buffer data is pasted may be referred to as a "local paste application." The determination at the step 1410 may be made, for example, by determining the value of the "local paste #" entry 1004 with the app ID for the remote copy application under consideration (as determined at the decision step 1408) in the paste location summary table 1000 (shown in FIG. 10).

At the decision step 1412 of the routine 1400, the copy event synchronization engine 612 may determine whether the number of local paste operations determined at the step 1410 exceeds a threshold value. In some implementations, such a threshold may be "1" or some other relatively small value, e.g., "5," so that the buffers 102, 106 will be synchronized if there is even a small likelihood that a copy event by a remote copy application will result in a paste event to a local paste application. The threshold value used at the decision step 1412 may, in at least some implementations, be adjusted or tuned by a user, a system administrator, or otherwise, so as to appropriately balance the need to have remotely copied data available to paste locally against the desire to avoid unnecessary data transfers between the client device 202 and the remote computing resource 402. In some implementations, the value of the "remote paste #" entry 1006 for the remote copy application may additionally be taken into consideration at the decision step 1412, such as by determining a ratio of the value of the "local paste #" entry 1004 to the value of the "remote paste #" entry 1006 for the remote copy application being evaluated, and comparing that calculated ratio to a threshold (e.g., a ratio value).

When, at the decision step 1412, the copy event synchronization engine 612 determines that the number of local paste operations determined at the step 1410 (or some other metric involving the value of the "local paste #" entry 1004) does not exceed the threshold value, the routine 1400 may terminate. When, on the other hand, the copy event synchronization engine 612 determines (at the decision step 1412) that the number of local paste operations determined at the step 1410 (or some other metric involving the value of the "remote paste #" entry 1006) does exceed the threshold value, the routine 1400 may instead proceed to the step 1418, at which the data copied to the remote buffer 106 by the remote copy application may be sent to the privacy analysis engine 614 (shown in FIG. 6) for analysis, as described below.

When, at the decision step 1408, the copy event synchronization engine 612 determines that the copy application is "local," the routine may proceed to a step 1414, at which the copy event synchronization engine 612 may determine the number of times within the pertinent window of time (e.g., the past two weeks) that copy events by the local copy application have resulted in a paste operations to an application that is remote, e.g., located on the remote computing resource 402. An application on the remote computing resource 402 to which buffer data is pasted may be referred to as a "remote paste application." The determination at the step 1414 may be made, for example, by determining the value of the "remote paste #" entry 1006 that is associated with the "app ID" for the local copy application under consideration (as determined at the step 1404) in the paste location summary table 1000 (shown in FIG. 10).

At the decision step 1416 of the routine 1400, the copy event synchronization engine 612 may determine whether the number of remote paste operations determined at the step 1414 exceeds a threshold value. In some implementations, such a threshold may be "1" or some other relatively small value, e.g., "5," so that the buffers 102, 106 will be synchronized if there is even a small likelihood that a copy event by a local copy application will result in a paste event to a remote paste application. The threshold value used at the decision step 1416 may, in at least some implementations, be adjusted or tuned by a user, a system administrator, or otherwise, so as to appropriately balance the need to have locally copied data available to paste remotely against the desire to avoid unnecessary data transfers between the client device 202 and the remote computing resource 402. In some implementations, the value of the "local paste #" entry 1004 for the local copy application may additionally be taken into consideration at the decision step 1416, such as by determining a ratio of the value of the "remote paste #" entry 1006 to the value of the "local paste #" entry 1004 for the local copy application being evaluated, and comparing that calculated ratio to a threshold (e.g., a ratio value).

When, at the decision step 1416, the copy event synchronization engine 612 determines that the number of remote paste operations determined at the step 1414 (or some other metric involving the value of the "remote paste #" entry 1006) does not exceed the threshold value, the routine 1400 may terminate. When, on the other hand, the copy event synchronization engine 612 determines (at the decision step 1416) that the number of remote paste operations determined at the step 1414 (or some other metric involving the value of the "remote paste #" entry 1006) does exceed the threshold value, the routine 1400 may instead proceed to the step 1418, at which the data copied to the local buffer 102 by the local copy application may be sent to the privacy analysis engine 614 (shown in FIG. 6) for analysis, as described below.

As noted above, at the step 1418 of the routine 1400, the copy event synchronization engine 612 may send either (A) the data copied to the local buffer 102 by a local copy application, or (B) the data copied to the remote buffer 106 by a remote copy application, to the privacy analysis engine 614 (shown in FIG. 6) for analysis. An example routine 1500 that may be performed by the privacy analysis engine is described below in connection with FIG. 15. As explained below, as a result of the routine 1500, the value of the "privacy flag" entry 712 in the buffer activity table 700 may be set either to "true" to indicate that potentially private data was detected in the data that was copied to the buffer 102, 106, or to "false" to indicate that no such potentially private data was detected.

At a decision step 1420, following the privacy analysis performed at the step 1418, the copy event synchronization engine 612 may determine whether the value of the "privacy flag" entry 712 for the copy event (indicated by the "copy event ID" entry 702 in the buffer activity table 700) under consideration is "true" or "false."

When, at the decision step 1420, the copy event synchronization engine 612 determines that the value of the "privacy flag" entry 712 for the copy event (indicated by the "copy event ID" entry 702 in the buffer activity table 700) under consideration is "true," the routine 1400 may terminate, and the contents of the local buffer 102 and the remote buffer 106 are not synchronized. Accordingly, because the data that was copied to a buffer 102, 106 was determined to potentially include private information of an individual, the data is not automatically transferred between the client device 202 and the remote computing resource 402 in response to a copy event. As discussed below in connection with FIG. 16, however, in response to a remote paste event following a local copy event or a local paste event following a remote copy event, the user may be given an opportunity to modify the data copied to a buffer 102, 106 to remove information flagged as potentially private and/or may be given an opportunity to override the privacy determination made by the privacy analysis engine 614 and cause the copied data to be transferred between the client device 202 and the remote computing device in spite of that determination.

When, at the decision step 1420, the copy event synchronization engine 612 determines that the value of the "privacy flag" entry 712 for the copy event (indicated by the "copy event ID" entry 702 in the buffer activity table 700) under consideration is "false," the routine 1400 may proceed to a step 1422, at which the copy event synchronization engine 612 may cause the contents of the local buffer 102 and the remote buffer 106 to be synchronized. Advantageously, as a result of such synchronization the data that was copied to one of the buffers 102, 106 will be immediately available on the other buffer 102, 106 in the event a paste operation at the location of the other buffer 102, 106 is subsequently requested.

At the step 1424 of the routine 1400, the copy event synchronization engine 612 may set the value of the "synchronization flag" entry 714 for the copy event (indicated by the "copy event ID" entry 702 in the buffer activity table 700) under consideration to "true" to indicate that the data copied to one buffer 102, 106 has already been transferred to the other buffer 102, 106. As explained below, setting the value of the "synchronization flag" entry 714 to "true" may enable the paste event synchronization engine 616 to avoid taking certain steps, such as allowing modification of the exclusion list, analyzing the copied data for indicia of privacy information, and transferring copied data to synchronize the buffers 102, 106, in response to a detected paste event from a buffer 102, 106.

Figure 15:
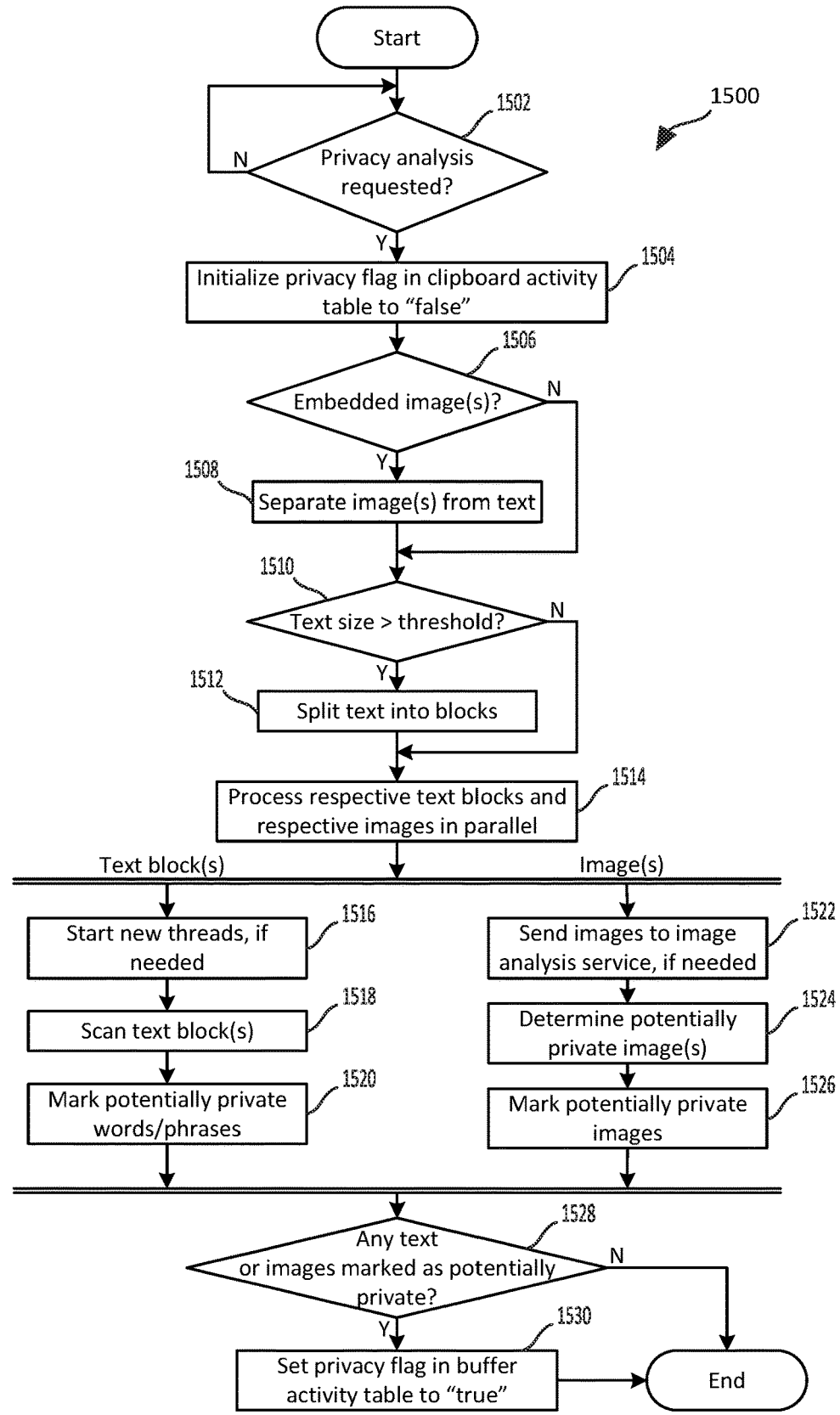
FIG. 15 is a flowchart showing an example routine that may be performed by the privacy analysis engine shown in FIG. 6.

FIG. 15 is a flowchart showing an example routine 1500 that may be executed by the privacy analysis engine 614 (shown in FIG. 6). As noted above, the privacy analysis engine 614 may, upon request, analyze data copied to a buffer 102, 106 (shown in FIGS. 1A and 1B) to determine whether it contains any indicia of private or sensitive information (e.g., user names, passwords, phone numbers, email or physical addresses, social security numbers, responses to security questions, credit card numbers, bank or other account numbers, electronic signatures, etc.) of an individual. As shown in FIG. 15, the routine 1500 may begin at the decision step 1502, at which the privacy analysis engine 614 may determine whether a request to analyze data for privacy information has been received. As noted above, in some implementations, such requests may be received from the copy event synchronization engine 612. Further, as described below in connection with FIG. 16, such requests may additionally or alternatively be received from the paste event synchronization engine 616. In some implementations, such request received by the privacy analysis engine 614 may include the unique identifiers of the copy events (indicated as a "copy event ID" entry 702 in the buffer activity table 700) that were assigned to the data to be analyzed, so as to enable the privacy analysis engine 614 to access and manipulate the "privacy flag" entries 712 and the "synchronization flag" entries 714 of those "copy event ID" entries 702.

When, at the decision step 1502, the privacy analysis engine 614 determines that a privacy analysis request has been received (e.g., from the copy event synchronization engine 612 or the paste event synchronization engine 616), the routine 1500 may proceed to a step 1504, at which the privacy analysis engine 614 may initialize the value of the "privacy flag" entry 712 of the "copy event ID" entry 702 for the to-be-analyzed data to "false." As discussed below, in some implementations, the paste event synchronization engine 616 may enable a user to modify copied data that is initially flagged by the privacy analysis engine 614 as potentially containing private information, and such modified data may again be processed by the privacy analysis engine 614 to determine whether the potentially private information has been removed. The step 1504 may thus serve to re-set the value of the "privacy flag" entry 712 to "false" in such circumstances, before the privacy analysis engine 614 analyzes the modified data of the copy event under consideration.

At a decision step 1506 of the routine 1500, the privacy analysis engine 614 may determine whether any text data copied to the buffer 102, 106 includes one or more embedded images, for example, by evaluating whether the data includes any file extensions (e.g., ".jpg") indicative of images. In some implementations, the decision step 1506 may further involve determining whether the data is formatted is a way that allows images to be embedded in text data. Text data formatted using the Rich Text Format (RTF) may, for example, included embedded images.

When, at the decision step 1506, the privacy analysis engine 614 determines that text data copied to the buffer 102, 106 includes one or more embedded images, the routine 1500 may proceed to a step 1508, at which the privacy analysis engine 614 may separate any such images from the text data, for example, by extracting image files from the text data. Following the step 1508, the routine 1500 may proceed to a decision step 1510 (described below). When, on the other hand, the privacy analysis engine 614 determines (at the decision step 1506) that that the data copied to the buffer 102, 106 does not include any text data with one or more embedded images, the routine 1500 may instead proceed directly to the decision step 1510.

At the decision step 1510 of the routine 1500, the privacy analysis engine 614 may determine whether the size of the text data, if any, that is included in the data copied to the buffer 102, 106 (excluding any images removed at the step 1508) exceeds a threshold value. For example, in some implementations, the privacy analysis engine 614 may determine whether the size of such text data exceeds sixteen kilobytes. Different thresholds may alternatively be used at the decision step 1510. For example, in some implementations, the "text size" threshold used at the decision step 1510 may be selected such that time taken to process one "block" of the text having the threshold size (as described below in connection with steps 1516, 1518, and 1520) is approximately equal to the time taken to process one image (as described below in connection with steps 1522, 1524, and 1526).

When, at the decision step 1510, the privacy analysis engine 614 determines that the size of the copied text data, if any, exceeds the threshold size (e.g., sixteen kilobytes), the routine 1500 may proceed to a step 1512, at which the privacy analysis engine 614 may split such text data into two or more "blocks," with such blocks having less than the threshold size (e.g., less than sixteen kilobytes). In some implementations, the privacy analysis engine 614 may allocate the text data to respective blocks such that sentences are not split between blocks. Following the step 1512, the routine 1500 may proceed to a step 1514 (described below). When, on the other hand, the privacy analysis engine 614 determines (at the decision step 1510) that the size of the copied text data, if any, exceeds the threshold value (e.g., sixteen kilobytes), the routine 1500 may instead proceed directly to the step 1512.

At the step 1514 of the routine 1500, the privacy analysis engine 614 may begin a process for evaluating the identified text block(s), if any, and the identified images (embedded in text data or otherwise), if any, in parallel to evaluate whether those such text blocks and/or images include indicia of private information of an individual. Although not required, such parallel processing may be employed in some implementations to ensure that the requisite analysis is done in a timely manner.

At a step 1516 of the routine 1500, the privacy analysis engine 614 may start new processing threads, as needed, to evaluate multiple blocks of text in parallel.

At a step 1518 of the routine 1500, the privacy analysis engine 614 may scan the blocks of text to identify indicia of privacy information of an individual. The analysis of the text blocks at the step 1518 may be performed using any of a number of techniques. In some implementations, for example, words or phrases in the text may be evaluated against a dictionary or "bag of words" including potentially problematic word or phrases. In other implementations, techniques such as regex expression and/or fuzzy pattern matching may additionally or alternatively be employed. As noted above, the indicia of private information that is detected at the step 1508 may, for example, include information such as user names, passwords, phone numbers, email or physical addresses, social security numbers, responses to security questions, credit card numbers, bank or other account numbers, electronic signatures, etc. In some implementations, the evaluation performed at the step 1508 may be user specific. Accordingly, the privacy analysis engine 614 may, in some implementation, reference user-specific information, e.g., stored in the storage medium(s) 618, when attempting to identify private information within the text block(s) pursuant to the step 1518.

At the step 1520 of the routine 1500, the privacy analysis engine 614 may mark the words or phrases within the text that were determined (at the step 1518) to reflect potentially private information. Such marking may be performed, for example, by highlighting, coloring, bolding or greying out, circumscribing, bracketing, or otherwise calling out the potentially private words or phrases in the text. Following the step 1520, the routine 1500 may proceed to a decision step 1528 (described below).

At a step 1522 of the routine 1500, the privacy analysis engine 614 may, in some implementations, send one or more images to the image analysis service 620 (shown in FIG. 6) for processing. Taking such a step may, for example, reduce the computational load on the privacy analysis engine 614. In some implementations, image analysis service 620 may, for example, use one or more trained machine learning models, or other artificial intelligence (AI) or other data processing techniques, to perform tasks such as recognizing text within images. In some implementations, the image analysis service 620 may send to the privacy analysis engine

614 any text that is recognized in the image(s) the privacy analysis engine 614 sends to the image analysis service 620. In other implementations, the image analysis service 620 may additionally or alternatively perform other tasks to facilitate the analysis that the privacy analysis engine 614 performs.

At a step 1524 of the routine 1500, the privacy analysis engine 614 may evaluate the text or other data returned by the image analysis service 620, and/or may perform text recognition or other analysis on the image locally, to determine whether the image includes potentially private information. Although not shown in FIG. 15, similar to the step 1516 (described above), in some implementations, the privacy analysis engine 614 may also start new processing threads, as needed, to evaluate the data returned from the image analysis service 620 and/or to locally process the images in parallel, thus reducing the time required to process multiple images. In some implementations, such parallel threads may instead be started prior to sending multiple images to the image analysis service 620 (at the step 1522). When text is returned from the image analysis service 620, the privacy analysis engine 614 may evaluate that text using the same or similar techniques as are used at the step 1518 to identify indicia of private information.

At a step 1526 of the routine 1500, the privacy analysis engine 614 may mark (e.g., by appending tags or other indicators to) the image(s) that were determined (at the step 1524), and/or the text contained within those images that was returned from the image analysis service 620, to reflect potentially private information. Such marking may be performed, for example, by highlighting, coloring, circumscribing, bracketing, or otherwise calling out the identified images and/or the text contained within those images that was returned from the image analysis service 620. Following the step 1526, the routine 1500 may proceed to the decision step 1528.

At the decision step 1528 of the routine 1500, the privacy analysis engine 614 may determine whether any text and/or images included in the data copied to the buffer 102, 106 has been marked as potentially private. This may be accomplished, for example, by identifying the presence (or absence) one or more tags or other indicators that might have been applied per the step 1526.

When, at the decision step 1528, the privacy analysis engine 614 determines that at least one word, phrase, image, etc., included in the data copied to the buffer 102, 106 has been marked as potentially private, the routine 1500 may proceed to a step 1530, at which the privacy analysis engine 614 may set the value of the "privacy flag" entry 712 associated with the "copy event ID" entry 702 for the analyzed data to "true." As noted previously, the value of the "privacy flag" entry 712 may influence the execution of the routine 1400 (shown in FIG. 14) performed by the copy event synchronization engine 612 (e.g., per the step 1422). As discussed below, the value of the "privacy flag" entry 712 may also influence the execution of the routine 1600 (shown in FIG. 16) performed by the paste event synchronization engine 616 (e.g., per the steps 1614 and 1618).

When, on the other hand, the privacy analysis engine 614 determines (at the decision step 1528) that no words, phrase, images, etc., copied to the buffer 102, 106 has been marked as potentially private, the routine 1500 may instead terminate, such that the value of the "privacy flag" entry 712 remains set to "false" (per the step 1504).

Figure 16:
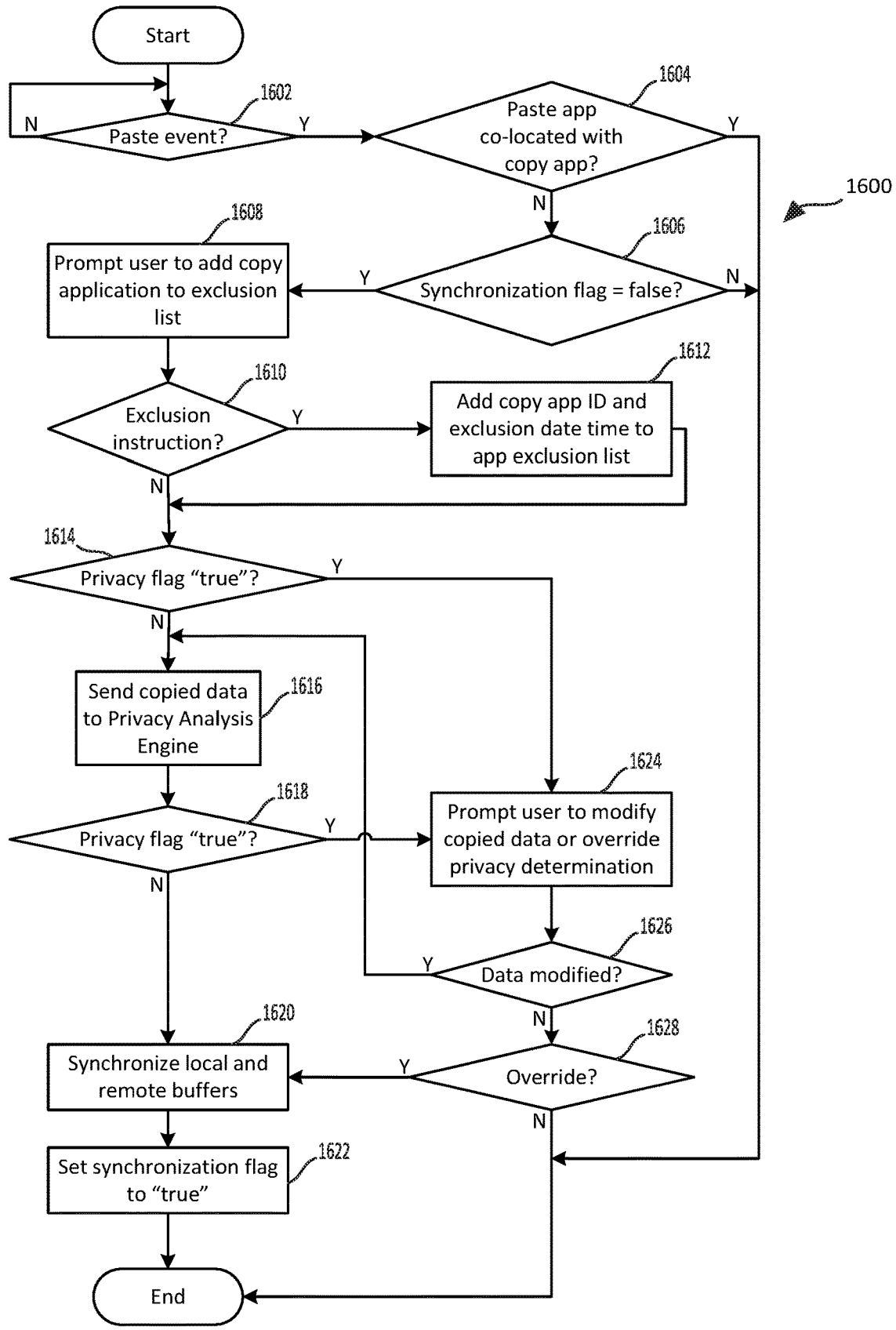
FIG. 16 is a flowchart showing an example routine that may be performed by the paste event synchronization engine shown in FIG. 6.

FIG. 16 is flowchart showing an example routine 1600 that may be performed by the paste event synchronization engine 616 (shown in FIG. 6). As noted above, the paste event synchronization engine 616 may determine whether to synchronize the local buffer 102 and the remote buffer 106 in response to a request to paste data from a buffer 102, 106 to an application.

As shown in FIG. 16, the routine 1600 may begin at the decision step 1602, at which the paste event synchronization engine 616 may determine whether a paste event from a buffer 102, 106 to an application has been requested. For example, in a Microsoft Windows environment, a request to paste data from a buffer 102, 106 to an application may be detected by monitoring WindowProc callback functions for WM_PASTE messages, as described above. In the illustrated example, the decision step 1602 detects requests for either local paste events (e.g., paste operations to an application on the client device 202) or remote paste events (e.g., paste operations to an application on the remote computing resource 402). In other implementations, however, the paste event synchronization engine 616 may instead detect (at decision step 1602) only requests for local paste events or only requests for remote paste events.

When, at the decision step 1602, the paste event synchronization engine 616 determines that a paste event to an application has been requested, the routine 1600 may proceed to a decision step 1604, at which the paste event synchronization engine 616 may determine whether the requested paste application (i.e., the application to which the paste operation has been requested) is co-located with the copy application (i.e., the application from which data was copied to the buffer 102, 106). This determination may be made, for example, by evaluating the WM_PASTE message detected at the decision step 1602. When, for example, the copy application is local (e.g., on the client device 202) and the requested paste application is remote (e.g., on the remote computing resource 402), the paste event synchronization engine 616 may determine that the requested paste application and the copy application are not co-located. Similarly, when the copy application is remote (e.g., on the remote computing resource 402) and the requested paste application is local (e.g., on the client device 202), the paste event synchronization engine 616 may also determine that the requested paste application and the copy application are not co-located. When, on the other hand, the copy application and the requested paste application are both local (e.g., are both on the client device 202) or are both remote (e.g., are both on the remote computing resource 402), the paste event synchronization engine 616 may determine that the requested pasted application and the copy application are co-located.

When, at the decision step 1604, the paste event synchronization engine 616 determines that the requested paste application is co-located with the copy application, the routine 1600 may terminate, as no synchronization of the buffers 102, 106 is needed. When, on the other hand, the paste event synchronization engine 616 determines that the requested paste application is not co-located with the copy application, the routine 1600 may proceed to a decision step 1606, at which the paste event synchronization engine 616 may determine whether the value of the "synchronization flag" entry 714 of the "copy event ID" entry for the to-be-pasted data is "false." The value of the "synchronization flag" entry 714 may, for example, have previously been set to "true" at the step 1424 of the routine 1400 (shown in FIG. 14) performed by the copy event synchronization engine 612 after the copy event synchronization engine 612 synchronized the contents of the local buffer 102 and the remote buffer 106 at the step 1422.

When, at the decision step 1606, the paste event synchronization engine 616 determines that the "synchronization flag" entry 714 for the to-be-pasted data is "true," the routine 1600 may terminate, as no synchronization of the buffers 102, 106 is needed. When, on the other hand, the paste event synchronization engine 616 determines (at the decision step 1606) that the "synchronization flag" entry 714 for the to-be-pasted data is "false," the routine 1600 may proceed to a step 1608, at which the paste event synchronization engine 616 may cause the client device 202 to prompt the user who requested the paste operation to indicate whether the application from which the to-be-pasted data originated is to be added to the exclusion list that is maintained by the exclusion list management engine 610, as discussed above.

At a decision step 1610, the paste event synchronization engine 616 may determine whether the user of the client device 202 has responded to the prompt provided at the step 1608 with an instruction to add the application from which the to-be-pasted data originated to the exclusion list. When, at the decision step 1610, the paste event synchronization engine 616 determines that such an instruction has not been received, the routine 1600 may proceed to a decision step 1614 (described below). When, on the other hand, the paste event synchronization engine 616 determines (at the decision step 1610) that such an instruction has been received, the routine 1600 may proceed to at step 1612, at which the paste event synchronization engine 616 may add the app ID for the copy application (as an "app ID" entry 902) to the app exclusion table 900 (shown in FIG. 9) along with data (as an "exclusion date/time" entry 904) identifying the date and/or time that app ID was added to the table. As noted above, in some implementations, the paste event synchronization engine may also provide the client device 202 with a user interface mechanism (e.g., a drop-down menu, radio buttons, etc.) that permits the user of the client device to select an amount of time, e.g., one hour, one day, one week, etc., that the copy application is to remain on the exclusion list. In such an implementation, that additional data may also be added to the app exclusion table 900, either as a separate entry or as an appropriate adjustment to the value of the "exclusion time/data" entry 904. Following the step 1612, the routine 1600 may proceed to the decision step 1614.

At the decision step 1614, the paste event synchronization engine 616 may determine whether the value of the "privacy flag" entry 712 for the copy event (indicated by the "copy event ID" entry 702 in the buffer activity table 700) under consideration is "true" or "false."

When, at the decision step 1614, the paste event synchronization engine 616 determines that the value of the "privacy flag" entry 712 for the copy event (indicated by the "copy event ID" entry 702 in the buffer activity table 700) under consideration is "true," the routine 1600, may proceed to a step 1624 (described below). When, on the other hand, the paste event synchronization engine 616 determines (at the decision step 1614) that the value of the "privacy flag" entry 712 for the copy event under consideration is "false," the routine 1600, may instead proceed to a step 1616, at which the to-be-pasted data may be sent to the privacy analysis engine 614 (shown in FIG. 6) for analysis, as described above. The routine 1600 may then proceed to a decision step 1618.

At the decision step 1618, the paste event synchronization engine 616 may again determine whether, following the analysis performed by the privacy analysis engine 614, the value of the "privacy flag" entry 712 for the copy event (indicated by the "copy event ID" entry 702 in the buffer activity table 700) under consideration is "true" or "false."

When, at the decision step 1618, the paste event synchronization engine 616 determines that the value of the "privacy flag" entry 712 for the copy event under consideration is "true," the routine 1600 may proceed to the step 1624 (described below). When, on the other hand, the paste event synchronization engine 616 determines (at the decision step 1618) that the value of the "privacy flag" entry 712 for the copy event under consideration is "false," the routine 1600 may instead proceed to a step 1620, at which the paste event synchronization engine 616 may cause the contents of the local buffer 102 and the remote buffer 106 to be synchronized. As a result of such synchronization, the data that was copied to one of the buffers 102, 106 will be available on the other buffer 102, 106 to complete the requested paste operation.

At the step 1622 of the routine 1600, the paste event synchronization engine 616 may set the value of the "synchronization flag" entry 714 for the copy event (indicated by the "copy event ID" entry 702 in the buffer activity table 700) under consideration to "true." Setting the value of the "synchronization flag" entry 714 to "true" may enable the paste event synchronization engine 616 to avoid taking certain steps, such as allowing modification of the exclusion list, analyzing the copied data for indicia of privacy information, and transferring copied data to synchronize the buffers 102, 106, in response to another detected paste event involving the same data.

As noted above when, at the decision step 1614 or the decision step 1618, the paste event synchronization engine 616 determines that the value of the "privacy flag" entry 712 for the copy event (indicated by the "copy event ID" entry 702 in the buffer activity table 700) under consideration is "true," the routine 1600 proceeds to the step 1624.

At the step 1624, the paste event synchronization engine 616 may cause the client device 202 to prompt the user to take an action to modify, or perhaps to perform an automated process for modifying or suggesting modifications to, the to-be-pasted data to remove information that has been marked as potentially private and/or to override the privacy determination made by the privacy analysis engine 614. The paste event synchronization engine 616 may, for example, cause the client device 202 to display the to-be-pasted data in such a way that the information that was marked as potentially private is readily ascertainable, such as being highlighted, colored differently, etc.

At a decision step 1626, the paste event synchronization engine 616 may determine whether the user has taken an action, e.g., by detecting inputs to a user interface of the client device 202, to modify and/or approve suggested modifications to the to-be-pasted data, and/or whether the client device 202 has automatically taken an action to modify the to-be-pasted data, such as by removing or altering information that has been marked as potentially private. When, at the decision step 1626, the paste event synchronization engine 616 determines that the to-be-pasted data has not been modified, the routine 1600 may proceed to a decision step 1628 (described below). When, on the other hand, the paste event synchronization engine 616 determines (at the decision step 1626) that the to-be-pasted data has been modified, the routine 1600 may instead return to the 1616, at which the paste event synchronization engine 616 may send the modified data to the privacy analysis engine 614 for evaluation, as described above. In some implementations, such a data modification/privacy evaluation process may be continued until the paste event synchronization engine 616 determines, at the decision step 1618, that the value of the "privacy flag" entry 712 for the modified data is "true."

At the decision step 1628, the paste event synchronization engine 616 may determine whether the user has taken an action, e.g., by detecting receipt of an "ignore privacy warning" command via a user interface of the client device 202, to override the privacy determination made by the privacy analysis engine 614. The user may, for example, review the information that has been marked as potentially private and indicate that the privacy determination is to be ignored, e.g., by clicking or otherwise selecting a button or other user interface element, if the user is comfortable with that information being transferred to the remote computing resource 402 and/or that the marked information is not, in fact, private. When, at the decision step 1628, the paste event synchronization engine 616 determines that the user has elected to override the privacy determination of the privacy analysis engine 614, the routine may proceed to the step 1620, at which the paste event synchronization engine 616 may cause the contents of the local buffer 102 and the remote buffer 106 to be synchronized, as discussed above. When, on the other hand, the paste event synchronization engine 616 determines (at the decision step 1628) that the user has not elected to override the privacy determination of the privacy analysis engine 614, the routine 1600 may instead terminate. Accordingly, the paste event synchronization engine 616 prevents the information that was marked as potentially private by the privacy analysis engine 614 from being transferred across the network, e.g., from the client device 202 to the remote computing resource 402.

G. Example Implementations of Methods, Systems, and Computer-Readable Media in Accordance with the Present Disclosure The following paragraphs (M1) through (M28) describe examples of methods that may be implemented in accordance with the present disclosure.

(M1) A method may involve determining, by a computing system, that first data was copied from a first application to a first buffer of a first computing environment; determining, by the computing system, that the first data was received by a second application in a second computing environment, the second computing environment being remote from the first computing environment; identifying, by the computing system, second data copied from the first application to the first buffer; and causing the second data to be transferred from the first buffer to the second computing environment in response to the second data being copied from the first application to the first buffer and based at least in part on the second application having received the first data.

(M2) A method may be performed as described in paragraph (M1), and may further involve evaluating the second data to determine whether the second data includes potentially private information; and determining that the second data is free of potentially private information; wherein causing the second data to be transferred from the first buffer to the second computing environment may be further based at least in part on the second data being free of potentially private information.

(M3) A method may be performed as described in paragraph (M1) or paragraph (M2), wherein determining that the first data was received by the second application in the second computing environment may further involve identifying a transfer of the first data to the second application; and determining that the second application is located in the second computing environment.

(M4) A method may be performed as described in any of paragraphs (M1) through (M3), and may further involve determining a first value representing a first number of times that items copied to the first buffer from the first application are received by one or more applications in the second computing environment; wherein causing the second data to be transferred from the first buffer to the second computing environment may be further based at least in part on the first value.

(M5) A method may be performed as described in paragraph (M4), and may further involve determining the first value by determining the first number of times that items copied to the first buffer from the first application were received by the one or more applications in the second computing environment during a first window of time preceding a time that the second data was copied from the first application to the first buffer.

(M6) A method may be performed as described in paragraph (M5), and may further involve determining that the first value exceeds a threshold; wherein causing the second data to be transferred from the first buffer to the second computing environment may be further based at least in part on the first value exceeding the threshold.

(M7) A method may be performed as described in any of paragraphs (M1) through (M6), wherein causing the second data to be transferred from the first buffer to the second computing environment may further involve causing the second data to be transferred to a second buffer of the second computing environment.

(M8) A method may be performed as described in paragraph (M7), and may further involve transferring, by the computing system, the second data from the second buffer to at least one application of the second computing environment.

(M9) A method may be performed as described in any of paragraphs (M1) through (M8), wherein the second computing environment may comprise a shared computing resource of a resource delivery system, and the method may further involve delivering at least one virtual resource from the second computing environment to the first computing environment.

(M10) A method may be performed as described in paragraph (M9), and may further involve transferring, by the computing system, the second data to the at least one virtual resource.

(M11) A method may involve determining, by a computing system, that first data in a first buffer of a first operating system is to be transferred to a second operating system; evaluating, by the computing system, the first data to determine whether the first data includes potentially private information; determining, by the computing system, that the first data is free of potentially private information; and causing the first data to be transferred from the first buffer to the second operating system based at least in part on the first data being free of potentially private information.

(M12) A method may be performed as described in paragraph (M11), and may further involve initiating a transfer of the first data from the first buffer to the second operating system in response to the first data being copied to the first buffer.

(M13) A method may be performed as described in paragraph (M11) or paragraph (M12), and may further involve receiving a request to transfer the first data to an application executing on the second operating system; and initiating a transfer of the first data from the first buffer to the second operating system in response to receipt of the request.

(M14) A method may be performed as described in any of paragraphs (M11) through (M13), and may further involve receiving a request to transfer second data in the first buffer to an application executing on the second operating system; evaluating the second data to determine whether the second data includes potentially private information; determining that the second data includes potentially private information; and causing a display screen of the computing system to indicate the potentially private information.

(M15) A method may be performed as described in paragraph (M14), and may further involve receiving a command to modify the second data to generate modified second data; evaluating the modified second data to determine whether the modified second data includes potentially private information; determining that the modified second data is free of potentially private information; and causing the modified second data to be transferred from the first buffer to the second operating system based at least in part on the modified second data being free of potentially private information.

(M16) A method may be performed as described in paragraph (M14), and may further involve receiving a command to override a determination that the second data includes potentially private information; and causing the second data to be transferred from the first buffer to the second operating system based at least in part on the command.

(M17) A method may be performed as described in any of paragraphs (M11) through (M16), and may further involve determining that the first data was copied to the first buffer from an application executing on the first operating system; and receiving a command to add the application to an exclusion list such that, on at least one subsequent occasion, copying additional data from the application to the first buffer triggers an automatic transfer of the additional data to the second operating system at least in a circumstance in which the additional data is determined to be free of potentially private information.

(M18) A method may be performed as described in any of paragraphs (M11) through (M17), and may further involve determining, by the computing system, that third data was copied from a first application to the first buffer; determining, by the computing system, that the third data was received by a second application operating on the second operating system; and determining that the first data is to be transferred to the second operating system in response to the first data being copied from the first application to the first buffer and based at least in part on the second application having received the third data.

(M19) A method may be performed as described in any of paragraphs (M11) through (M18), and may further involve determining a first value representing a first number of times that items copied to the first buffer from the first application are received by one or more applications in the second computing environment; wherein determining that the first data is to be transferred to the second operating system may be further based at least in part on the first value.

(M20) A method may be performed as described in paragraph (M19), and may further involve determining the first value by determining the first number of times that items copied to the first buffer from the first application were received by the one or more applications in the second computing environment during a first window of time preceding a time that the first data was copied from the first application to the first buffer.

(M21) A method may be performed as described in paragraph (M19), and may further involve determining that the first value exceeds a threshold; wherein determining that the first data is to be transferred to the second operating system may be further based at least in part on the first value exceeding the threshold.

(M22) A method may be performed as described in any of paragraphs (M11) through (M21), wherein causing the first data to be transferred from the first buffer to the second operating system may further involve causing the first data to be transferred to a second buffer of the second operating system.

(M23) A method may be performed as described in paragraph (M22), and may further involve transferring, by the computing system, the first data from the second buffer to at least one application executing on the second operating system.

(M24) A method may be performed as described in any of paragraphs (M11) through (M23), wherein the second operating system may be executing on a shared computing resource of a resource delivery system, and the method may further involve delivering at least one virtual resource from the second operating system to the first operating system.

(M25) A method may be performed as described in paragraph (M24), and may further involve transferring, by the computing system, the first data to the at least one virtual resource.\

(M26) A method may involve determining, by a computing system, that first data was copied from a first application to a first buffer of a first computing environment; determining, by the computing system, that the first data was received by a second application in a second computing environment, the second computing environment being remote from the first computing environment; identifying, by the computing system, second data copied from the first application to the first buffer; evaluating, by the computing system, the second data to determine whether the second data includes potentially private information; determining, by the computing system, that the second data is free of potentially private information; and causing the second data to be transferred from the first buffer to the second computing environment in response to the second data being copied from the first application to the first buffer and based at least in part on the second application having received the first data and the second data being free of potentially private information.

(M27) A method may be performed as described in paragraph (M26), and may further involve determining a first value representing a first number of times that items copied to the first buffer from the first application were received by one or more applications in the second computing environment during a first window of time preceding a time that the second data was copied from the first application to the first buffer; and determining that the first value exceeds a threshold; wherein causing the second data to be transferred from the first buffer to the second computing environment may be further based at least in part on the first value exceeding the threshold.

(M28) A method may be performed as described in paragraph (M26) or (M27), and may further involve causing the second data to be transferred to a second buffer of the second computing environment.

The following paragraphs (S1) through (S28) describe examples of systems and devices that may be implemented in accordance with the present disclosure.

(S1) A computing system may comprise at least one processor and at least one computer-readable medium. The at least one computer-readable medium may be encoded with instructions which, when executed by the at least one processor, cause the computing system to determine that first data was copied from a first application to a first buffer of a first computing environment, to determine that the first data was received by a second application in a second computing environment, the second computing environment being remote from the first computing environment, to identify second data copied from the first application to the first buffer, and to cause the second data to be transferred from the first buffer to the second computing environment in response to the second data being copied from the first application to the first buffer and based at least in part on the second application having received the first data.

(S2) A computing system may be configured as described in paragraph (S1), and the at least one computer-readable medium may be encoded with additional instructions which, when executed by the at least one processor, further cause the computing system to evaluate the second data to determine whether the second data includes potentially private information, and to determine that the second data is free of potentially private information; wherein the second data may be caused to be transferred from the first buffer to the second computing environment further based at least in part on the second data being free of potentially private information.

(S3) A computing system may be configured as described in paragraph (S1) or paragraph (S2), wherein the at least one computer-readable medium may be encoded with additional instructions which, when executed by the at least one processor, further cause the computing system to determine that the first data was received by the second application in the second computing environment at least in part by identifying a transfer of the first data to the second application, and determining that the second application is located in the second computing environment.

(S4) A computing system may be configured as described in any of paragraphs (S1) through (S3), and the at least one computer-readable medium may be encoded with additional instructions which, when executed by the at least one processor, further cause the computing system to determine a first value representing a first number of times that items copied to the first buffer from the first application are received by one or more applications in the second computing environment, and to cause the second data to be transferred from the first buffer to the second computing environment further based at least in part on the first value.

(S5) A computing system may be configured as described in paragraph (S4), and the at least one computer-readable medium may be encoded with additional instructions which, when executed by the at least one processor, further cause the computing system to determine the first value by determining the first number of times that items copied to the first buffer from the first application were received by the one or more applications in the second computing environment during a first window of time preceding a time that the second data was copied from the first application to the first buffer.

(S6) A computing system may be configured as described in paragraph (S5), and the at least one computer-readable medium may be encoded with additional instructions which, when executed by the at least one processor, further cause the computing system to determine that the first value exceeds a threshold, and to cause the second data to be transferred from the first buffer to the second computing environment further based at least in part on the first value exceeding the threshold.

(S7) A computing system may be configured as described in any of paragraphs (S1) through (S6), wherein the at least one computer-readable medium may be encoded with additional instructions which, when executed by the at least one processor, further cause the computing system to cause the second data to be transferred from the first buffer to the second computing environment at least in part by causing the second data to be transferred to a second buffer of the second computing environment.

(S8) A computing system may be configured as described in paragraph (S7), and the at least one computer-readable medium may be encoded with additional instructions which, when executed by the at least one processor, further cause the computing system to transfer the second data from the second buffer to at least one application of the second computing environment.

(S9) A computing system may be configured as described in any of paragraphs (S1) through (S8), wherein the second computing environment may comprise a shared computing resource of a resource delivery system, and the at least one computer-readable medium may be encoded with additional instructions which, when executed by the at least one processor, further cause the computing system to deliver at least one virtual resource from the second computing environment to the first computing environment.

(S10) A computing system may be configured as described in paragraph (S9), and the at least one computer-readable medium may be encoded with additional instructions which, when executed by the at least one processor, further cause the computing system to transfer the second data to the at least one virtual resource.

(S11) A computing system may comprise at least one processor and at least one computer-readable medium. The at least one computer-readable medium may be encoded with instructions which, when executed by the at least one processor, cause the computing system to determine that first data in a first buffer of a first operating system is to be transferred to a second operating system, to evaluate the first data to determine whether the first data includes potentially private information, to determine that the first data is free of potentially private information, and to cause the first data to be transferred from the first buffer to the second operating system based at least in part on the first data being free of potentially private information.

(S12) A computing system may be configured as described in paragraph (S11), and the at least one computer-readable medium may be encoded with additional instructions which, when executed by the at least one processor, further cause the computing system to initiate a transfer of the first data from the first buffer to the second operating system in response to the first data being copied to the first buffer.

(S13) A computing system may be configured as described in paragraph (S11) or paragraph (S12), and the at least one computer-readable medium may be encoded with additional instructions which, when executed by the at least one processor, further cause the computing system to receive a request to transfer the first data to an application executing on the second operating system, and to initiate a transfer of the first data from the first buffer to the second operating system in response to receipt of the request.

(S14) A computing system may be configured as described in any of paragraphs (S11) through (S13), and the at least one computer-readable medium may be encoded with additional instructions which, when executed by the at least one processor, further cause the computing system to receive a request to transfer second data in the first buffer to an application executing on the second operating system, to evaluate the second data to determine whether the second data includes potentially private information, to determine that the second data includes potentially private information, and to cause a display screen of the computing system to indicate the potentially private information.

(S15) A computing system may be configured as described in paragraph (S14), and the at least one computer-readable medium may be encoded with additional instructions which, when executed by the at least one processor, further cause the computing system to receive a command to modify the second data to generate modified second data, to evaluate the modified second data to determine whether the modified second data includes potentially private information, to determine that the modified second data is free of potentially private information, and to cause the modified second data to be transferred from the first buffer to the second operating system based at least in part on the modified second data being free of potentially private information.

(S16) A computing system may be configured as described in paragraph (S14), and the at least one computer-readable medium may be encoded with additional instructions which, when executed by the at least one processor, further cause the computing system to receive a command to override a determination that the second data includes potentially private information, and to cause the second data to be transferred from the first buffer to the second operating system based at least in part on the command.

(S17) A computing system may be configured as described in any of paragraphs (S11) through (S16), and the at least one computer-readable medium may be encoded with additional instructions which, when executed by the at least one processor, further cause the computing system to determine that the first data was copied to the first buffer from an application executing on the first operating system, and to receive and execute a command to add the application to an exclusion list such that, on at least one subsequent occasion, copying additional data from the application to the first buffer triggers an automatic transfer of the additional data to the second operating system at least in a circumstance in which the additional data is determined to be free of potentially private information.

(S18) A computing system may be configured as described in any of paragraphs (S11) through (S17), and the at least one computer-readable medium may be encoded with additional instructions which, when executed by the at least one processor, further cause the computing system to determine that third data was copied from a first application to the first buffer, to determine that the third data was received by a second application operating on the second operating system, and to determine that the first data is to be transferred to the second operating system in response to the first data being copied from the first application to the first buffer and based at least in part on the second application having received the third data.

(S19) A computing system may be configured as described in any of paragraphs (S11) through (S18), and the at least one computer-readable medium may be encoded with additional instructions which, when executed by the at least one processor, further cause the computing system to determine a first value representing a first number of times that items copied to the first buffer from the first application are received by one or more applications in the second computing environment, and to determine that the first data is to be transferred to the second operating system further based at least in part on the first value.

(S20) A computing system may be configured as described in paragraph (S19), and the at least one computer-readable medium may be encoded with additional instructions which, when executed by the at least one processor, further cause the computing system to determine the first value by determining the first number of times that items copied to the first buffer from the first application were received by the one or more applications in the second computing environment during a first window of time preceding a time that the first data was copied from the first application to the first buffer.

(S21) A computing system may be configured as described in paragraph (S19), and the at least one computer-readable medium may be encoded with additional instructions which, when executed by the at least one processor, further cause the computing system to determine that the first value exceeds a threshold, and to determine that the first data is to be transferred to the second operating system further based at least in part on the first value exceeding the threshold.

(S22) A computing system may be configured as described in any of paragraphs (S11) through (S21), and the at least one computer-readable medium may be encoded with additional instructions which, when executed by the at least one processor, further cause the computing system to cause the first data to be transferred from the first buffer to the second operating system at least in part by causing the first data to be transferred to a second buffer of the second operating system.

(S23) A computing system may be configured as described in paragraph (S22), and the at least one computer-readable medium may be encoded with additional instructions which, when executed by the at least one processor, further cause the computing system to transfer by the first data from the second buffer to at least one application executing on the second operating system.

(S24) A computing system may be configured as described in any of paragraphs (S11) through (S23), wherein the second operating system may be executing on a shared computing resource of a resource delivery system, and the at least one computer-readable medium may be encoded with additional instructions which, when executed by the at least one processor, further cause the computing system to deliver at least one virtual resource from the second operating system to the first operating system.

(S25) A computing system may be configured as described in paragraph (S24), and the at least one computer-readable medium may be encoded with additional instructions which, when executed by the at least one processor, further cause the computing system to transfer the first data to the at least one virtual resource.

(S26) A computing system may comprise at least one processor and at least one computer-readable medium. The at least one computer-readable medium may be encoded with instructions which, when executed by the at least one processor, cause the computing system to determine that first data was copied from a first application to a first buffer of a first computing environment, to determine that the first data was received by a second application in a second computing environment, the second computing environment being remote from the first computing environment, to identify second data copied from the first application to the first buffer, to evaluate the second data to determine whether the second data includes potentially private information, to determine by the computing system, that the second data is free of potentially private information, and to cause the second data to be transferred from the first buffer to the second computing environment in response to the second data being copied from the first application to the first buffer and based at least in part on the second application having received the first data and the second data being free of potentially private information.

(S27) A computing system may be configured as described in paragraph (S26), and the at least one computer-readable medium may be encoded with additional instructions which, when executed by the at least one processor, further cause the computing system to determine a first value representing a first number of times that items copied to the first buffer from the first application were received by one or more applications in the second computing environment during a first window of time preceding a time that the second data was copied from the first application to the first buffer, to determine that the first value exceeds a threshold, and to cause the second data to be transferred from the first buffer to the second computing environment further based at least in part on the first value exceeding the threshold.

(S28) A computing system may be configured as described in paragraph (S26) or (S27), and the at least one computer-readable medium may be encoded with additional instructions which, when executed by the at least one processor, further cause the computing system to cause the second data to be transferred to a second buffer of the second computing environment.

The following paragraphs (CRM1) through (CRM28) describe examples of computer-readable media that may be implemented in accordance with the present disclosure.

(CRM1) At least one non-transitory, computer-readable medium may be encoded with instructions which, when executed by at least one processor included in a computing system, cause the computing system to determine that first data was copied from a first application to a first buffer of a first computing environment, to determine that the first data was received by a second application in a second computing environment, the second computing environment being remote from the first computing environment, to identify second data copied from the first application to the first buffer, and to cause the second data to be transferred from the first buffer to the second computing environment in response to the second data being copied from the first application to the first buffer and based at least in part on the second application having received the first data.

(CRM2) At least one computer-readable medium may be configured as described in paragraph (CRM1), and may be encoded with additional instructions which, when executed by the at least one processor, further cause the computing system to evaluate the second data to determine whether the second data includes potentially private information, and to determine that the second data is free of potentially private information; wherein the second data may be caused to be transferred from the first buffer to the second computing environment further based at least in part on the second data being free of potentially private information.

(CRM3) At least one computer-readable medium may be configured as described in paragraph (CRM1) or paragraph (CRM2), wherein the at least one computer-readable medium may be encoded with additional instructions which, when executed by the at least one processor, further cause the computing system to determine that the first data was received by the second application in the second computing environment at least in part by identifying a transfer of the first data to the second application, and determining that the second application is located in the second computing environment.

(CRM4) At least one computer-readable medium may be configured as described in any of paragraphs (CRM1) through (CRM3), and may be encoded with additional instructions which, when executed by the at least one processor, further cause the computing system to determine a first value representing a first number of times that items copied to the first buffer from the first application are received by one or more applications in the second computing environment, and to cause the second data to be transferred from the first buffer to the second computing environment further based at least in part on the first value.

(CRM5) At least one computer-readable medium may be configured as described in paragraph (CRM4), and may be encoded with additional instructions which, when executed by the at least one processor, further cause the computing system to determine the first value by determining the first number of times that items copied to the first buffer from the first application were received by the one or more applications in the second computing environment during a first window of time preceding a time that the second data was copied from the first application to the first buffer.

(CRM6) At least one computer-readable medium may be configured as described in paragraph (CRM5), and may be encoded with additional instructions which, when executed by the at least one processor, further cause the computing system to determine that the first value exceeds a threshold, and to cause the second data to be transferred from the first buffer to the second computing environment further based at least in part on the first value exceeding the threshold.

(CRM7) At least one computer-readable medium may be configured as described in any of paragraphs (CRM1) through (CRM6), wherein the at least one computer-readable medium may be encoded with additional instructions which, when executed by the at least one processor, further cause the computing system to cause the second data to be transferred from the first buffer to the second computing environment at least in part by causing the second data to be transferred to a second buffer of the second computing environment.

(CRM8) At least one computer-readable medium may be configured as described in paragraph (CRM7), and may be encoded with additional instructions which, when executed by the at least one processor, further cause the computing system to transfer the second data from the second buffer to at least one application of the second computing environment.

(CRM9) At least one computer-readable medium may be configured as described in any of paragraphs (CRM1) through (CRM8), wherein the second computing environment may comprise a shared computing resource of a resource delivery system, and the at least one computer-readable medium may be encoded with additional instructions which, when executed by the at least one processor, further cause the computing system to deliver at least one virtual resource from the second computing environment to the first computing environment.

(CRM10) At least one computer-readable medium may be configured as described in paragraph (CRM9), and may be encoded with additional instructions which, when executed by the at least one processor, further cause the computing system to transfer the second data to the at least one virtual resource.

(CRM11) At least one non-transitory, computer-readable medium may be encoded with instructions which, when executed by at least one processor included in a computing system, cause the computing system to determine that first data in a first buffer of a first operating system is to be transferred to a second operating system, to evaluate the first data to determine whether the first data includes potentially private information, to determine that the first data is free of potentially private information, and to cause the first data to be transferred from the first buffer to the second operating system based at least in part on the first data being free of potentially private information.

(CRM12) At least one computer-readable medium may be configured as described in paragraph (CRM11), and may be encoded with additional instructions which, when executed by the at least one processor, further cause the computing system to initiate a transfer of the first data from the first buffer to the second operating system in response to the first data being copied to the first buffer.

(CRM13) At least one computer-readable medium may be configured as described in paragraph (CRM11) or paragraph (CRM12), and may be encoded with additional instructions which, when executed by the at least one processor, further cause the computing system to receive a request to transfer the first data to an application executing on the second operating system, and to initiate a transfer of the first data from the first buffer to the second operating system in response to receipt of the request.

(CRM14) At least one computer-readable medium may be configured as described in any of paragraphs (CRM11) through (CRM13), and may be encoded with additional instructions which, when executed by the at least one processor, further cause the computing system to receive a request to transfer second data in the first buffer to an application executing on the second operating system, to evaluate the second data to determine whether the second data includes potentially private information, to determine that the second data includes potentially private information, and to cause a display screen of the computing system to indicate the potentially private information.

(CRM15) At least one computer-readable medium may be configured as described in paragraph (CRM14), and may be encoded with additional instructions which, when executed by the at least one processor, further cause the computing system to receive a command to modify the second data to generate modified second data, to evaluate the modified second data to determine whether the modified second data includes potentially private information, to determine that the modified second data is free of potentially private information, and to cause the modified second data to be transferred from the first buffer to the second operating system based at least in part on the modified second data being free of potentially private information.

(CRM16) At least one computer-readable medium may be configured as described in paragraph (CRM14), and may be encoded with additional instructions which, when executed by the at least one processor, further cause the computing system to receive a command to override a determination that the second data includes potentially private information, and to cause the second data to be transferred from the first buffer to the second operating system based at least in part on the command.

(CRM17) At least one computer-readable medium may be configured as described in any of paragraphs (CRM11) through (CRM16), and may be encoded with additional instructions which, when executed by the at least one processor, further cause the computing system to determine that the first data was copied to the first buffer from an application executing on the first operating system, and to receive and execute a command to add the application to an exclusion list such that, on at least one subsequent occasion, copying additional data from the application to the first buffer triggers an automatic transfer of the additional data to the second operating system at least in a circumstance in which the additional data is determined to be free of potentially private information.

(CRM18) At least one computer-readable medium may be configured as described in any of paragraphs (CRM11) through (CRM17), and may be encoded with additional instructions which, when executed by the at least one processor, further cause the computing system to determine that third data was copied from a first application to the first buffer, to determine that the third data was received by a second application operating on the second operating system, and to determine that the first data is to be transferred to the second operating system in response to the first data being copied from the first application to the first buffer and based at least in part on the second application having received the third data.

(CRM19) At least one computer-readable medium may be configured as described in any of paragraphs (CRM11) through (CRM18), and may be encoded with additional instructions which, when executed by the at least one processor, further cause the computing system to determine a first value representing a first number of times that items copied to the first buffer from the first application are received by one or more applications in the second computing environment, and to determine that the first data is to be transferred to the second operating system further based at least in part on the first value.

(CRM20) At least one computer-readable medium may be configured as described in paragraph (CRM19), and may be encoded with additional instructions which, when executed by the at least one processor, further cause the computing system to determine the first value by determining the first number of times that items copied to the first buffer from the first application were received by the one or more applications in the second computing environment during a first window of time preceding a time that the first data was copied from the first application to the first buffer.

(CRM21) At least one computer-readable medium may be configured as described in paragraph (CRM19), and may be encoded with additional instructions which, when executed by the at least one processor, further cause the computing system to determine that the first value exceeds a threshold, and to determine that the first data is to be transferred to the second operating system further based at least in part on the first value exceeding the threshold.

(CRM22) At least one computer-readable medium may be configured as described in any of paragraphs (CRM11) through (CRM21), and the at least one computer-readable medium may be encoded with additional instructions which, when executed by the at least one processor, further cause the computing system to cause the first data to be transferred from the first buffer to the second operating system at least in part by causing the first data to be transferred to a second buffer of the second operating system.

(CRM23) At least one computer-readable medium may be configured as described in paragraph (CRM22), and may be encoded with additional instructions which, when executed by the at least one processor, further cause the computing system to transfer by the first data from the second buffer to at least one application executing on the second operating system.

(CRM24) At least one computer-readable medium may be configured as described in any of paragraphs (CRM11) through (CRM23), wherein the second operating system may be executing on a shared computing resource of a resource delivery system, and the at least one computer-readable medium may be encoded with additional instructions which, when executed by the at least one processor, further cause the computing system to deliver at least one virtual resource from the second operating system to the first operating system.

(CRM25) At least one computer-readable medium may be configured as described in paragraph (CRM24), and may be encoded with additional instructions which, when executed by the at least one processor, further cause the computing system to transfer the first data to the at least one virtual resource.

(CRM26) At least one non-transitory, computer-readable medium may be encoded with instructions which, when executed by at least one processor included in a computing system, cause the computing system to determine that first data was copied from a first application to a first buffer of a first computing environment, to determine that the first data was received by a second application in a second computing environment, the second computing environment being remote from the first computing environment, to identify second data copied from the first application to the first buffer, to evaluate the second data to determine whether the second data includes potentially private information, to determine by the computing system, that the second data is free of potentially private information, and to cause the second data to be transferred from the first buffer to the second computing environment in response to the second data being copied from the first application to the first buffer and based at least in part on the second application having received the first data and the second data being free of potentially private information.

(CRM27) At least one computer-readable medium may be configured as described in paragraph (CRM26), and may be encoded with additional instructions which, when executed by the at least one processor, further cause the computing system to determine a first value representing a first number of times that items copied to the first buffer from the first application were received by one or more applications in the second computing environment during a first window of time preceding a time that the second data was copied from the first application to the first buffer, to determine that the first value exceeds a threshold, and to cause the second data to be transferred from the first buffer to the second computing environment further based at least in part on the first value exceeding the threshold.

(CRM28) At least one computer-readable medium may be configured as described in paragraph (CRM26) or (CRM27), and may be encoded with additional instructions which, when executed by the at least one processor, further cause the computing system to cause the second data to be transferred to a second buffer of the second computing environment.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, that first data was copied from a first application in a first computing environment to a first buffer of the first computing environment;
   determining, by the computing system, that the first data was received by a second application in a second computing environment, the second computing environment being remote from the first computing environment;
   identifying, by the computing system, second data copied from the first application to the first buffer; and
   in response to the second data being copied from the first application to the first buffer and prior to receiving a request to paste the second data copied to the first buffer to another application, causing the second data to be transferred from the first buffer to a second buffer of the second computing environment based at least in part on the second application having received the first data.

2. The method of claim 1, further comprising:
   evaluating the second data to determine whether the second data includes potentially private information; and
   determining that the second data is free of potentially private information;
   wherein causing the second data to be transferred from the first buffer to the second buffer is further based at least in part on the second data being free of potentially private information.

3. The method of claim 1, wherein determining that the first data was received by the second application in the second computing environment further comprises:
   identifying a transfer of the first data to the second application; and
   determining that the second application is located in the second computing environment.

4. The method of claim 1, further comprising:
   determining a first value representing a first number of times that items copied to the first buffer from the first application are received by one or more applications in the second computing environment;

wherein causing the second data to be transferred from the first buffer to the second buffer is further based at least in part on the first value.

5. The method of claim 4, further comprising:
determining the first value at least in part by determining the first number of times that items copied to the first buffer from the first application were received by the one or more applications in the second computing environment during a first window of time preceding a time that the second data was copied from the first application to the first buffer.

6. The method of claim 5, further comprising:
determining that the first value exceeds a threshold;
wherein causing the second data to be transferred from the first buffer to the second buffer is further based at least in part on the first value exceeding the threshold.

7. The method of claim 1, further comprising:
transferring, by the computing system, the second data from the second buffer to at least one application of the second computing environment.

8. The method of claim 1, wherein the second computing environment comprises a shared computing resource of a resource delivery system, and the method further comprises:
delivering at least one virtual resource from the second computing environment to the first computing environment.

9. The method of claim 8, further comprising:
transferring, by the computing system, the second data from the second buffer to the at least one virtual resource.

10. A method, comprising:
determining, by a computing system, that first data was copied to a first buffer of a first operating system; and
in response to the first data being copied to the first buffer and prior to receiving a request to paste the first data copied to the first buffer to another application:
evaluating, by the computing system, the first data to determine whether the first data includes potentially private information,
determining, by the computing system, that the first data is free of potentially private information, and
causing the first data to be transferred from the first buffer to a second buffer of a second operating system based at least in part on the first data being free of potentially private information.

11. The method of claim 10, further comprising:
determining, by the computing system, that second data was copied to the first buffer; and
in response to the second data being copied to the first buffer:
evaluating the second data to determine whether the second data includes potentially private information,
determining that the second data includes potentially private information, and
causing a display screen of the computing system to indicate the potentially private information of the second data.

12. The method of claim 11, further comprising:
receiving a command to modify the second data to generate modified second data;
evaluating the modified second data to determine whether the modified second data includes potentially private information;
determining that the modified second data is free of potentially private information; and
causing the modified second data to be transferred from the first buffer to the second buffer based at least in part on the modified second data being free of potentially private information.

13. The method of claim 11, further comprising:
receiving a command to override a determination that the second data includes potentially private information; and
causing the second data to be transferred from the first buffer to the second buffer based at least in part on the command.

14. The method of claim 10, further comprising:
determining, by the computing system, that second data was copied to the first buffer;
receiving a request to transfer the second data to an application executing on the second operating system;
determining that the second was copied to the first buffer from an application executing on the first operating system; and
receiving a command to add the application to an exclusion list such that, on at least one subsequent occasion, copying additional data from the application to the first buffer triggers an automatic transfer of the additional data to the second buffer at least in a circumstance in which the additional data is determined to be free of potentially private information.

15. A computing system, comprising:
at least one processor; and
at least one computer-readable medium encoded with instructions which, when executed by the at least one processor, cause the computing system to:
determine that first data was copied from a first application in a first computing environment to a first buffer of the first computing environment,
determine that the first data was received by a second application in a second computing environment, the second computing environment being remote from the first computing environment,
identify second data copied from the first application to the first buffer,
evaluate the second data to determine whether the second data includes potentially private information,
determine that the second data is free of potentially private information, and
in response to the second data being copied from the first application to the first buffer and prior to receiving a request to paste the second data copied to the first buffer to another application, cause the second data to be transferred from the first buffer to a second buffer of the second computing environment based at least in part on the second application having received the first data and the second data being free of potentially private information.

16. The computing system of claim 15, wherein the at least one computer-readable medium is further encoded with additional instructions which, when executed by the at least one processor, further cause the computing system to:
determine a first value representing a first number of times that items copied to the first buffer from the first application were received by one or more applications in the second computing environment during a first window of time preceding a time that the second data was copied from the first application to the first buffer; and determine that the first value exceeds a threshold;
wherein the second data is caused to be transferred from the first buffer to the second buffer further based at least in part on the first value exceeding the threshold.

17. The computing system of claim 15, wherein the at least one computer-readable medium is further encoded with additional instructions which, when executed by the at least one processor, further cause the computing system to:
  determine a first value representing a first number of times that items copied to the first buffer from the first application are received by one or more applications in the second computing environment; and
  cause the second data to be transferred from the first buffer to the second buffer further based at least in part on the first value.

18. The computing system of claim 17, wherein the at least one computer-readable medium is further encoded with additional instructions which, when executed by the at least one processor, further cause the computing system to:
  determine the first value at least in part by determining the first number of times that items copied to the first buffer from the first application were received by the one or more applications in the second computing environment during a first window of time preceding a time that the second data was copied from the first application to the first buffer.

19. The computing system of claim 18, wherein the at least one computer-readable medium is further encoded with additional instructions which, when executed by the at least one processor, further cause the computing system to:
  determine that the first value exceeds a threshold; and
  cause the second data to be transferred from the first buffer to the second buffer further based at least in part on the first value exceeding the threshold.

20. The computing system of claim 15, wherein the at least one computer-readable medium is further encoded with additional instructions which, when executed by the at least one processor, further cause the computing system to:
  deliver at least one virtual resource from the second computing environment to the first computing environment; and
  transfer, by the computing system, the second data from the second buffer to the at least one virtual resource.

* * * * *